(12) United States Patent
Keene et al.

(10) Patent No.: US 12,227,305 B2
(45) Date of Patent: Feb. 18, 2025

(54) SELF-PROPELLED AIRSIDE DOLLY, BAGGAGE HANDLING SYSTEM, BAGGAGE HANDLING FACILITY, AND RELATED APPARATUS AND METHODS

(71) Applicant: Richmond Design and Marketing Limited, Coventry (GB)

(72) Inventors: David Keene, Coventry (GB); Simon Brewerton, Coventry (GB)

(73) Assignee: Richmond Design and Marketing Limited, Coventry (GB)

( * ) Notice: Subject to any disclaimer, the term of this patent is extended or adjusted under 35 U.S.C. 154(b) by 576 days.

(21) Appl. No.: 17/416,296

(22) PCT Filed: Dec. 16, 2019

(86) PCT No.: PCT/GB2019/053562
§ 371 (c)(1),
(2) Date: Jun. 18, 2021

(87) PCT Pub. No.: WO2020/128442
PCT Pub. Date: Jun. 25, 2020

(65) Prior Publication Data
US 2022/0024603 A1    Jan. 27, 2022

(30) Foreign Application Priority Data

Dec. 21, 2018 (GB) ................................. 1821134
Feb. 6, 2019 (GB) ................................. 1901664

(51) Int. Cl.
*B64F 1/32*    (2006.01)
*B60K 35/00*   (2006.01)
(Continued)

(52) U.S. Cl.
CPC .............. *B64F 1/326* (2020.01); *B60K 35/00* (2013.01); *B60P 7/0892* (2013.01); *B60W 30/09* (2013.01);
(Continued)

(58) Field of Classification Search
CPC .......... B64F 1/326; B64F 1/322; B64F 1/324; B64F 1/36; B64F 1/32; B60K 35/00;
(Continued)

(56) References Cited

U.S. PATENT DOCUMENTS 4,218,034 A * 8/1980 Magill ...................... B64F 1/00
244/114 R
4,541,768 A * 9/1985 Walker .................... B64F 1/322
414/535

(Continued)

FOREIGN PATENT DOCUMENTS

CN    211280675    8/2020
CN    112572557    3/2021
(Continued)

OTHER PUBLICATIONS

International Search Report and Written Opinion for International Application No. PCT/GB2019/053562, dated Jul. 21, 2020, 7 pages.
(Continued)

*Primary Examiner* — Glenn F Myers
(74) *Attorney, Agent, or Firm* — Reinhart Boerner Van Deuren s.c.

(57) ABSTRACT

The present invention relates to self-propelled airside dollies (100), and particularly but not exclusively to airside baggage dollies and airside cargo dollies, and autonomous airside dollies. The self-propelled airside dolly comprises a cargo portion (104) configured to hold baggage or cargo, a drive system (108) for driving the self-propelled airside dolly (100), a controller (114) configured to control the drive
(Continued)

system (108) in response to control signals and a processor (116) configured to provide the control signals to the controller (114).

20 Claims, 23 Drawing Sheets

(51) Int. Cl.
*B60P 7/08* (2006.01)
*B60W 30/09* (2012.01)
*B60W 50/00* (2006.01)
*B62B 5/00* (2006.01)
*B62D 63/08* (2006.01)
*G01G 19/12* (2006.01)
*B60K 35/22* (2024.01)
*B60K 35/28* (2024.01)
*B60P 7/06* (2006.01)

(52) U.S. Cl.
CPC ....... *B60W 50/0098* (2013.01); *B62B 5/0079* (2013.01); *B62D 63/08* (2013.01); *G01G 19/12* (2013.01); *B60K 35/22* (2024.01); *B60K 35/28* (2024.01); *B60K 2360/178* (2024.01); *B60P 7/06* (2013.01)

(58) Field of Classification Search
CPC ..... B60P 7/0892; B60P 7/0807; B60P 7/0815; B60P 7/13; B60P 7/06; B60P 1/52; B60W 30/09; B60W 10/04; B60W 10/00; B60W 10/20; B60W 10/24; B60W 40/105; B60W 40/107; B60W 40/109; B60W 40/10; B60W 50/0098; B60W 2050/0095; B60W 2050/0096; B62B 5/0079; G01G 19/08; G01G 19/12; B62D 63/08
See application file for complete search history.

(56) References Cited

U.S. PATENT DOCUMENTS

| | | | | |
|---|---|---|---|---|
| 4,756,660 | A * | 7/1988 | Cesarini | B64F 1/227 414/349 |
| 4,787,808 | A | 11/1988 | Shimoji et al. | |
| 5,151,004 | A | 9/1992 | Johnson | |
| 6,033,175 | A | 3/2000 | Pflueger et al. | |
| 6,622,846 | B1 * | 9/2003 | Dean | B65G 69/24 198/370.09 |
| 8,851,488 | B2 | 10/2014 | Carruyo | |
| 10,494,023 | B2 * | 12/2019 | Chang | B60T 13/662 |
| 2005/0207876 | A1 * | 9/2005 | Springwater | E04H 6/24 414/231 |
| 2007/0288123 | A1 * | 12/2007 | D'Andrea | G05D 1/0234 700/214 |
| 2010/0003116 | A1 * | 1/2010 | Klein | B64F 1/322 414/478 |
| 2013/0334783 | A1 * | 12/2013 | Carruyo | B62D 53/005 280/79.11 |
| 2017/0144562 | A1 * | 5/2017 | Thomas | H01M 10/4257 |
| 2018/0257446 | A1 * | 9/2018 | Epperson | B62D 53/00 |
| 2018/0361903 | A1 * | 12/2018 | Dees | B62B 5/0003 |
| 2019/0009679 | A1 | 1/2019 | Gaither et al. | |
| 2019/0135133 | A1 | 5/2019 | Miller | |
| 2019/0193582 | A1 | 6/2019 | Matsuoka et al. | |
| 2020/0039557 | A1 * | 2/2020 | Burch, V | B62D 63/06 |
| 2020/0043346 | A1 | 2/2020 | Vacek | |

FOREIGN PATENT DOCUMENTS

| | | |
|---|---|---|
| DE | 10254101 | 6/2004 |
| DE | 10 2009 050331 | 4/2011 |
| DE | 102010008807 | 8/2011 |
| DE | 202018103943 | 7/2018 |
| EP | 1619002 | 1/2006 |
| EP | 2360084 | 8/2011 |
| EP | 2821324 | 1/2015 |
| EP | 2821324 A1 † | 1/2015 |
| FR | 2942448 | 8/2010 |
| GB | 2558518 | 5/2016 |
| KR | 20180038671 | 4/2018 |
| WO | WO2004/069699 | 8/2004 |
| WO | WO2017/120079 | 7/2017 |
| WO | WO2017207978 | 12/2017 |
| WO | WO2018/017053 | 1/2018 |
| WO | WO2018/098113 | 5/2018 |
| WO | WO2019/057346 | 3/2019 |
| WO | WO2019/112586 | 6/2019 |

OTHER PUBLICATIONS

United Kingdom Search Report for GB Application No. 1901664.1, dated Jul. 30, 2019, 2 pages.
Sae International: "Taxonomy and Definitions for Terms Related to Driving Automation Systems for On-Road Motor Vehicles", Jun. 1, 2018 (Jun. 1, 2018), XP055663579, Retrieved from the Internet: URL:http://standards.sae.org/J2016_201806 [retrieved on Jan. 30, 2020], 35 pages.
Anonymous: "SAE International Releases Updated Visual Chart for Its "Levels of Driving Automation" Standard for Self-Driving Vehicles", Dec. 11, 2018 (Dec. 11, 2018), XP055663446, Retrieved from the Internet: URL:https://www.sae.org/news/press-room/2018/12/sae-international-releases-updated-visual-chart-for-its-"levels-of-driving-automation"-standard-for-self-driving-vehicles [retrieved on Jan. 30, 2020], 3 pages.
"Weiss GmBH Transportation by Mecanum Wheel Drive," YouTube, Sep. 14, 2011, https://www.youtube.com/watch?v=FeVghhvw9dQ, 1 page.
"Autotec & KUKA KMP 1500: Autotec Solutions," YouTube, Oct. 19, 2018 https://www.youtube.com/watch?v=JU94a7wGsNk, 1 page.
"10T transfering platform AGV with mecanum wheel," YouTube, Jun. 12, 2018, https://www.youtube.com/watch?v=jyohn2_LgZQ, 1 page.
KUKA omniMove Universal Transport Vehicle, YouTube, Apr. 11, 2014, https://www.youtube.com/watch?v=0IHItWN_RgY, 1 page.
United Kingdom Search Report for GB Application No. 2014503.3, dated Mar. 9, 2021, 2 pages.
United Kingdom Search Report for GB Application No. 2014505.8, dated Feb. 11, 2021, 1 page.
United Kingdom Search Report for GB Application No. 2014504.1, dated Mar. 9, 2021, 2 pages.
Alke, alke high performance utility vehicles: Electric vehicles ATX110E, ATX210E, ATX230E/ED/H/HL, ATX240E/ED/H/HL (Rev. 16052EN), pp. 1-8.†

* cited by examiner
† cited by third party

SELF-PROPELLED AIRSIDE DOLLY, BAGGAGE HANDLING SYSTEM, BAGGAGE HANDLING FACILITY, AND RELATED APPARATUS AND METHODS

CROSS-REFERENCE TO RELATED PATENT APPLICATIONS

This application is a National Stage entry of International Application No. PCT/GB2019/053562, filed on Dec. 16, 2019, which claims priority to United Kingdom Application No. 1901664.1, filed on Feb. 6, 2019, and to United Kingdom Application No. 1821134.2, filed on Dec. 21, 2018, which are incorporated herein by reference in their entireties.

The present invention relates to self-propelled airside dollies, and particularly but not exclusively to airside baggage dollies and airside cargo dollies, and autonomous airside dollies. The invention also relates to a method of retro-fitting a baggage dolly to transform the baggage dolly into a self-propelled baggage dolly, and a kit for retro-fitting a baggage dolly in this way. Further aspects of the invention relate to a method of operating an autonomous baggage dolly using blended autonomy and a baggage dolly and vehicle operable to utilise this method, an autonomous baggage dolly and vehicle including a warning system to indicate an autonomy mode, a dolly including a weighing system, and a swarm system comprising autonomous baggage dollies or autonomous vehicles. The present invention also relates to a baggage handling system, a method of increasing operational capacity of a baggage handling system, and other related apparatus and methods.

Baggage handling systems operate in airports all over the world to transfer baggage from a passenger to an aircraft and back to the passenger at their destination. Particularly in busy airports, baggage handling systems are under a large amount of strain and depend upon efficiency to operate effectively. It is therefore desirable to increase efficiency. Efficiency can be measured in terms of minimising downtime such as wait-times, maximising speed of delivery, maximising utilisation of available space, both on vehicles and within infrastructure, and minimising energy usage. However, due to constraints such as regulatory constraints and practical constraints, known baggage handling systems include a number of drawbacks, many of which impact upon efficiency. Similar drawbacks are also applicable to cargo handling systems, of which baggage handling systems may be considered a subset.

One such drawback is due to the operation of vehicles for transporting the baggage from a baggage hall to the aircraft. In a typical system, a baggage tractor, driven by a human driver, pulls a train of baggage dollies that are releasably-coupled to each other in a line, each of which is laden with baggage either within a unit load device (ULD) or otherwise carried on a cargo portion of the baggage dolly. The train generally comprises a tractor and two or three baggage dollies, sometimes more, resulting in a long and somewhat unwieldy baggage train.

The train may instead comprise cargo dollies. Cargo dollies are usually larger than baggage dollies but ultimately are similar in function. Baggage dollies are generally used with a ULD whereas cargo dollies are generally used with either a ULD or a wrapped cargo loading area. Some dollies may have integral cargo storage means, such as a welded frame. Some dollies are fitted with a frame with curtains for retaining cargo or baggage within the frame.

The fact that the baggage trains are unwieldy often results in them being damaged. For example, it is common for drivers to misjudge tight corners and scrape the sides of the baggage dollies in their train, as the baggage dollies hit stationary objects. Moreover, when aligning themselves with loading positions for the baggage dollies, it is common for the driver to deliberately run the train up against a wall to assist in alignment. Damage to the baggage dollies is therefore expected, and drivers do not actively avoid driving in ways to prevent damage.

In order to prevent the baggage trains being subjected to excessive damage, baggage dollies in particular are designed to withstand impacts and scrapes. This is achieved through choice of materials, such as steel, as well as providing each dolly as a large structure that is capable of absorbing impacts, by providing thick sides and corners. All of this contributes to the mass of the baggage dolly, resulting in typical baggage dollies having a mass of the order of 1 ton. This of course increases the power required to pull the train of baggage dollies, increasing fuel usage and costs.

Impacts will also cause damage to infrastructure within the baggage handling system. Occasionally it will therefore be necessary to provide repairs to infrastructure or stationary objects such as concrete pillars, kerbs, and walls, in response to damage caused by baggage dollies.

The use of baggage trains also restricts the efficiency of use of each individual baggage dolly. For example, baggage trains are semi-permanently joined such that they operate with set lengths. This means that if only a single baggage dolly is required, a full baggage train will still be used to transport the baggage. It takes time and manpower to uncouple baggage dollies from a train and so they are habitually left coupled even when they are not needed for any particular task. Thus, one or two baggage dollies will lack utilisation, decreasing efficiency of the system as whole.

In the baggage hall itself, the fact that baggage trains consist of a baggage tractor and a plurality of baggage dollies, each being towed via a lengthy tow bar, in order to provide reasonable cornering ability of the baggage trains, means that a substantial amount of the length of each baggage train cannot be used for loading. Thus, areas of the baggage hall adjacent to these parts of the train are not used to their potential and space is wasted.

According to a first aspect of the invention, there is provided a self-propelled baggage dolly, comprising: a cargo portion configured to hold baggage;
  a drive system for driving the self-propelled baggage dolly;
  a controller configured to control the drive system in response to control signals; and
a processor configured to provide control signals to the controller.

In this aspect, and all the following aspects, embodiments and examples, the self-propelled baggage dolly may refer to a cargo dolly or any other airside dolly. For brevity and clarity "baggage dolly" or simply "dolly" is predominantly used and is not intended to limit the invention to only baggage dollies, but, in addition to meaning conventional baggage dollies, also includes cargo dollies and airside dollies in general Airside dollies comprise various types of dollies; the two most common types are cargo dollies and baggage dollies, with each type available in various configurations. Baggage dollies are typically smaller than cargo dollies and may be configured to carry a ULD (or other container system) or be configured as a cart, with raised sides to form a containing portion, and not usable with a ULD, for example a cage with open or openable sides, possibly closed with a curtain. In both configurations the baggage dolly is configured to carry passenger baggage. In the ULD carrying configuration baggage is loaded into the ULD, which is retained on to the top of the baggage dolly. In the cart configuration baggage is loaded onto the dolly itself, within the contacting portion.

Cargo dollies are typically larger than baggage dollies and may be configured to carry a wider array of goods. ULDs may still be used with cargo dollies, although the cargo dolly will typically be able to carry two or more ULDs at a time. Loose fitting, or oddly shaped cargo may also be more readily used with cargo dollies. Hook points and similar may be provided on the cargo dolly to allow for strapping, netting, webbing or other retaining means to be used to secure cargo on top of the cargo dolly.

The self-propelled baggage dolly will be able to drive under its own power during operation. Therefore, it will not be necessary to provide a baggage tractor or a baggage train. Independent operation of a self-propelled baggage dolly will be possible, saving space and increasing efficiency of any baggage handling system including such a baggage dolly.

The baggage dolly may further comprise a sensing system configured to provide at least one sensing output to the processor, the processor being configured to process the at least one sensing output to produce control signals to the controller, to enable operation of the autonomous baggage dolly in an autonomous mode.

Providing a sensing system allows the self-propelled baggage dolly to provide data to enhance its own operation or the operation of external systems such as a baggage handling system.

The sensing system in conjunction with the drive system may allow the baggage dolly to manoeuvre in ways that are otherwise impossible in a conventional baggage dolly. For example, when an obstacle is detected, the baggage dolly is able to automatically sense an alternative route around the obstacle, including the option of reversing in order to find such a route. Conventional baggage dollies, especially those that are part of a baggage train, are incapable of manoeuvring in this manner, e.g. they cannot reverse.

According to another aspect of the invention there is provided a self-propelled airside dolly having a length and having in a normal operation mode in which it is capable of travelling in a longitudinal direction generally parallel to the direction of its length, and a lateral movement docking mode in which it is capable of travelling in a sideways direction, generally transverse to its longitudinal length so as to approach a loading bay from a direction generally perpendicular to the loading bay, as opposed to approaching the loading bay tangentially.

Traversing in a lateral direction may be known as "crabbing". Crabbing may be characterised as the dolly moving in a non-longitudinal direction through the means of wheels of the dolly being orientated in a same, non-longitudinal direction.

In various aspects and embodiments the dolly may comprise a first set of wheels. The first set of wheels may comprise at least one steerable wheel, or at least one pair of steerable wheels. The steerable wheels may be ground engaging wheels. All of the ground engaging wheels of the dolly may be steerable.

The steerable wheels may be steerable between 0° and 360°. The steerable wheels may be steerable at angles greater than 30°. The steerable wheels may be steerable between angles between 0° and 180°. The steerable wheels may be steerable up to angles of between 45° and 135°, optionally between 80° and 110°, and preferably substantially 90°. Each of these angles may be measured as +/− from the straight ahead position, i.e. a position of the wheels in which they are running parallel to the length of the dolly.

In these embodiments the wheels may not be arranged on an axle, but may instead be independently steerable by a respective steering means. The steering means may be a controllable motor. Each controllable motor may be configured to steer its respective wheel from a straight ahead position (i.e.) 0° to any of the aforementioned ranges and limits as referred to above.

In various other aspects and embodiments the dolly may comprise a second set of wheels (in addition to the "normal" wheels used for driving significant distances). The second set of wheels may be intended to be used for a specific manoeuvring operation (in the main example moving laterally sideways to get close to a lateral, another dolly, or the like) and be a deployable set of wheels. The deployable set of wheels may be deployable from a stowed position to a deployed position. When deployed the second set of wheels may become the ground engaging wheels instead of the normal driving wheels. For example the first set of wheels may be caused to be lifted from contact with the ground. The deployable wheels may be deployable using a deployment means. The deployment means may be a jacking system comprising a jack or plurality of jacks, e.g. one or more hydraulic pistons. The jacking system, deployable wheels and a deck/cargo platform of the dolly may form a sub-assembly. The jacks may incorporate a weight sensors, wherein the weight sensor is configured to provide a weight measurement for cargo or goods located on the deck. The deployable wheels may comprise one or more driven wheels. The deployable driven wheels may be driven by a separate motor or by the same motor as drives the driven main first set of wheels.

The steering system and/or the deployable set of wheels are options for enabling the lateral movement docking mode. This increases the range of operation conditions of the dolly and allows for increased utilisation of space in loading areas and increased throughput of dollies. Manoeuvrability is also increased generally, allowing the dolly to navigate its way out of positions or situations that it would otherwise be unable to without the increased agility provided by either the steering system or deployable set of wheels.

Whilst wheels are generally referred to and preferred it may be that other ground engaging means for traversing may also be used or used instead of wheels. For example, skids, tracks, skis and rollers are just some example of alternative ground engaging means that may be used. The dolly will preferably make use of existing wheel types for its "normal" wheels. The deployable wheels may be an alternative type of deployable ground engaging means other than wheels.

The sensing outputs of the sensing system may include at least one of position data, orientation data, image data, speed data, distance data and direction data. The sensing system may include any two, three, four, five or all six of these.

The sensing system may include at least one of, or more than one of, cameras, radar, LIDAR, gyroscopes, distance sensors, magnetic field sensors, and global positioning satellite systems.

The global positioning satellite system may include differential GPS.

The processor may be operable in a plurality of different autonomy modes and may be changeable between said plurality of different autonomy modes, the processor being configured to provide control signals to the controller dependent on the autonomy mode in which it is operating.

The processor may be configured to change between the plurality of different autonomy modes in response to one or more mode triggers sensed by the sensing system.

The autonomous baggage dolly can therefore be enabled to operate in an autonomy mode that is most suitable for the circumstances in which the autonomous baggage dolly is operating.

The plurality of different autonomy modes may each relate to an SAE autonomy level.

The plurality of different autonomy modes may define a variable autonomy level.

The plurality of different autonomy modes may include an SAE Level 3 autonomy mode, an SAE Level 4 autonomy mode, and/or an SAE Level 5 autonomy mode.

When in the SAE Level 3 autonomy mode, the processor may be configured, in response to one or more event triggers, to request an operator input in order to continue providing control signals.

The operator input may include a human input from a human operator.

When in the SAE Level 4 autonomy mode, the processor may be configured, in response to one or more event triggers, to provide an operator output.

The operator output may include an output to a human operator

The processor may be configured to react to an operator input provided in response to its operator output.

When in the SAE Level 5 autonomy mode, the processor may act completely autonomously. For example, there may be no need for human intervention with or control of the baggage dolly.

The one or more mode triggers may be predetermined mode triggers. By "predetermined mode triggers" it is meant that the timing and/or position of the mode triggers is/are predetermined and therefore entirely predictable to the baggage dolly and/or operator. This is in contrast to event triggers, which may relate to unforeseen or unpredictable events or issues that may occur at random or in response to unexpected circumstances.

By providing predetermined mode triggers, the change of operating mode of the baggage dolly will be predictable. This means, for example, that an operator of one or more baggage dollies will be able to plan to be in a position to assist the baggage dolly when required, such as when the baggage dolly is forced to operate in a semi-autonomous or manual mode.

The one or more mode triggers and/or one or more event triggers may include at least one of a geospatial trigger, a temporal trigger, a visual trigger, and/or an electronic trigger.

Predetermined mode triggers may include a geospatial mode trigger. The geo-spatial mode trigger may change the autonomy mode of the baggage dolly based on a predetermined safety level of a given geographic area. For example, a geographical area that is populated mainly with autonomous vehicles may be determined to have a higher safety level, and therefore allowing a higher autonomy level, than a geographical area that is populated mainly with aircraft and/or people.

Predetermined mode triggers may include a weather-responsive mode trigger. The weather-responsive mode trigger may change the autonomy mode of the baggage dolly based on a predicted weather event. For example, if the weather forecast is for an electrical storm, the baggage dolly may be forced to operate in a lower autonomy mode or even a manual mode, to prevent electrical discharges interfering with the sensing system.

Predetermined mode triggers may include an expected pedestrian density trigger. The expected pedestrian density trigger may change the autonomy mode of the baggage dolly based on an expected pedestrian density of an area. The expected pedestrian density may change based on time, location, or other variables, but will be predictable to an operator.

The geospatial trigger may include the entry to or exit from a geo-fenced zone.

The baggage dolly may therefore be configured to operate differently in a first geo-fenced zone than in a second geo-fenced zone, perhaps dependent on the level of severity of any incident that may occur within such zones.

The visual trigger may include the detection of a road sign, traffic light, pedestrian crossing zone, hazard, pedestrian, human, or unexpected event.

The electronic trigger may include a signal receivable from a control centre.

The self-propelled baggage dolly may further comprise a warning system for indicating a current autonomy mode of the self-propelled baggage dolly, the warning system being configured to operate in a plurality of different warning modes, each warning mode being indicative of one or more of the different autonomy modes and being automatically changeable in response to the controller changing between the plurality of different autonomy modes.

The self-propelled baggage dolly may further comprise additional lighting. The additional lighting may include beacons, headlights, work lights, indicators, hazard warning lights, or any other lights. The additional lighting may operate in conjunction with the light system to provide additional information about the baggage dolly, including future actions. For example, indicator lights may be used to indicate that the baggage dolly is about to change direction and hazard warning lights may indicate that the baggage dolly is carrying out a non-standard operation, such as a movement outside of a roadway, or that the baggage dolly has encountered an obstacle.

The plurality of different autonomy modes may include a first autonomy mode associated with a first warning mode and a second autonomy mode associated with a second warning mode.

Observers may therefore distinguish between the autonomy modes by noting a difference in the warning. Differences in the warning may, for example, be a difference in a colour of light or pitch, tone, or frequency of sound.

The first and second autonomy modes may relate to different SAE autonomy levels.

The first and second autonomy modes may relate to an autonomous mode and a manual mode, respectively.

The warning system may comprise a light system, the first warning mode being a first light mode and the second warning mode being a second light mode.

The first light mode may comprise the showing of a first colour of light and the second light mode comprises the showing of a second colour of light that is different to the first colour of light.

The plurality of different autonomy modes may include a third autonomy mode associated with a third warning mode. The third warning mode may be a third light mode.

The third autonomy mode may relate to a manual mode.

The third light mode may comprise the showing of a third colour of light that is different to the first and second colours of light.

The self-propelled baggage dolly may further comprise a user interface system. The user interface system may comprise a user interface provided on the dolly in a position accessible for an operator. Preferably the user interface comprises a display screen and a user input means. The display screen and user input means may be provided as a single user interface device, preferably a touch screen device.

An operator may be able to interact with the dolly using the user interface. The interactions may provide the operator with a way to check the dolly's current tasks and approve or reject the actions the dolly is planning on taking.

The self-propelled baggage dolly may further comprise a display system. The display system may be comprised within the warning system, or provided in parallel with the warning system or may be substituted in for the warning system.

The display system may comprise a display screen. The display screen is preferably sized such that the display is visible to an operator or other airside workers at a distance of at least 2 m. The display system may comprise a plurality of display screens, preferably wherein the plurality of display screens comprises a pair of display screens; preferably the pair of display screens are disposed on opposite sides of the dolly.

The display system may provide information relating to the task currently allocated to the dolly.

The information relating to the task currently allocated to the dolly may comprise one or more of: the dolly's next destination, the dolly's next manoeuvre, the type of cargo currently being carried, the state of charge of the dolly, the next turn that the dolly will make and any other piece of information that is useful to operators in interacting with the dolly.

Providing a display system allows for human operators to better understand the actions that the dolly is currently taking or may be about to take. This can improve safety and efficiency in the interactions between dollies and human operators. Identifying the current cargo may allow operators to intervene if a dolly becomes stuck whilst carrying perishable goods, and/or take extra risk mitigation steps if the dolly is carrying hazardous goods. Displaying information about intended destination may allow operators to spot errors, for example if a dolly is identifying a destination that is illogical for that dolly then an operator may intervene. Route information, manoeuvring information and turning information may allow the dolly to be perceived more predictably by operators. This can improve health and safety as well as reduce confusion and delays that may be caused by the dolly being halted to allow pedestrians right of way.

The self-propelled baggage dolly may further comprise a weighing system configured to weigh cargo within the cargo portion.

Cargo present in the cargo portion can then be weighed when in position on the baggage dolly and this information utilised by the baggage dolly or other systems.

The baggage dolly may operate autonomously, using information from the weighing system to modify the operation of other systems of the baggage dolly.

The weighing system may be provided as part of the jacking system, preferably wherein the jack or jacks comprise a weighing sensor.

The weighing system may be configured to output a weight signal to a central controller of a baggage handling system.

The central controller may then modify control signals sent to the baggage dolly or any other baggage dolly in the baggage handling system in response to the weight signal, in order to, for example, change the order of delivery of baggage to a destination.

The weighing system may be configured to measure the total weight of the cargo present within the cargo portion. Alternatively or additionally, the weighing system may be configured to calculate a weight distribution of the cargo present within the cargo portion.

Calculating a weight distribution may enable baggage or other cargo to be packed within the cargo area to achieve a desired weight distribution, such as an even weight distribution. The calculation of a weight distribution may also be used to automatically or manually manage the loading of an aircraft by loading the baggage or other cargo from the baggage dolly to the aircraft in a way to achieve a desired weight distribution within the aircraft.

The self-propelled baggage dolly may further comprise a locking or retaining system for locking or securing cargo, such as a ULD, within the cargo portion, such that it cannot slide or move relative to the baggage dolly.

The locking system may automatically lock the cargo or ULD within the cargo portion. For example, the locking system may include sensors that detect the presence of a ULD and initiate the application of locking or retaining means, for example latches. The processor may process information received from the locking system and may initiate automatic locking of the locking system. The locking system may be mechanical, for example using a sprung latch mechanism. A mechanical locking system may be enabled to lock as soon as locking formations on the baggage dolly are aligned with corresponding locking formations on the ULD or other cargo.

In this way, the ULD may be prevented from sliding or moving relative to the baggage dolly, or falling off the baggage dolly during use, without requiring the intervention of any operator.

The locking system may include an alert for indicating that a ULD on the baggage dolly is not secured by the locking system, i.e. when the locking system has failed to lock due to misalignment of the ULD or some malfunction of the locking system.

The alert may include a visible or audible alert for alerting an operator of the baggage dolly. The alert may additionally or alternatively include a movement prevention means for preventing movement of the baggage dolly when a ULD is present but not secured. The movement prevention means may include a brake or other means that physically prevents movement of the baggage dolly. Alternatively, if the baggage dolly has a drive system, the movement prevention means may prevent the drive system from operating.

The self-propelled baggage dolly may further comprise a guiding means configured to be manipulated by a user for directing a drive direction and/or speed of the drive system to guide the baggage dolly.

The inclusion of a user-operable guiding means can allow the self-propelled baggage dolly to be guided by an operator when required, in addition to being autonomously-guided at other times. This guiding can be achieved using the power of the baggage dolly so that additional motive force is not required or is reduced.

The guiding means may comprise a handheld controller, for example, one of the kinds commonly used to control a video game. The handheld controller may preferably be wireless. The guiding means may alternatively be provided as a part of the baggage dolly. For example, the guiding means may comprise a strut, bar, guiding arm, or tow bar-like structure that may be used to lead the baggage dolly.

The cargo portion may be a part of a platform and the platform may include a plurality of rollable elements for assisting with the movement of cargo onto or off the platform. The rollable elements may assist by allowing cargo to slide onto or off the platform. The rollable elements may include castor wheels or balls within sockets.

The platform may include a cargo moving system for assisting with the loading and/or unloading of cargo from the cargo portion. The cargo-moving system may include one or more cargo wheels that can be driven to cause movement of cargo onto or off the cargo portion. The rollable elements may be positioned adjacent to the cargo wheels.

The cargo moving system may operate to automatically load and unload cargo in response to an instructing signal from the baggage dolly or from a part of a baggage handling system within which the baggage dolly is operating.

The self-propelled baggage dolly may include a tow bar that can be stowed when not in use. The tow bar may be retractable and/or pivotable such that it does not increase or does not substantially increase the dimensions of the baggage dolly when stowed.

The provision of a tow bar may be useful for when the baggage dolly cannot power itself, for example due to power depletion or fault.

The tow bar may be combined with the guiding arm as a single part. This may minimise the need for additional parts.

The self-propelled baggage dolly may have a mass of less than 1 ton, less than 900 kg, less than 800 kg, less than 700 kg, less than 500 kg, or less than 300 kg. The self-propelled baggage dolly may have a mass of between 300 kg and 700 kg, or between 400 kg and 700 kg, or between 500 kg and 700 kg, or between 600 kg and 700 kg.

The self-propelled baggage dolly may be suitable for carrying one fully-laden ULD. The self-propelled baggage dolly may be suitable for carrying a load of at least 1,000 kg, at least 1,250 kg, or at least 1,500 kg.

Self-propelled baggage dollies may come in different forms, such as a personal baggage dolly for carrying personal baggage or a cargo dolly for carrying larger items of cargo for example for airfreight. The above example masses may be for a personal baggage dolly.

A cargo dolly may have a mass of less than 4 tons, or less than 3.5 tons, or less than 3 tons, or less than 2.5 tons, or less than 2 tons. The cargo dolly may have a mass of 2 to 4 times the mass of a personal baggage dolly.

By decreasing the mass of the self-propelled baggage dolly below that of known baggage dollies—and potentially significantly below that mass, less power may be required to propel each baggage dolly and therefore a greater efficiency of operation is possible. Such efficiency can also lead to cost savings. Additionally, the baggage dollies will be considerably more environmentally-friendly. Less pollution will be produced by their use, as well as potentially less pollution being produced by their manufacture, than conventional baggage tractors and dollies.

The self-propelled baggage dolly may further comprise a power source for providing power to the self-propelled baggage dolly.

The power source may comprise an electrical power source.

The electrical power source may comprise at least one battery and may preferably comprise a bank of batteries. The batteries may include one or more of lead-acid batteries, lithium-ion batteries, lithium-polymer batteries, or any other sort of batteries.

The electrical power source may comprise at least one supercapacitor. Use of at least one supercapacitor may decrease recharge times.

The self-propelled baggage dolly may further comprise a power monitoring system for monitoring a power level of the electrical power source and causing the self-propelled baggage dolly to proceed to a charging point for charging the electrical power source when the power monitoring system determines this to be desirable.

The power monitoring system may be in communication with a central controller and/or be provided within a swarm system.

The power monitoring system may determine that charging is desirable based on one or more factors. One of the factors may be the power level of the electrical power source. Other factors may include: availability of a charging station (availability may be both time and spatial availability, in other words, when and where a charging station is available), task requirements, current workload, planned future tasks.

Taking into account other factors as well as power level may allow the dollies to be rotated into re charging without having to wait for stations to become free. This improves efficiency and reduces down time. Charge level may also be taken into account in task allocation. A dolly with a low power level may have enough charge to do indoor tasks, which may be warmer and require less distance travelled—therefore requiring less power, without recharging. A dolly with a high power level may be selected for tasks that are more likely to require a larger power drain, such as operating in cold conditions and/or requiring a large amount of travel distance. A dolly may be allocated to recharging in quieer periods, that is times when less tasks need doing and the airport is not operating at full capacity, even if it is not reaching a low power state. This may ensure that more dollies are in a high power state during busier periods.

A charging point may be a fixed point or structure in the infrastructure of an airport, or it may be a mobile structure such as a baggage tractor or a baggage dolly configured to provide electrical charging to other baggage dollies. Charging of a baggage dolly may be via a physical electrical connection such as electrical leads or connectors, or may be via wireless charging such as inductive power coupling. Charging may also be provided directly by, for example, solar panels.

The dolly may be configured to automatically calibrate its sensing system and/or automatically check the calibration of its sensing system. Automatic calibration checks may be implemented upon start-up of the dolly following a shut down event. If the dolly or a remote controller determines that the dolly passes the automatic calibration checks it may be registered for active service available to move luggage and cargo. If it fails the checks it may not be registered for active service at that time for the movement of luggage or cargo, and may even be sent for maintenance.

Throughout the present application, it should be understood that although the term baggage dolly is used, this should not be considered to be limiting to the scope of the disclosure. The concepts discussed herein are considered equally to apply to personal baggage dollies and other forms of cargo dolly.

Moreover, many of the concepts and systems described in the present disclosure may also be applicable to other self-propelled and autonomous vehicles, such as land vehicles including road vehicles such as passenger road vehicles, sea vehicles, and aircraft. Therefore, the skilled person will be aware that although discussed in relation to baggage dollies and baggage handling systems, many of the concepts may be applied more broadly to other vehicles.

According to a second aspect of the invention, there is provided a method of retro-fitting a baggage dolly to transform the baggage dolly into a self-propelled baggage dolly, the method comprising the steps of:

fitting a drive system for driving a baggage dolly to a baggage dolly; and fitting a controller and processor to the baggage dolly, the controller being configured to control the drive system in response to control signals provided by the processor.

Retro-fitting of baggage dollies to become self-propelled can lower the cost of providing such a baggage dolly and effectively recycle baggage dollies that may already be present within baggage handling systems. It may also reduce the potential environmental impact of manufacturing self-propelled baggage dollies from scratch.

The method may further comprise the step of fitting a sensing system to the baggage dolly, the sensing system being configured to provide at least one sensing output to the controller to enable operation of the autonomous baggage dolly in an autonomous mode.

The sensing system may be as provided for in the first aspect of the invention.

The processor of a retro-fitted baggage dolly or of an original equipment baggage dolly may be operable in a plurality of different autonomy modes and may be configured to provide control signals to the controller dependent on the autonomy mode in which is operating; and the method may further comprise the step of fitting a warning system to the baggage dolly, the warning system being configured to indicate a current autonomy mode of the autonomous baggage dolly, the warning system being configured to operate in a plurality of different warning modes, each warning mode being indicative of one or more of the different autonomy modes and automatically changeable in response to the controller changing between the plurality of different autonomy modes.

The warning system may be as provided for in the first aspect of the invention.

The processor of the retro-fitted baggage dolly may be operable in a plurality of different autonomy modes, the processor being configured to provide control signals to the controller dependent on the autonomy mode in which it is operating.

The processor may be configured to change between the plurality of different autonomy modes in response to one or more mode triggers sensed by the sensing system.

The autonomous baggage dolly can therefore be enabled to operate in an autonomy mode that is most suitable for the circumstances in which the autonomous baggage dolly is operating.

The plurality of different autonomy modes may be as provided for in the first aspect of the invention.

The method may further comprise the step of fitting a weighing system to the baggage dolly, the weighing system being configured to weigh cargo within the cargo portion.

The weighing system may be as provided for in the first aspect of the invention.

The method may further comprise the step of fitting a locking or restraining system for locking or securing cargo, such as a ULD, within the cargo portion, such that it cannot slide or move relative to the baggage dolly.

The locking system may be as provided for in the first aspect of the invention.

The method may further comprise the step of fitting a guiding means to the baggage dolly, the guiding means being configured to be manipulated by a user for directing a drive direction and/or speed of the drive system to guide the baggage dolly.

The guiding means may be as provided for in the first aspect of the invention.

The method may further comprise the step of fitting a cargo moving system for assisting with the loading and/or unloading of cargo from the cargo portion.

The cargo moving system may be as provided for in the first aspect of the invention.

The method may further comprise the step of fitting a tow bar that can be stowed when not in use.

The tow bar may be as provided for in the first aspect of the invention.

The retro-fitted baggage dolly may have any or all features of the baggage dolly of the first aspect of the invention.

According to a third aspect of the invention, there is provided a kit for retro-fitting a baggage dolly to transform the baggage dolly into a self-propelled baggage dolly, the kit comprising:

a drive system for driving the baggage dolly; and a controller configured to control the drive system.

The kit may further comprise a sensing system configured to provide at least one sensing output to the controller to enable operation of the autonomous baggage dolly in an autonomous mode.

The kit may further comprise any system described in relation to the first aspect of the invention.

The retro-fitted baggage dolly produced from the kit may therefore have any or all features, singularly or in combination, of the baggage dolly of the first aspect of the invention.

According to a fourth aspect of the invention, there is provided an autonomous baggage dolly comprising:

a cargo portion configured to hold baggage;

a drive system for driving the autonomous baggage dolly; and a controller configured to control the drive system in response to control signals;

a processor, operable in a plurality of different autonomy modes and changeable between said plurality of different autonomy modes, configured to provide control signals to the controller dependent on the autonomy mode in which it is operating;

a sensing system configured to provide at least one sensing output to the processor, the processor being configured to process the at least one sensing output to produce control signals to the controller;

wherein the processor is configured to change between the plurality of different autonomy modes in response to one or more mode triggers sensed by the sensing system.

The autonomous baggage dolly can therefore be enabled to operate in an autonomy mode that is most suitable for the circumstances in which the autonomous baggage dolly is operating.

The plurality of different autonomy modes may each relate to an SAE autonomy level.

The plurality of different autonomy modes may define a variable autonomy level.

The plurality of different autonomy modes may include an SAE Level 3 autonomy mode, and SAE Level 4 autonomy mode, and/or an SAE Level 5 autonomy mode.

When in the SAE Level 3 autonomy mode, the processor may be configured, in response to one or more event triggers, to request an operator input in order to continue providing control signals.

The operator input may include a human input from a human operator.

When in the SAE Level 4 autonomy mode, the processor may be configured, in response to one or more event triggers, to provide an operator output.

The operator output may include an output to a human operator

The processor may be configured to react to an operator input provided in response to its operator output.

When in the SAE Level 5 autonomy mode, the processor may act completely autonomously. For example, there may be no need for human intervention with or control of the baggage dolly.

The one or more mode triggers may be predetermined mode triggers. By "predetermined mode triggers" it is meant that the timing and/or position of the mode triggers is/are predetermined and therefore entirely predictable to the baggage dolly and/or operator. This is in contrast to event triggers, which may relate to unforeseen or unpredictable events or issues that may occur at random or in response to unexpected circumstances.

By providing predetermined mode triggers, the change of operating mode of the baggage dolly will be predictable. This means, for example, that an operator of one or more baggage dollies will be able to plan to be in a position to assist the baggage dolly when required, such as when the baggage dolly is forced to operate in a semi-autonomous or manual mode.

The one or more mode triggers and/or one or more event triggers may include at least one of a geospatial trigger, a temporal trigger, a visual trigger, and/or an electronic trigger.

Predetermined mode triggers may include a geospatial mode trigger. The geo-spatial mode trigger may change the autonomy mode of the baggage dolly based on a predetermined safety level of a given geographic area. For example, a geographical area that is populated mainly with autonomous vehicles may be determined to have a higher safety level, and therefore allowing a higher autonomy level, than a geographical area that is populated mainly with aircraft and/or people.

Predetermined mode triggers may include a weather-responsive mode trigger. The weather-responsive mode trigger may change the autonomy mode of the baggage dolly based on a predicted weather event. For example, if the weather forecast is for an electrical storm, the baggage dolly may be forced to operate in a lower autonomy mode or even a manual mode, to prevent electrical discharges interfering with the sensing system.

Predetermined mode triggers may include an expected pedestrian density trigger. The expected pedestrian density trigger may change the autonomy mode of the baggage dolly based on an expected pedestrian density of an area. The expected pedestrian density may change based on time, location, or other variables, but will be predictable to an operator.

The geospatial trigger may include the entry to or exit from a geo-fenced zone.

The baggage dolly may therefore be configured to operate differently in a first geo-fenced zone than in a second geo-fenced zone, perhaps dependent on the level of severity of any incident that may occur within such zones.

The visual trigger may include the detection of a road sign, traffic light, pedestrian crossing zone, hazard, pedestrian, human, or unexpected event.

The electronic trigger may include a signal receivable from a control centre.

According to a fifth aspect of the invention, there is provided an autonomous vehicle comprising:
    a drive system for driving the autonomous vehicle; and
    a controller configured to control the drive system in response to control signals;
    a processor, operable in a plurality of different autonomy modes and changeable between said plurality of different autonomy modes, configured to provide control signals to the controller dependent on the autonomy mode in which it is operating;
    a sensing system configured to provide at least one sensing output to the processor, the processor being configured to process the at least one sensing output to produce control signals to the controller;
    wherein the processor is configured to change between the plurality of different autonomy modes in response to one or more mode triggers sensed by the sensing system.

The autonomous vehicle can therefore be enabled to operate in an autonomy mode that is most suitable for the circumstances in which the autonomous baggage dolly is operating.

The autonomous vehicle may be an autonomous land vehicle.

The autonomous land vehicle may be an autonomous road vehicle.

The autonomous land vehicle is an autonomous baggage dolly.

The plurality of different autonomy modes may each relate to an SAE autonomy level.

The plurality of different autonomy modes may include an SAE Level 3 autonomy mode, and SAE Level 4 autonomy mode, and/or an SAE Level 5 autonomy mode.

When in the SAE Level 3 autonomy mode, the processor may be configured, in response to one or more event triggers, to request an operator input in order to continue providing control signals.

The operator input may include a human input from a human operator.

When in the SAE Level 4 autonomy mode, the processor may be configured, in response to one or more event triggers, to provide an operator output.

The operator output may include an output to a human operator

The processor may be configured to react to an operator input provided in response to its operator output.

When in the SAE Level 5 autonomy mode, the processor may act completely autonomously.

The one or more mode triggers and/or one or more event triggers may include at least one of a geospatial trigger, a temporal trigger, a visual trigger, and/or an electronic trigger.

The geospatial trigger may include the entry to or exit from a geo-fenced zone.

The vehicle may therefore be configured to operate differently in a first geo-fenced zone than in a second geo-fenced zone, perhaps dependent on the level of severity of any incident that may occur within such zones.

The visual trigger may include the detection of a road sign, traffic light, hazard, pedestrian, human, or unexpected event.

The electronic trigger may include a signal receivable from a control centre.

According to a sixth aspect of the invention, there is provided an autonomous baggage dolly comprising:
    a cargo portion configured to hold baggage;
    a drive system for driving the autonomous baggage dolly;

a controller configured to control the drive system in response to control signals;

a processor, operable in a plurality of different autonomy modes and changeable between said plurality of different autonomy modes, configured to provide control signals to the controller dependent on the autonomy mode in which it is operating; and a warning system for indicating a current autonomy mode of the autonomous baggage dolly, the warning system being configured to operate in a plurality of different warning modes, each warning mode being indicative of one or more of the different autonomy modes and automatically changeable in response to the controller changing between the plurality of different autonomy modes.

By indicating the current autonomy mode of the autonomous baggage dolly, observers or bystanders may be more aware of the likely movements of the baggage dolly and adjust their behaviour accordingly, if necessary.

The autonomous baggage dolly may further comprise additional lighting. The additional lighting may include beacons, headlights, work lights, indicators, hazard warning lights, or any other lights. The additional lighting may operate in conjunction with the light system to provide additional information about the baggage dolly, including future actions. For example, indicator lights may be used to indicate that the baggage dolly is about to change direction and hazard warning lights may indicate that the baggage dolly is carrying out a non-standard operation, such as a movement outside of a roadway, or that the baggage dolly has encountered an obstacle.

The plurality of different autonomy modes may include a first autonomy mode associated with a first warning mode and a second autonomy mode associated with a second warning mode.

Observers may therefore distinguish between the autonomy modes by noting a difference in the warning. Differences in the warning may, for example, be a difference in a colour of light or pitch, tone, or frequency of sound.

The first and second autonomy modes may relate to different SAE autonomy levels.

The first and second autonomy modes may relate to an autonomous mode and a manual mode, respectively.

The warning system may comprise a light system, the first warning mode being a first light mode and the second warning mode being a second light mode.

The first light mode may comprise the showing of a first colour of light and the second light mode comprises the showing of a second colour of light that is different to the first colour of light.

The plurality of different autonomy modes may include a third autonomy mode associated with a third warning mode. The third warning mode may be a third light mode.

The third autonomy mode may relate to a manual mode.

The third light mode may comprise the showing of a third colour of light that is different to the first and second colours of light.

Any types of warning may be used, such as, but not limited to, lights and sounds.

According to a seventh aspect of the invention, there is provided an autonomous vehicle comprising:

a drive system for driving the autonomous vehicle;

a controller configured to control the drive system in response to control signals;

a processor, operable in a plurality of different autonomy modes and changeable between said plurality of different autonomy modes, configured to provide control signals to the controller dependent on the autonomy mode in which it is operating; and a warning system for indicating a current autonomy mode of the autonomous baggage dolly, the warning system being configured to operate in a plurality of different warning modes, each warning mode being indicative of one or more of the different autonomy modes and automatically changeable in response to the controller changing between the plurality of different autonomy modes.

By indicating the current autonomy mode of the autonomous vehicle, observers or bystanders may be more aware of the likely movements of the vehicle and adjust their behaviour accordingly, if necessary.

The autonomous vehicle may be an autonomous land vehicle.

The autonomous land vehicle may be an autonomous road vehicle.

The autonomous land vehicle may be an autonomous baggage dolly.

The plurality of different autonomy modes may include a first autonomy mode associated with a first warning mode and a second autonomy mode associated with a second warning mode.

Observers may therefore distinguish between the autonomy modes by noting a difference in the warning. Differences in the warning may, for example, be a difference in a colour of light or pitch, tone, or frequency of sound.

The first and second autonomy modes may relate to different SAE autonomy levels.

The first and second autonomy modes may relate to an autonomous mode and a manual mode, respectively.

The warning system may comprise a light system, the first warning mode being a first light mode and the second warning mode being a second light mode.

The first light mode may comprise the showing of a first colour of light and the second light mode comprises the showing of a second colour of light that is different to the first colour of light.

The plurality of different autonomy modes may include a third autonomy mode associated with a third warning mode. The third warning mode may be a third light mode.

The third autonomy mode may relate to a manual mode.

The third light mode may comprise the showing of a third colour of light that is different to the first and second colours of light.

Any types of warning may be used, such as, but not limited to, lights and sounds.

According to an eighth aspect of the invention, there is provided a baggage dolly, comprising:

a cargo portion configured to hold baggage; and a weighing system configured to weigh cargo present within the cargo portion.

Cargo present in the cargo portion can then be weighed when in position on the baggage dolly and this information utilised by the baggage dolly or other systems.

The baggage dolly may further comprise:

a drive system for driving the self-propelled baggage dolly;

a controller configured to control the drive system;

a sensing system configured to provide at least one sensing output;

a processor configured to receive and process the at least one sensing output and to produce control signals in response to the at least one sensing output, the control signals being provided to the controller.

The baggage dolly may therefore operate autonomously, using information from the weighing system to modify the operation of other systems of the baggage dolly, if required or desired.

The weighing system may be configured to output a weight signal to the processor, the processor being configured to modify the control signals in response to the weight signal.

The weighing system may be configured to output a weight signal to a central controller of a baggage handling system.

The central controller may then modify control signals sent to the baggage dolly or any other baggage dolly in the baggage handling system in response to the weight signal, in order to, for example, change the order of delivery of baggage to a destination.

The weighing system may be configured to measure the total weight of the cargo present within the cargo portion. Alternatively or additionally, the weighing system may be configured to calculate a weight distribution of the cargo present within the cargo portion.

The weighing system may measure cargo weight using one or more weight sensors. The weight sensors may be provided as load cells. The weight sensors may instead or additionally be provided as part of a jacking system. The jacking system may comprise one or more jacks, wherein the or each jack comprises a weight sensor. The weight sensors in the jacking system may be pressure sensors.

Calculating a weight distribution may enable baggage or other cargo to be packed within the cargo area to achieve a desired weight distribution, such as an even weight distribution. The calculation of a weight distribution may also be used to automatically or manually manage the loading of an aircraft by loading the baggage or other cargo from the baggage dolly to the aircraft in a way to achieve a desired weight distribution within the aircraft.

According to a ninth aspect of the invention, there is provided a swarm system, comprising:
 a plurality of autonomous baggage dollies, each autonomous baggage dolly comprising:
  a cargo portion configured to hold baggage;
  a drive system for driving the autonomous baggage dolly;
  a controller configured to control the drive system in response to control signals;
  a sensing system configured to provide at least one sensing output;
  a processor configured to receive and process the at least one sensing output and to produce control signals in response to the at least one sensing output, the control signals being provided to the controller; and
  a communication system configured to provide a communication link between the autonomous baggage dollies;
 wherein each autonomous baggage dolly is configured to operate in a transmitting mode whereby it is configured to communicate at least one assistance signal to at least one other autonomous baggage dolly in the swarm system using the communication system;
 wherein the processor of each autonomous baggage dolly is further configured to operate in a receiving mode whereby it is configured to receive at least one assistance signal from at least one other autonomous baggage dolly in the swarm system and to selectively utilise the at least one assistance signal, the processor being configured to produce control signals from the at least one assistance signal.

The swarm system can therefore provide improved operation of tasks, in particular where a baggage dolly would otherwise become disabled through failure of a system such as a sensing system and/or allocation of tasks to dollies in dependency on criteria that results in improved efficiency of carrying out the tasks over current solutions.

The at least one assistance signal may include the at least one sensing output provided by the sensing system and/or assistance control signals produced by the processor for providing to the controller of an autonomous baggage dolly operating in the receiving mode.

Each autonomous baggage dolly may be configured to operate simultaneously in the transmitting mode and the receiving mode.

The sensing output of the sensing system of each autonomous baggage dolly may include at least one of position data, orientation data, image data, speed data, direction data, diagnostic data, and error data relating to itself. Any of these types of data may also be provided in relation to another baggage dolly as determined by processing data relating to another baggage dolly obtained from its sensing system The sensing output of the sensing system of each autonomous baggage dolly may be related to each autonomous baggage dolly and optionally the sensing output of the sensing system of each autonomous baggage dolly may be related to another one or more of the at least one other autonomous baggage dolly.

In the event of a fault in the sensing system of each autonomous baggage dolly, the processor of the said autonomous baggage dolly may be configured to produce control signals based on the at least one assistance signal received from an autonomous baggage dolly in the swarm system that is operating in the transmitting mode.

In the event of a fault in the sensing system of each autonomous baggage dolly, the processor of the said autonomous baggage dolly may be configured to transmit control signals received as a part of the at least one assistance signal received from an autonomous baggage dolly in the swarm system that is operating in the transmitting mode.

The processor may include a memory for storing mission data relating to a task to be completed by the swarm system.

The processor may be configured to produce control signals in response to the at least one sensing output and the mission data.

The at least one assistance signal may be responsive to the mission data.

The mission data may be receivable from a central controller.

According to a tenth aspect of the invention, there is provided a swarm system, comprising:
 a plurality of autonomous vehicles, each autonomous vehicle comprising:
  a drive system for driving the autonomous baggage dolly;
  a controller configured to control the drive system in response to control signals;
  a sensing system configured to provide at least one sensing output;
  a processor configured to receive and process the at least one sensing output and to produce control signals in response to the at least one sensing output, the control signals being provided to the controller; and a communication system configured to provide a communication link between the autonomous vehicles;

wherein each autonomous vehicle is configured to operate in a transmitting mode whereby it is configured to communicate at least one assistance signal to at least one other autonomous vehicle in the swarm system using the communication system;

wherein the processor of each autonomous vehicle is further configured to operate in a receiving mode whereby it is configured to receive at least one assistance signal from at least one other autonomous vehicle in the swarm system and to selectively utilise the at least one assistance signal, the processor being configured to produce control signals from the at least one assistance signal.

The swarm system can therefore provide improved operation of tasks, in particular where an autonomous vehicle would otherwise become disabled through failure of a system such as a sensing system.

The autonomous vehicle may be an autonomous land vehicle.

The autonomous land vehicle may be an autonomous road vehicle.

The autonomous land vehicle may be an autonomous baggage dolly.

The at least one assistance signal may include the at least one sensing output provided by the sensing system and/or assistance control signals produced by the processor for providing to the controller of an autonomous vehicle operating in the receiving mode.

Each autonomous vehicle may be configured to operate simultaneously in the transmitting mode and the receiving mode.

The sensing output of the sensing system of each autonomous vehicle may include at least one of position data, orientation data, image data, speed data, direction data, diagnostic data, and error data.

The sensing output of the sensing system of each autonomous vehicle may be related to each autonomous vehicle and optionally the sensing output of the sensing system of each autonomous vehicle may be related to another one or more of the at least one other autonomous vehicle.

In the event of a fault in the sensing system of each autonomous vehicle, the processor of the said autonomous vehicle may be configured to produce control signals based on the at least one assistance signal received from an autonomous vehicle in the swarm system that is operating in the transmitting mode.

In the event of a fault in the sensing system of each autonomous vehicle, the processor of the said autonomous vehicle may be configured to transmit control signals received as a part of the at least one assistance signal received from an autonomous vehicle in the swarm system that is operating in the transmitting mode.

The processor may include a memory for storing mission data relating to a task to be completed by the swarm system.

The processor may be configured to produce control signals in response to the at least one sensing output and the mission data.

The at least one assistance signal is responsive to the mission data.

The mission data may be receivable from a central controller.

According to an eleventh aspect of the invention, there is provided a baggage handling system comprising:
a baggage hall comprising:
a roadway having a first roadway portion and a second roadway portion;
at least one lateral interposed between the first roadway portion and the second roadway portion;
at least one loading bay on or adjacent to each of the at least one lateral; and
a baggage delivery system configured to transfer baggage from a baggage source to the at least one loading bay; and
at least one self-propelled baggage dolly according to the first aspect of the invention;
wherein each self-propelled baggage dolly is configured to be received at each loading bay and to receive baggage in its cargo portion from the baggage delivery system and to deliver baggage to a baggage receiver.

By using self-propelled baggage dollies, the baggage handling system can operate more effectively than known baggage handling systems. Space may be optimised for use with baggage dollies that are not part of a train and/or are not associated with a baggage tractor.

The self-propelled baggage dollies may be programmed to park in line at a lateral closer to each other than the length of a conventional tow bar that conventionally extends between baggage dollies of a baggage train.

The loading bays may therefore be spaced apart to reflect the spacing self-propelled baggage dollies parked in line.

The baggage receiver may be an aircraft.

The baggage handling system may further comprise a control system for directing self-propelled baggage dollies to available loading bays. Each baggage dolly may have a processor that is its own control system.

Baggage dollies can therefore proceed more quickly and efficiently to an available loading bay, when in the baggage hall. Additionally, they may take up less space along a lateral than a conventional baggage dolly as part of a baggage train.

A plurality of adjacent self-propelled baggage dollies may be parked along a lateral with no baggage tractor or towing bar joining adjacent baggage dollies. The plurality of dollies therefore takes up less space on the lateral than a baggage tractor and the same number of conventional baggage dollies forming a train behind the baggage tractor. Dollies fitted with a steering system proving them with the ability to travel in a lateral direction can further improve space utilisation as it allows for a dolly to enter or exit a space without the requirement of the adjacent space being empty.

The control system may be configured to direct each self-propelled baggage dolly separately to any other self-propelled baggage dolly.

By operating independently, each baggage dolly is free to operate in the most efficient manner. For example, a single self-propelled baggage dolly may be directed to a free space along a lateral that is too small for a conventional baggage tractor pulling a single conventional baggage dolly, let alone a baggage tractor and two or three baggage dollies in a train.

Each self-propelled baggage dolly may comprise a sensing system configured to provide at least one sensing output to the processor, the processor configured to process the at least one sensing output to produce control signals to the controller, to enable operation of the autonomous baggage dolly in an autonomous mode.

Autonomous baggage dollies may operate without second-by-second supervision from another control system such as the central controller.

The baggage handling system may further comprise a plurality of ULDs configured to hold baggage and to be received within the cargo portion of each self-propelled baggage dolly.

The baggage handling system may further comprise a ULD store configured to store empty ULDs.

The baggage handling system may further comprise at least one operation zone, each operation zone being associated with at least one predetermined rule that affects the operation of each self-propelled baggage dolly.

The operation of the baggage dollies can therefore be altered depending on the situation in which the baggage dolly is likely to be operating.

The at least one predetermined rule may include a speed limit, or operating mode of the self-propelled baggage dolly.

The operating modes of the self-propelled baggage dolly may include a first operating mode and a second operating mode which each relate to a different SAE autonomy level.

The first autonomy mode and second autonomy mode relate to a fully-autonomous mode and a semi-autonomous mode, respectively.

The baggage delivery system may be reactive to the presence of a self-propelled baggage dolly within a loading bay, to initiate delivery of baggage to said loading bay.

The loading process may therefore be more streamlined.

An entrance to and/or exit from the baggage hall may be automated to open and/or close in response to the approach and/or departure of a baggage dolly.

The baggage delivery system may include a monitoring system for detecting the presence of a self-propelled baggage dolly within each loading bay.

The baggage delivery system may be configured to provide baggage destined for different baggage receivers at different loading bays on the same lateral, such as different adjacent loading bays.

Each loading bay may have an associated baggage loading means for assisting with the loading of cargo onto the baggage dolly. The baggage loading means may include the features of the cargo moving system described previously.

The baggage loading means may include one or more rollers. The rollers may be powered to automatically move the cargo into the baggage dolly. Alternatively, the rollers may be passive and may simply assist an operative in manually loading the cargo. The baggage loading means may therefore include rollable elements and cargo wheels, as described in relation to the cargo moving system of the baggage dolly.

Baggage loading means may also be provided on baggage receivers such as aircraft. Thus, the loading and unloading of baggage or other cargo may be automated from a baggage source, to a baggage dolly, and on to a baggage receiver. The reverse operation may also be provided, from a baggage receiver, to a baggage dolly, and on to a baggage collection facility, such as a baggage carousel.

The baggage delivery system is therefore not limited to delivering baggage with the same destination to adjacent loading bays, as it would be were a baggage train to be being used.

The baggage delivery system may be configured to provide baggage destined for different baggage receivers at adjacent loading bays on the same lateral. This cannot be accomplished with a conventional baggage tractor and dolly arrangement as all dollies in the train will be destined for the same baggage receiver, and baggage dollies on adjacent trains will necessarily be separated by a baggage tractor.

The number of different loading bays and number of different baggage receivers may be at least three.

Thus, every loading bay in a row may be used by any baggage dolly, taking baggage to any destination, this not being dependent on the destination of any other baggage dolly. No loading bays are blocked or their use restricted by the presence of a baggage tractor.

Each of the three loading bays may be adjacent to at least one of the other two of the three loading bays.

The baggage handling system may be an aircraft baggage handling system.

The baggage receivers may include aircraft.

The baggage handling system may further comprise a calibration station. The calibration station may provide a location whereby a baggage dolly may calibrate its sensing system or check the calibration of its sensing system, Calibration and calibration checks of the dolly may be able to be carried out automatically by the dollies at the calibration stations. The calibration stations may be portable such that an operator may be able to recalibrate or check the calibration of a dolly in the field.

According to a twelfth aspect of the invention, there is provided a method of providing increased operational capacity of a baggage handling system comprising: a baggage hall comprising: a roadway having a first roadway portion and a second roadway portion; at least one lateral interposed between the first roadway portion and the second roadway portion; at least one loading bay on or adjacent to each of the at least one lateral; and a baggage delivery system configured to transfer baggage from a baggage source to the at least one loading bay; the method comprising:

delivering baggage to the cargo portion of at least one self-propelled baggage dolly according to the first aspect of the invention using the baggage delivery system when the self-propelled baggage dolly is received within one of the at least one loading bay; and causing the self-propelled baggage dolly to deliver baggage to a baggage receiver.

The step of causing the self-propelled baggage dolly to deliver baggage to the baggage receiver may be carried out once either the cargo portion of the self-propelled baggage dolly is full or there is no more baggage available to be delivered to the said baggage receiver, whichever is first.

Alternatively, the step of instructing the self-propelled baggage dolly to deliver baggage to the baggage receiver may be carried out in response when it is known that another self-propelled baggage dolly is available to transport some or all of the remaining baggage to be delivered to the said baggage receiver.

The method may further include the step of, prior to delivering baggage to a cargo portion of the self-propelled baggage dolly, determining whether a loading bay is vacant or will be vacant by an arrival time of the self-propelled baggage dolly and causing the self-propelled baggage dolly to travel to the loading bay if it is determined that the loading bay is vacant or will be vacant.

A higher throughput of baggage dollies can be achieved in this way by ensuring that a baggage dolly can be directed to a loading bay when it is empty or before it is empty, minimising the time during which the loading bay is not operating to load baggage onto the baggage dolly.

The method may further include the step of, prior to arrival of a baggage dolly at a loading bay, directing baggage to the loading bay such that the baggage can be loaded at or soon after the arrival of the baggage dolly at the loading bay. The baggage may be loaded into a ULD prior to being loaded onto the baggage dolly.

The baggage may be auto-loaded onto the baggage dolly once the baggage dolly is at the loading bay.

The baggage dolly may be caused to deliver baggage to the baggage receiver independently of any other baggage dollies.

Baggage dollies are therefore able to operate in the most efficient manner possible at any time.

The method may further comprise the step of instructing each self-propelled baggage dolly to proceed to an available loading bay.

An available loading bay to which a baggage dolly may be directed may be a loading bay with no other empty loading bays adjacent to the available loading bay. It is therefore possible for a baggage dolly to arrive at a loading bay on its own and take any available loading bay without requiring a plurality of loading bays to be available at the same time.

The step of providing baggage to the cargo portion of each self-propelled baggage dolly when the self-propelled baggage dolly is received within one of the at least one loading bay may be carried out automatically upon the receipt of the self-propelled baggage dolly within the loading bay.

The step of instructing the self-propelled baggage dolly to deliver baggage to a baggage receiver once either the cargo portion of the self-propelled baggage dolly is full or there is no more baggage available to be delivered to the said baggage receiver may be carried out automatically as soon as the cargo portion of the self-propelled baggage dolly is full or there is no more baggage available to be delivered to the said baggage receiver.

Each self-propelled baggage dolly may comprise a sensing system configured to provide at least one sensing output to the processor, the processor configured to process the at least one sensing output to produce control signals to the controller, to enable operation of the autonomous baggage dolly in an autonomous mode.

A cargo portion is provided as a part of each baggage dolly described in any aspect of the invention. In any of the aspects of the invention, the cargo portion may occupy at least 50%, at least 60%, at least 70%, at least 80%, at least 90%, or substantially all of a plan area of the baggage dolly. By plan area, it is meant the area of the baggage dolly viewed from directly above the baggage dolly.

According to a thirteenth aspect of the invention, there is provided a method of arranging self-propelled baggage dollies at a lateral of a baggage hall, the method comprising:
positioning a first self-propelled baggage dolly according to the first aspect of the invention at the lateral; and
positioning a second self-propelled baggage dolly according to the first aspect of the invention at the lateral;
wherein, when positioned, a distance between the platform of the first self-propelled baggage dolly and the second self-propelled baggage dolly is less than a predetermined distance.

The predetermined distance may be less than the typical length of a tow bar of a conventional baggage dolly.

Where the predetermined distance is less than the spacing required to manoeuvre a baggage dolly away from a lateral, for example where baggage dollies are positioned at a lateral with zero spacing between them, the method may further comprise the step of the baggage dollies being configured to coordinate movement to increase the spacing around one or more baggage dollies in order to allow them to leave their respective loading bays and may then return to their initial positions. This tactic could also be used in order to allow a baggage dolly to manoeuvre into a loading bay.

The predetermined distance may be less than 1500 mm, less than 1000 mm, less than 500 mm, or less than 250 mm. The predetermined distance may be zero or approximately zero.

The method may further comprising the steps of positioning further self-propelled baggage dollies at the lateral, each self-propelled baggage dolly being spaced from an adjacent self-propelled baggage dolly by less than the predetermined distance.

According to a fourteenth aspect of the invention, there is provided a method of arranging self-propelled baggage dollies at a lateral of a baggage hall, the method comprising:
positioning a first self-propelled baggage dolly according to the first aspect of the invention at the lateral, the first self-propelled baggage dolly being configured to deliver baggage to a first destination; and
positioning a second self-propelled baggage dolly according to the first aspect of the invention at the lateral, the second self-propelled baggage dolly being configured to deliver baggage to a second destination;
wherein the first destination and the second destination are different.

The first and second self-propelled baggage dollies may be positioned immediately adjacent each other on the same side of the same lateral.

The method may further comprise the step of positioning a third self-propelled baggage dolly according to the first aspect of the invention at the lateral, the third self-propelled baggage dolly being configured to deliver baggage to a third destination.

The third destination may be different to one or both of the first and second destinations. The first, second, and third baggage dollies may be in a contiguous line at the same side of the same lateral.

Each destination may be an aircraft.

According to a fifteenth aspect of the invention, there is provided a method of loading, or of organising loading, of an aircraft, the method comprising the steps of:
weighing the cargo of at least two baggage dollies according to the eighth aspect of the invention; and
causing the at least two baggage dollies to arrive at the aircraft in an order determined by the weight of the cargo of each baggage dolly and at least one requirement of the aircraft.

The at least one requirement of the aircraft may be a desired weight distribution of the aircraft.

The at least two baggage dollies may be autonomous baggage dollies and may be caused to arrive at the aircraft in the order by receiving instructions from a controller.

The controller may be a central controller for managing the baggage dollies.

The controller may be a processor of one or more of the baggage dollies.

According to a sixteenth aspect of the invention, there is provided a baggage dolly comprising:
a cargo portion configured to hold cargo; and
a locking system configured to automatically lock or secure cargo within the cargo portion.

The baggage dolly may comprise a self-propelled baggage dolly, an autonomous baggage dolly, and/or a conventional baggage dolly. The conventional baggage dolly may form part of a baggage train and/or may be pulled by a baggage tractor.

The cargo may comprise a ULD.

For example, the locking system may include sensors that detect the presence of a ULD and initiate the application of locking or retaining means, for example latches. A processor may process information received from the locking system and may initiate automatic locking of the locking system. The locking system may be mechanical, for example using a sprung latch mechanism.

In this way, the ULD may be prevented from falling off the baggage dolly during use, without requiring the intervention of any operator.

The locking system may include an alert for indicating that a ULD on the baggage dolly is not secured by the locking system, i.e. when the locking system has failed to lock due to misalignment of the ULD or some malfunction of the locking system.

The locking system may be configured to alert the operator of a baggage train containing the baggage dolly that the cargo is not secured correctly. The operator of the baggage train may be a baggage tractor driver. The alert may be configured to be provided to a cab or driving position of a baggage tractor.

The alert may include a visible or audible alert for alerting an operator of the baggage dolly. The alert may additionally or alternatively include a movement prevention means for preventing movement of the baggage dolly when cargo or a ULD is present but not secured. The movement prevention means may include the generation of a signal that acts to prevent movement of the drive system, or may include a brake or other means that physically prevents movement of the baggage dolly.

According to a seventeenth aspect of the invention, there is provided a baggage dolly comprising: a cargo portion configured to hold cargo; a locking system for locking or securing cargo within the cargo portion; and an alert for indicating that cargo on the baggage dolly is not secured by the locking system.

The locking system may be configured to alert the operator of a baggage train containing the baggage dolly that the cargo is not secured correctly. The operator of the baggage train may be a baggage tractor driver. The alert may be configured to be provided to a cab or driving position of a baggage tractor.

The alert may include a visible or audible alert for alerting an operator of the baggage dolly. The alert may additionally or alternatively include a movement prevention means for preventing movement of the baggage dolly when cargo or a ULD is present but not secured. The movement prevention means may include the generation of a signal that acts to prevent movement of the drive system, or may include a brake or other means that physically prevents movement of the baggage dolly.

According to an eighteenth aspect of the invention, there is provided a method of operating a plurality of autonomous baggage dollies, comprising:
causing the plurality of autonomous baggage dollies to travel together in a predetermined formation.

The formation may comprise a line, wherein the line comprises a lead baggage dolly followed by a succession of following baggage dollies.

The baggage dollies may be configured to communicate sensing data with one another in order to respond as a unit to triggers or events.

The gap between autonomous baggage dollies in the predetermined formation may be less than the space required for a person to pass between the baggage dollies.

The baggage dollies in the predetermined formation may be configured to share electrical power between adjacent dollies.

Each baggage dolly may therefore include at least one electrical connector that enables power-sharing between baggage dollies.

The predetermined formation may be termed a "platoon", each baggage dolly being configured to operate in a platoon mode.

According to a nineteenth aspect of the invention, there is provided a baggage train comprising:
an internal combustion-powered baggage tractor; and
at least one self-propelled baggage dolly according to the first aspect;
wherein the internal combustion-powered baggage tractor is configured to provide electrical power to recharge the self-propelled baggage dolly.

The electrical power may be provided by an electrical connector extending between the internal combustion-powered baggage tractor and the self-propelled baggage dolly.

The internal combustion-powered baggage tractor may further be configured to guide the self-propelled baggage dolly via a guiding system of the self-propelled baggage dolly.

The internal combustion-powered baggage tractor may further be configured to transmit a motive force to the self-propelled baggage dolly in a situation where the self-propelled baggage dolly is not providing its own motive force. For example, the internal combustion-powered baggage tractor may provide a motive force where the self-propelled baggage dolly cannot provide its own driving force, such as in extreme temperature conditions or when a fault has occurred that prevents self-propulsion.

The electrical power may be transferred during movement of the baggage train and/or whilst the baggage train is stationary.

The motive force may be transmitted to the self-propelled baggage dolly through the guiding system. The guiding system may include a guiding arm.

The electrical power may additionally or alternatively be transmitted through the guiding arm, which may operate as an electrical connector.

According to a twentieth aspect of the invention, there is provided a method of positioning a self-propelled baggage dolly at a lateral, the method comprising:
finding a space large enough for only a single self-propelled baggage dolly; and
positioning the self-propelled baggage dolly within the space.

The self-propelled baggage dolly can therefore position itself in any space at a lateral that is large enough for itself. This is in contrast to conventional baggage dollies that are part of baggage trains, where the space must be large enough to fit the baggage dolly, a baggage tractor, and any other baggage dollies attached to the baggage train.

The space may be a loading bay.

According to a twenty first aspect of the invention, there is provided an airside dolly having a rear to front longitudinal extent with a first set of normal driving wheels for driving distances between places on an airport and a normally undeployed deployable docking set of wheels capable of being deployed for sideways movement of the dolly, the docking set of wheels being disposed generally perpendicularly to the longitudinal direction of the dolly and when deployed in place of the normal driving wheels enabling the dolly to move sideways to dock against other dollies or laterals by approaching them sideways generally perpendicularly to the extent of the other dolly or lateral.

According to a twenty second aspect of the invention, there is provided an airside dolly comprising a user interface. The user interface may comprise a display and a user input means. The user interface may enable an operator to enquire as to the current status of the dolly. The current status of the dolly may comprise information relating to at least one of a cargo currently being carried by the dolly, an intended destination of the dolly, a current task of the dolly, a next task of the dolly, a route the dolly is intending to follow, and a state of charge of the dolly. The user interface may enable an operator to confirm or modify a set task of the dolly.

According to a twenty third aspect of the invention, there is provided an airside dolly comprising a display. The display may be operable to display information relating to at least one of cargo currently being carried by the dolly, an intended destination of the dolly, a current task of the dolly, a next task of the dolly, a next turning the dolly maybe planning to take, a manoeuvre the dolly may be making or be about to make, and a state of charge of the dolly.

The airside dolly of ach of the preceding three aspects may be a self-propelled airside dolly, and may further be a self-propelled airside dolly operable in at least one autonomous mode.

According to a twenty fourth aspect of the invention, there is provided an airside dolly configured to operate in a start-up mode. The start-up mode may determine a calibration status of at least one sensor of the dolly. The start-up mode may allow the dolly to enter service if a positive calibration status is determined. The start-up mode may not allow the dolly to enter service if a negative calibration status is determined. The start-up mode may implement recalibration of the at least one sensor if a negative calibration status is determined. The start-up mode may be implemented through or make use of a calibration station.

The present invention will now be described with reference to the accompanying drawings, in which.

BAGGAGE DOLLY

Figure 1:
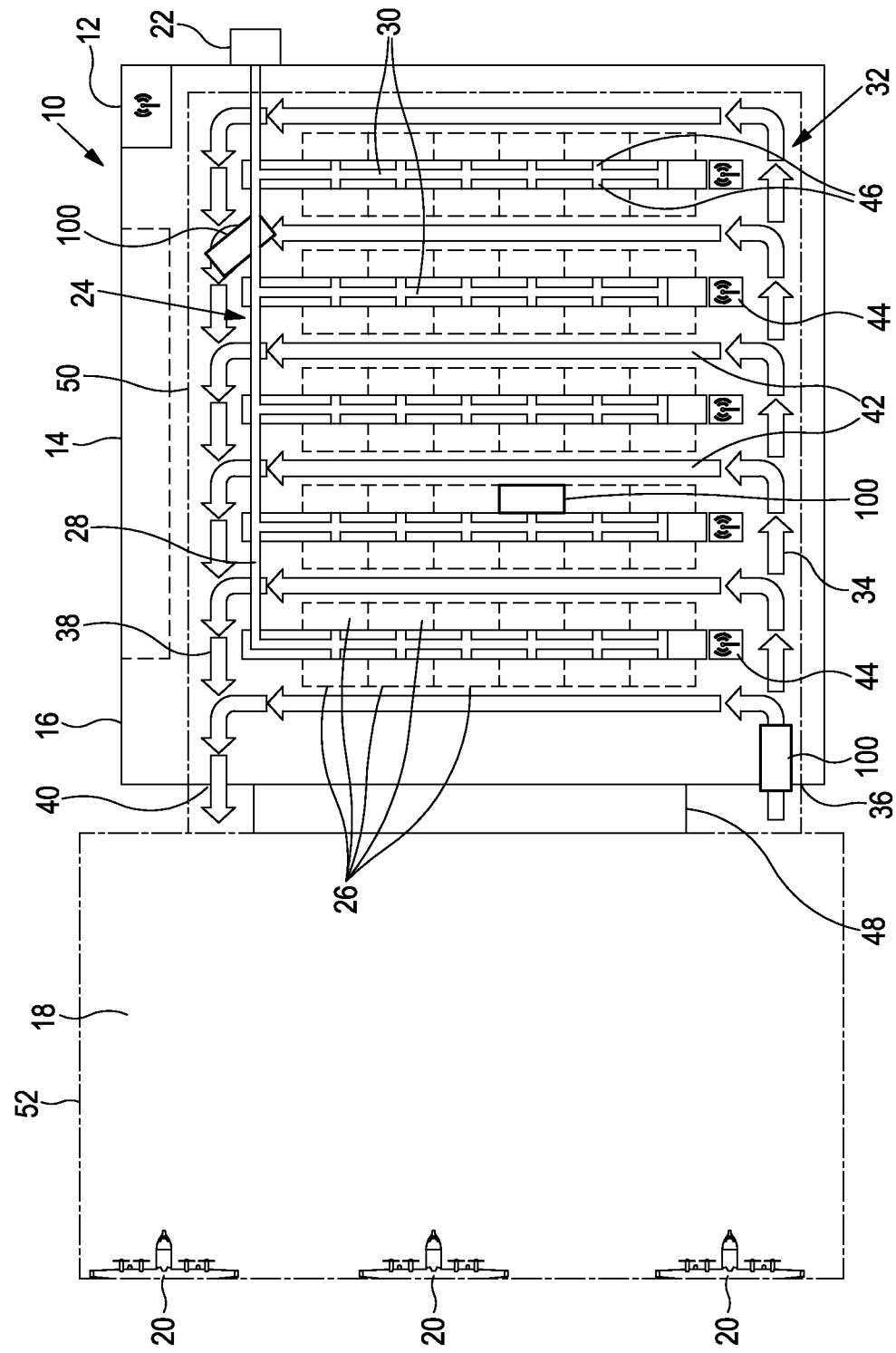
FIG. 1 is a diagrammatic plan view of a baggage handling system according to the disclosure.
Figure 2:
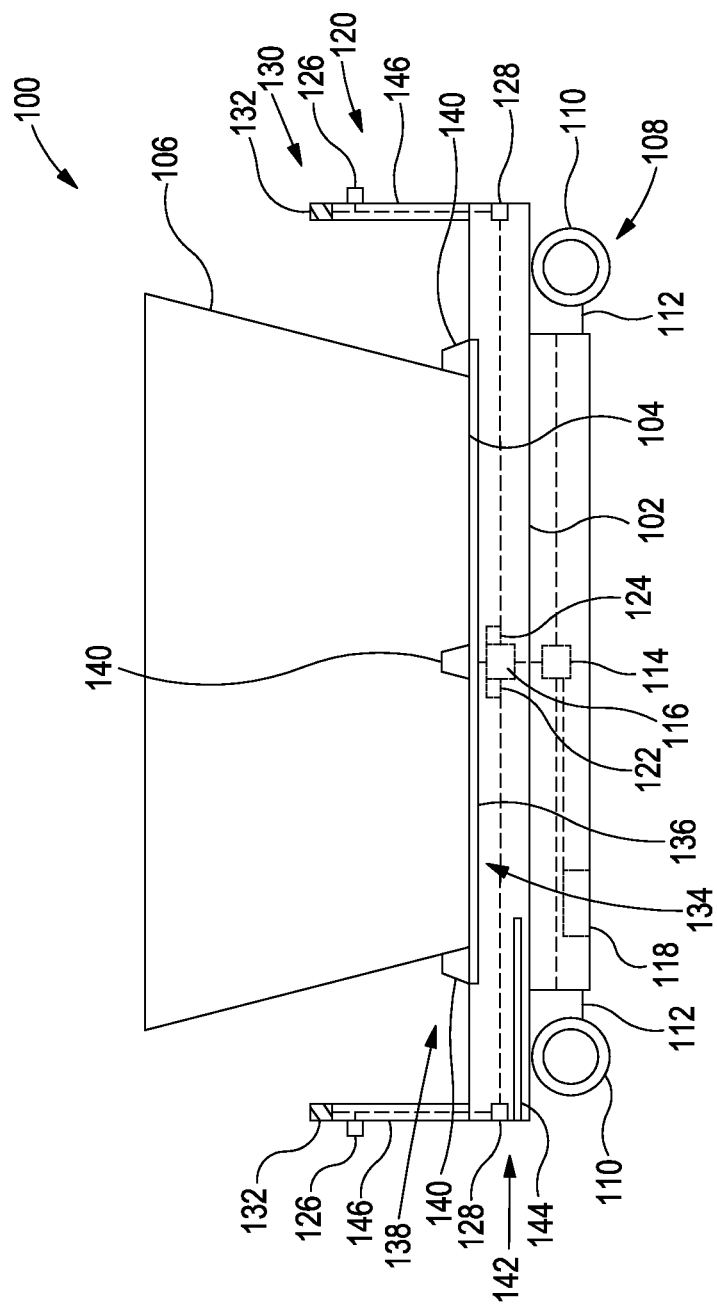
FIG. 2 is a side view of a baggage dolly according to the disclosure.
Figure 3:
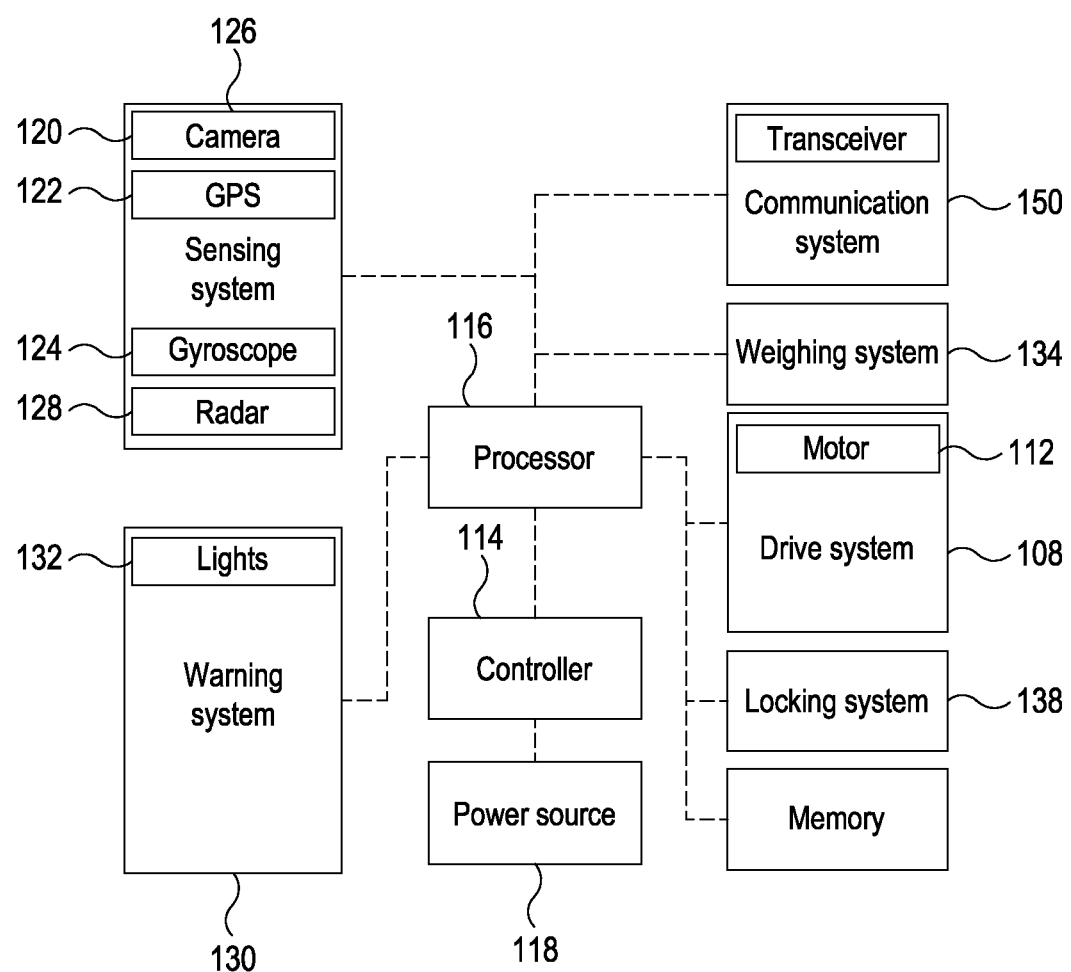
FIG. 3 is a block diagram of the systems and controls of the baggage dolly of FIG. 2.

Referring firstly to FIG. 2, there is shown a baggage dolly 100. The baggage dolly 100 is designed to operate within a baggage handling system 10 as shown in FIG. 1, which will be described in detail later.

The baggage dolly 100 includes a platform 102 that forms a cargo area or cargo portion 104 within which cargo is received. The cargo shown is a unit load device (ULD) 106, which is configured to carry baggage within the baggage handling system 10 of FIG. 1. ULDs 106 are common in the art and can be loaded with baggage or other goods to be delivered to a baggage receiver such as a passenger aircraft or cargo aircraft. ULDs 106 are therefore designed to be filled whilst in situ on a baggage dolly 100, or alternatively to be filled and then loaded when full onto a baggage dolly 100, and then passed as a unit from the baggage dolly 100 to a hold of an aircraft.

The platform 102 is propelled by a drive system 108 comprising four wheels 110 provided in pairs towards each end of the platform 102 and a series of electric motors 112 that provide motive power to the wheels 110. In the present embodiment, a motor 112 is provided for each wheel 110, but a motor 112 could instead be provided for each pair of wheels 110 or a single motor 112 could power all of the wheels 110. Although all four wheels 110 of the present embodiment are powered, any number of the wheels 110 could be provided, and could be powered.

The drive system 108 is controlled by a controller 114 that receives control signals from a processor 116. In response to these control signals, the drive system 108 can control the baggage dolly 100 to move forwards, backwards, and steer, providing full control of the motion of the baggage dolly 100. Although the depicted embodiment provides steering by differential control of the motor 112 of each wheel 110, a separate steering system that controls any of—and optionally all of—the wheels 110 could be provided instead. For example a steering system is provided in some examples which provides rotation of the wheels. The rotation may be from the straight ahead position (i.e. 0°) and up to +/−30°, +/−45°, +/−70°, +/−80°, +/−90°, +/−100°, +/−110°, +/−135°, +/−180°, +/−270° or +/−360°. Examples in which all of the wheels which are ground engaging ae steerable together allows the dolly to translate linearly in a non-longitudinal motion. This provides increased manoeuvrability over dollies with no steering and even dolly that have steering but only a single axle steer able, or even twin axle steering. Being able to steer the wheels to a position transverse, and preferably substantially perpendicular, to the longitudinal direction allows for the dolly to translate substantially sideways into and out of spaces.

In other examples only one of the axles is steered, for example the front axle.

One particular benefit of providing full control of each individual baggage dolly—i.e. forward, reverse, and steering—is that this movement gives far greater freedom of motion than a conventional baggage dolly formed as a train with a baggage tractor and optionally one or more other conventional baggage dollies. As a specific example, most trains are formed of a baggage tractor and at least two baggage dollies, thus making reverse motion effectively impossible to achieve. This can severely limit the manoeuvrability of baggage trains and necessitates that baggage trains must arrive at an aircraft from a single direction or a limited number of directions. The enhanced manoeuvrability of a self-propelled or autonomous baggage dolly allows baggage dollies to approach from any direction and then to manoeuvre themselves into a position from which cargo can be unloaded. As well as being able to approach an aircraft or other loading/unloading position from any direction, independently, self-propelled or autonomous baggage dollies as described may be able to carry out other complicated manoeuvres such as parallel parking or three-point turns, which would not be possible from a conventional baggage dolly. The greater freedom of motion can also be enhanced by providing the dolly steering means to travel in more than just a longitudinal direction and rotating either left or right. With a steering system that allows the wheels of the dolly to be rotated up from the usual straight ahead direction the dolly is provided the ability to traverse sideways or "crab", thereby allowing the dolly to enter and exit spaces without the requirement of there being a longitudinal gap prior to the space by which a dolly can manoeuvre through. In other words a dolly is operable to enter a loading bay without the requirement of the loading bay before it being vacant, and can exit a loading bay without the requirement of the loading bay after it being vacant. In some other examples the steering system may not have as great a range of rotation, but is still able to provide om crabbing functionality which may be used to increase manoeuvrability still.

The baggage dolly 100 includes a number of other systems that operate in conjunction with the processor 116 to provide additional features to the baggage dolly 100. As will become clear in the present disclosure, unless otherwise stated, any of these features may be used on their own or in conjunction with any other system in order to provide the benefits of each system separately.

The systems, including the drive system 108, controller 114, and processor 116, are powered by an on-board electrical power supply, which in the present embodiment is a battery 118. More specifically, the electrical power supply is provided by a number of lead-acid batteries. A benefit of these batteries 118 is that they are cheap whilst retaining a power density that is sufficient for operation of the baggage dollies 100. Although lead-acid batteries are not as power-dense as similarly-sized Li-ion or Li—Po batteries, they are sufficient for operation and offer advantages such as high reliability, broad range of operating temperatures, and have a long lifecycle.

In the present embodiment, the electrical power supply comprises six lead-acid batteries, at 8v, each having a power storage of 3.5 kWh. However, other embodiments may include any other number, type, voltage, and power of batteries or other electrical charge storage systems that are capable of providing the required power to run the baggage dolly.

Sensing System

In order to enable autonomy—whether full autonomy or partial autonomy—a sensing system 120 is provided in the baggage dolly 100. The sensing system 120 as shown includes a GPS sensor 122, a gyroscopic sensor 124, four camera sensors 126, and four LIDAR sensors 128. One of each of the camera sensors 126 and LIDAR sensors 128 are positioned towards each end of the platform 102. The GPS sensor 122 and gyroscopic sensor 124 are positioned centrally within the platform 102, adjacent to the processor 116. The camera sensors 126 and LIDAR sensors 128 are mounted on pylons positioned at the four corners of the platform.

Each of the sensors of the sensing system 120 communicates with the processor 116 to provide sensing data to the processor 116. The sensing data can include position data of the baggage dolly 100, orientation data of the baggage dolly 100, image or visual data of the surroundings of the baggage dolly 100, speed and direction data of the baggage dolly 100, and distance data of objects surrounding the baggage dolly 100. Other forms of sensing data may also be provided, as will be known to the skilled person when considering providing autonomy to a vehicle. The sensing data can therefore be processed by the processor 116 in order to obtain information about the baggage dolly 100 and its surroundings. The way in which sensing data is processed by the processor 116 in order to provide this information will be well-known to the skilled person.

For example, image data provided by the camera sensors 126 may allow the processor 116 to detect objects within a field of view provided by each camera sensor 126. In order to provide depth perception, each camera sensor 126 may include two sensing elements, allowing determination of depth through the use of parallax. Alternatively, or in addition, the image data may be augmented by use of distance data provided by the LIDAR sensors 128. Other sensors may also be used for measuring distance. Distance data may be measured using ultrasonic sensors. Other distance sensors may also be used, particularly for near field sensing, allowing the LIDAR sensors 128 to be focused on further field distance sensing. The sensing data can provide the baggage dolly 100 with information about its position, either absolute or relative to known objects, and help it to complete a task or mission through use of the sensing data.

Any number of sensors may be provided in order to provide sensing data to the processor 116. Such sensors may include those described above and may include in addition or alternatively any other sensors, such as radar sensors, magnetic field sensors, rotating camera sensors, differential GPS, or any other form of sensor.

Of course, the sensing system 120 can be useful for providing autonomous operation of the baggage dolly 100, but can also be beneficial in other ways. For example, the current system of controlling baggage dollies is to tow them behind baggage tractors which are driven by human drivers. In order to ensure that the baggage dollies are lined up and in a desired position, for example for loading and unloading, the baggage dollies are often dragged up against walls, impacting and scraping walls in many cases. This is a deliberate act in order to get the baggage dollies as close as possible to a load or unload position. It is also the case that impacts and scrapes can be caused accidentally through poor judgement or lack of driver skill or attention. For example, when pulling a train of three baggage dollies around a corner, it is not uncommon for one or more of the baggage dollies to hit a raised curb, platform, or corner marker such as a bollard.

For this reason, baggage dollies are made to be incredibly resilient to impacts and damage. This is normally achieved by forming them from steel, which is both resistant to impact and can be quickly and easily repaired if any damage is too severe. However, this also results in each baggage dolly having a larger mass than would otherwise be necessary for providing the requisite strength to carry cargo.

A sensing system 120 can help to prevent impacts, scrapes, and damage, especially when operating in an autonomous mode of some kind. By preventing or limiting any sort of activity where the autonomous baggage dollies 100 could be damaged, it is no longer a requirement that the baggage dolly 100 is resistant to damage. Therefore, the structure of the baggage dolly 100 can be altered so that it is lighter and may be formed from different materials, for example aluminium or fibre composites. In this way, weight can be saved, making the baggage dolly 100 easier to manoeuvre and more energy-efficient to propel. In addition, having a self-propelled baggage dolly that can self-steer can assist when if the dolly were to be part of a train, in that the dollies may steer themselves to avoid obstacles.

The mass of a baggage dolly 100, which in known implementations can be around 1000 kg, can therefore be brought down by changes to the design and materials used in production. The weight may be dependent on the number of batteries used or the materials used for construction but advantageously may be less than 900 kg, less than 800 kg, less than 700 kg, less than 600 kg, or less than 500 kg. A typical weight may be around 500 to 700 kg.

Another sensor used on the dolly may be a scanner or other sensor for determining a loaded cargo onto the dolly. Various cargo types, such as ULDs, may comprise a scannable element, such as a bar code or QR code. The dolly may be configured to automatically scan a loaded cargo in order to ascertain the cargo type and/or the cargo's intended destination (or a human may scan the loaded cargo). This cargo type and/or destination data may then be used to determine a dolly's destination and a path to said destination.

Autonomy

The sensing system 120 of the depicted embodiment provides enough sensing data to allow the baggage dolly 100 to operate autonomously. The processor 116 contains the requisite circuits and processing power to process the sensing data to provide control signals in response to operate in an autonomous mode. In the autonomous mode, the baggage dolly 100 is able to drive itself around using control signals generated by the processor 116 in response to the sensing system 120, the control signals being provided to the drive system 108 and the other systems, as required.

Autonomous operation of the baggage dolly 100 may enable it to travel with zero or low operator input, depending on the level of autonomy required in the circumstances. Different levels of autonomy are defined by the Society of Automation Engineers (SAE) as SAE Autonomy Levels. The SAE Autonomy Levels are summarised in the following Table 1:

TABLE 1

SAE Automation Levels

| SAE Autonomy Level | Level of Autonomy | Definition |
|---|---|---|
| 0 | No automation | Full-time performance of all aspects of driving by a human driver, possibly supplemented by enhanced warning or intervention systems. |
| 1 | Driver assistance | Driving-mode specific assistance relating to steering, acceleration, and/or deceleration, using information about the driving environment, with expectation of all remaining aspects being performed by a human driver. |
| 2 | Partial automation | Driving-mode specific execution of steering, acceleration, and deceleration, using information about the driving environment, with expectation of all remaining aspects being performed by a human driver. |
| 3 | Conditional automation | Driving-mode specific performance of all aspects of a dynamic driving task by an automated driving system, with expectation of appropriate intervention of a human driver when requested. |
| 4 | High automation | Driving-mode specific performance of all aspects of a dynamic driving task by an automated driving system, even when a human driver fails to respond to a request for intervention. |
| 5 | Full automation | Full-time performance of all aspects of a dynamic driving task by an automated driving system, under all conditions that would otherwise be expected to be managed by a human driver. |

With the above definitions in mind, the sensing system 120 may enable the baggage dolly 100 to operate in an SAE Level 3 Autonomy Mode, an SAE Level 4 Autonomy Mode, and/or an SAE Level 5 Autonomy Mode.

In the SAE Level 3 Autonomy Mode, the baggage dolly 100 may be able to operate fully-autonomously up to a point at which an unexpected event occurs such as the presence of an unexpected object in the path of the baggage dolly 100, for example the presence of a human outside of a designated walkway. In such an autonomy mode, the baggage dolly 100 will then request intervention from a central controller 12, such as in the depicted baggage handling system 10 of FIG. 1, described in detail below, where a human operator may provide an input to allow the baggage dolly 100 to proceed or a manual input to determine the next steps taken by the baggage dolly 100. Without intervention from the central controller 12, the baggage dolly 100 will not resume normal operations.

In comparison, when operating in the SAE Level 4 Autonomy Mode, the baggage dolly 100 may request intervention in the same circumstances as when operating in the SAE Level 3 Autonomy Mode. However, if a response from the central controller 12 is not forthcoming after a request for intervention, the baggage dolly 100 will proceed to deal with the unexpected event in the way it deems appropriate, depending on its programming.

Finally, when the baggage dolly 100 is operating in the SAE Level 5 Autonomy Mode, the baggage dolly 100 will continue to operate autonomously in all circumstances, even when confronted with an unexpected event, without any request or requirement for intervention from the central controller 12 or human operator.

It will be apparent to the skilled person how to provide the desired autonomy levels to the baggage dolly 100. Moreover, it will be known in the context of the present disclosure that many different autonomy levels may be provided, with different instructions for operation, for example as to what unexpected events should be dealt with autonomously and what unexpected events should be referred for intervention.

Providing the baggage dolly 100 with autonomous operation allows each baggage dolly 100 to operate without the need for a baggage handler driving a baggage tractor that can pull the individual baggage dolly 100. Moreover, in contrast to known baggage dollies, which are configured as trains of two or three baggage dollies behind a baggage tractor, an autonomous baggage dolly 100 can operate independently of other baggage dollies 100. The advantages of such a system are numerous. For example, autonomy allows each baggage dolly 100 to collect and deliver baggage independently of any other vehicle, including other baggage dollies 100 and baggage tractors. Independent operation not only allows individual delivery of loads of baggage or other cargo, such as by the ULD 106 depicted, but also enables the baggage handling system 10 to operate with a higher throughput and in a more efficient manner, as is described below.

Autonomous operation also allows baggage dolly 100 to benefit from a power-monitoring system that is provided as a part of the processor 116. If it is determined that the baggage dolly 100 is short of power, such as when the voltage of the battery 118 drops below a predetermined voltage, the baggage dolly 100 can travel to a battery station where it may be recharged, for example by connecting itself to a recharging station 14, or may switch its batteries 118 automatically or with external assistance, or through positioning itself over an inductive charging pad. Once recharged or otherwise replenished with electrical power, the baggage dolly 100 may resume normal operations.

Each of the recharging options may be either automatic or manually operated. When reaching a low charge state the dolly 100 will ensure that it retains enough charge to make its way to the recharging station 14 from its current location. The dolly 100 can then plot a route to the recharging station 14 in order to commence recharging. In a swarm system 1000 the dollies may be organised such that they return for charging in a way that maximises utilisation and minimises waiting. Therefore, even if a dolly 100 has enough charge for more trips or tasks it may return for a recharge if a slot becomes available. Using the sensing system the dolly is operable to locate itself within and manoeuvre to a specified area. The dolly may use one or more of the sensors data types output from within the sensing system, including one or more of the position data, distance data, image data and orientation data. Locating itself in a specific position may allow for the implementation of automatic charging systems, such as inductive charging, automatic battery swaps, or a plug—on to which the dolly can position itself, or which may be provided on a robotic arm for locating to a socket on the dolly 100. In some examples the dolly need only manoeuvre to an approximate location and the recharging can be implemented manually by a human or machine operator, by plugging in a charging cable or swapping in fully charged batteries for example.

Blended Autonomy

Although operation in one or more of the autonomy modes described above may be sufficient for the required tasks of the baggage dolly 100, it may be preferable for the baggage dolly 100 to switch between autonomy modes by use of a system referred to herein as blended autonomy. Blended autonomy may enable the baggage dolly 100 to operate in the autonomy mode deemed most suitable for the specific situation in which the baggage dolly 100 is operating and may therefore provide the benefit of an SAE Level 5 Autonomy Mode without completely sacrificing the safety advantages of SAE Level 3 or 4 Autonomy Modes.

Whilst baggage dollies, cargo dollies and airside dollies in general are the focus of this example, it will be appreciated that the concept is equally applicable to other forms of transport. For example other airside ground equipment such as fuel trucks, portable stairs, scissor lifts, shuttle buses and similar may also operate in a blended autonomy mode. Other applications may also extend outside of the airport environment, for example in road going vehicles, passenger vehicle or other non-airport environments. In some situations, it may also be necessary to revert the operation of the baggage dolly to an autonomy mode whereby a level of manual control is required. For example, where the baggage dolly enters an area that is known to have a high density of pedestrians, it may be predetermined that this area is unsuitable for any level of autonomous operation. Thus, an operator may be required to manually control the baggage dolly whilst it is in this area. Once the baggage dolly leaves the area, it may automatically revert to a level of autonomous operation.

Blended autonomy works on the premise that specific events or circumstances, termed mode triggers, will prompt the baggage dolly 100 to switch between autonomy modes. Specific examples of mode triggers may include: the movement of a baggage dolly 100 from within a baggage hall 16 to an airfield 18; a visual trigger such as the presence of a specific road sign or other indicator of a runway, taxiway, pedestrian crossing, or recognition of a human in a predetermined position relative to the baggage dolly; or a signal from a central controller 12 that may indicate adverse weather conditions.

The baggage dolly 100 may therefore be programmed to operate when within a baggage hall 16 in an SAE Level 5 Autonomy Mode. As the baggage hall 16 is a highly-controlled space, and therefore highly predictable, this level of automation may be assumed to be completely safe, and therefore each baggage dolly 100 may be entrusted with determining how to deal with any unexpected events that may occur. The use of multiple automated baggage dollies 100 within the baggage hall 16 may contribute to its predictability, further enhancing suitability for baggage dollies 100 operating in SAE Level 5 Autonomy Level.

In contrast, an airfield 18 may be more unpredictable due to the presence of aircraft 20, which due to their human pilots may inevitably more unpredictable. It may therefore be desirable to ensure that in some circumstances, for example when a baggage dolly 100 senses that an aircraft 20 is in a position that it is not usually expected, that a baggage dolly 100 may request intervention from a human operator before continuing on its journey. Thus, a mode trigger of a baggage dolly 100 passing from a baggage hall 16 to an airfield 18 may result in the baggage dolly 100 being automatically switched from an SAE Level 5 Autonomy Level to an SAE Level 3 Autonomy Level, to ensure that event triggers such as the presence of an aircraft 20 in a position where it is not usually expected results in the baggage dolly 100 requiring human intervention before it proceeds to return to normal operation.

Figure 6:
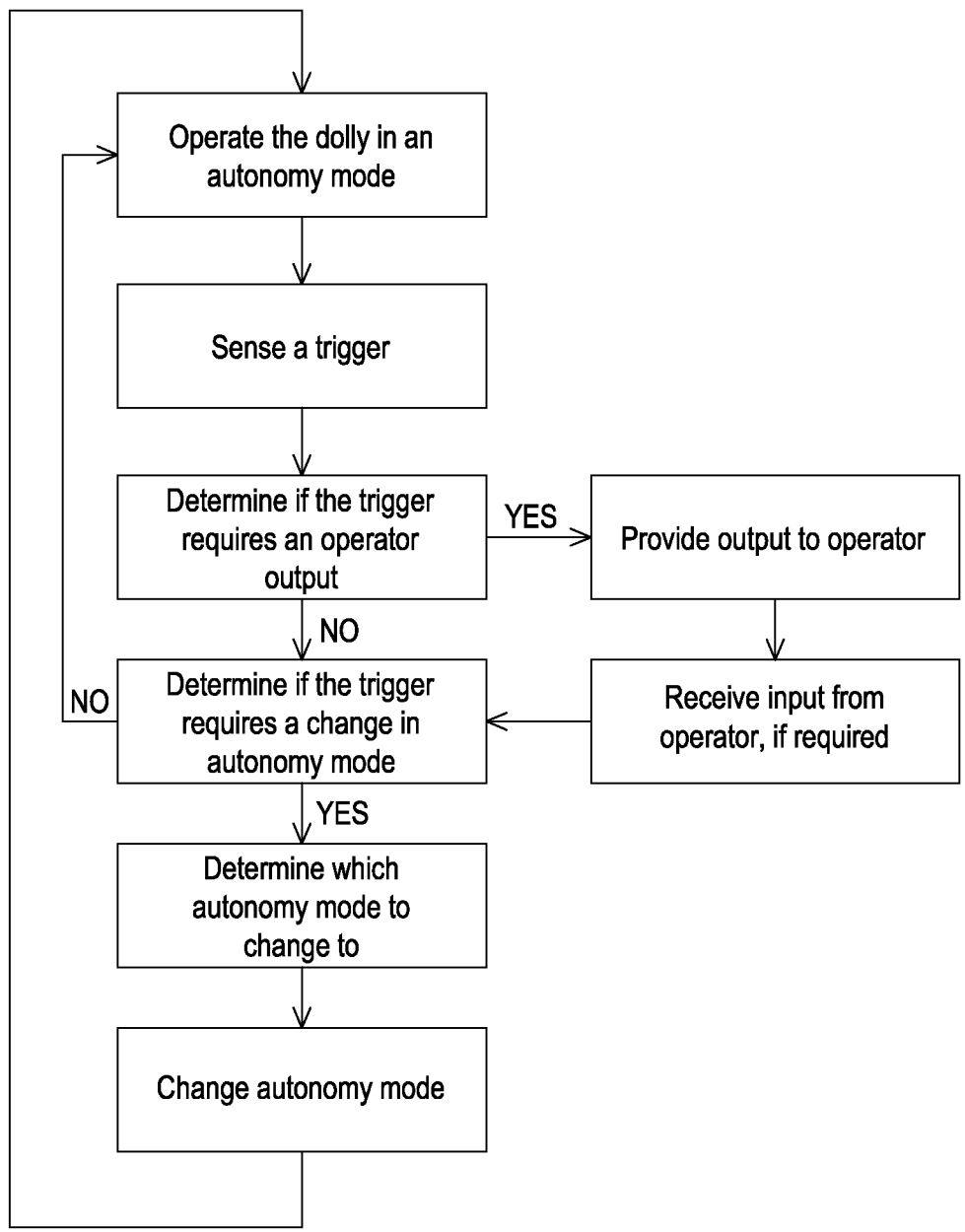
FIG. 6 is a method of providing blended autonomy of an autonomous baggage dolly according to the disclosure.

A method of operating using blended autonomy is depicted in FIG. 6.

At first, a baggage dolly 100 operating using blended autonomy will be operating in a first autonomy mode. The sensing system 120 of the baggage dolly 100 will then sense a trigger. In response to this, the baggage dolly 100 will determine whether or not the trigger requires an operator output. If the baggage dolly 100 is operating in SAE Level 5 Autonomy Level, it is apparent that the answer to such a question will always be no. However, in other autonomy modes the baggage dolly 100 will essentially be asking whether or not the trigger is an event trigger, i.e. indicative of an event that requires the baggage dolly 100 to request intervention from an operator. If the trigger is an event trigger, the baggage dolly 100 will proceed to request intervention and to await a response to the request, depending on the autonomy mode the baggage dolly 100 is operating in, as described above.

Whatever the answer to the first determination, the baggage dolly 100 will then determine whether or not the trigger requires a change in autonomy mode, i.e. whether or not the trigger is a mode trigger and if so whether it requires the baggage dolly 100 to operate in an autonomy mode other than the one in which it is currently operating. If the answer to this determination is no, then the baggage dolly 100 will continue operating in the same autonomy mode and await a further trigger.

In the event that it is determined that the trigger does require a change in autonomy mode, the baggage dolly 100 will then determine which autonomy mode to change to, for example be reference to a predetermined set of instructions, and will then change to this autonomy mode. The baggage dolly 100 will then continue to operate in this autonomy mode and await a further trigger.

The mode triggers that cause changes in the autonomy mode of the baggage dolly will be definite known criteria that are predictable and repeatable. Thus, changes in the autonomy mode can be planned for in advance, for example allowing operators to be made available in the case where a baggage dolly will be required to switch to a lower autonomy mode where operator input is required or likely to be required. Unplanned mode triggers are therefore avoided. This is in contrast to event triggers, which relate to more random or unexpected events that may cause an output to be provided to an operator, depending on the autonomy mode in which the baggage dolly is currently operating. These may occur at any time, depending on the environment in which the baggage dolly is present.

Light/Warning System

The baggage dolly 100 of FIG. 2 is provided with a light system 130 comprising two lights 132, positioned at each end of the platform 102, above the camera sensors 126. The light system 130 is configured to provide information indicative of the operating mode of the baggage dolly 100. More specifically, the depicted embodiment is adapted to indicate to an observer in what operating mode the baggage dolly 100 is currently operating.

Whilst baggage dollies, cargo dollies and airside dollies in general are the focus of this example, it will be appreciated that the concept is equally applicable to other forms of transport. For example other airside ground equipment such as fuel trucks, portable stairs, scissor lifts, shuttle buses and similar may also be provided with the light/warning system of this example. Other applications may also extend outside of the airport environment, for example in road going vehicles, passenger vehicle or other non-airport environments.

The light system 130 of the present embodiment is configured to indicate one of three operating modes. Each operating mode is designated a specific colour, which is emitted by each light 132 of the light system 130. Green light is indicative of the baggage dolly 100 operating in an autonomous mode, such as any of the autonomy modes previously described, purple light is indicative of the baggage dolly 100 operating in a manual mode, such as when a human operator has taken full charge of the control of the baggage dolly 100, and red light is indicative of when the baggage dolly 100 is in a parked mode.

Of course, although different light modes have been described, there may, for example be a light mode indicative of any operating mode of the baggage dolly 100, such as a different light mode for each autonomy level. It is also noted that although in the present embodiment each light mode is associated with a different colour of light, other indications could also be used such as a frequency of flashes of light, a brightness of light, or any other feature of the light system 130.

By allowing the operating mode of the baggage dolly 100 to be quickly and easily identified by an observer, it is possible to operate the baggage dolly 100 and any associated baggage handling system 10 in a safer manner. For example, if a baggage dolly 100 is showing a red light, indicative of it being in a parked mode, an observer can safely assume that the baggage dolly 100 poses no threat of sudden movement and may therefore be approached or passed without any impact on the baggage dolly 100. In contrast, when a purple light is showing, it can be assumed that any intervention by an observer may result in response of the baggage dolly 100, for example stopping the baggage dolly 100 or even causing the baggage dolly 100 to request intervention, as described above, if the baggage dolly 100 is operating in SAE Level 3 Autonomy Mode. The observer will be aware of the detrimental impact on the baggage dolly 100 that may be possible if they approach a baggage dolly 100 showing a purple light and would therefore be less likely to approach.

Although described in relation to a light system 130 and colours of light, in the present embodiment, the light system 130 may just as easily be replaced or augmented by another type of warning system, such as, for example, an audio warning system. In an audio warning system, different tones or frequencies of beep or different recorded messages could be indicative of each operating mode. Any other type of warning system may also be used, as will be apparent in the context of the present disclosure.

Weighing System

A weighing system 134 is also included, which comprises a weighing portion 136 within the cargo portion 104. The weighing portion 136 includes a number of weight sensors, such as strain gauges, which act to sense the weight of cargo within the cargo portion 104 and to provide corresponding weight data to the processor 116.

Once the weight of the cargo within the cargo portion 104 has been determined, this data can be provided wherever required. This weight data can be highly useful, especially when combined with automation of baggage dollies 100. It is known that the distribution of baggage or other cargo within an aircraft 20 is important in terms of balancing the aircraft 20. In known baggage handling systems, it is therefore common to weigh the ULDs, for example, upon their delivery at the aircraft and then to shuffle around the loading of the ULDs in order to provide a desired weight balance of the aircraft.

However, by providing a weighing system 134 on each baggage dolly 100, the delivery of the baggage, cargo, or ULD 106 at the aircraft 20 can automatically be adapted—by communication between baggage dollies 100 or command from a central controller 12—such that their arrival at the aircraft 20 is in the required order to best load the hold of the aircraft 20. The baggage dollies 100 may, for example, take different routes or move at different speeds in order to ensure that they arrive in the correct order.

By using the weighing system 134 in this manner, the loading of aircraft 20 can be completed in a more efficient manner, minimising loading time and ensuring that delays due to weight-balance issues can be avoided. Moreover, by ensuring that the baggage dollies 100 arrive at the aircraft 20 in the correct order, clutter caused by the excess baggage dollies having to wait on the airfield can be avoided, helping to minimise the risk of accidents.

The weighing system may also be configured to measure a weight distribution of the baggage in the cargo portion. This may help during loading of the baggage dolly, where it may be desirable to achieve an even weight distribution throughout a ULD, for example. The weight distribution may be calculated in any known manner, but in this embodiment is achieved by spacing the weight sensors around the weighing portion and processing their output signals.

Figure 14:
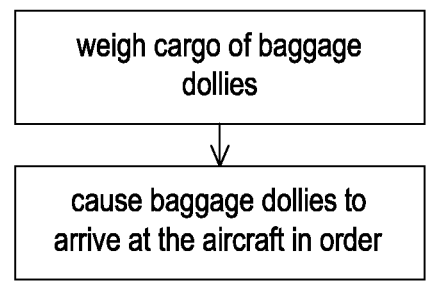
FIG. 14 is a method of organising the loading of an aircraft.

A method of operating using a weighing system is shown in FIG. 14.

Locking System

It is a known problem in relation to conventional baggage dollies for cargo to become dislodged from baggage dollies, often resulting in the cargo falling off the baggage dolly onto the airfield. A fully laden ULD can have a mass of around 1,500 kg and therefore is capable of causing damage once separated from the baggage dolly. Moreover, it can be difficult to recover a separated ULD. In the case of an empty ULD, which may weigh 60 to 70 kg, the ULD may, for example, be blown by high winds, again causing a safety and recovery issue.

The baggage dolly 100 therefore further comprises a locking system 138. The locking system 138 includes four lock points 140, three of which are visible in FIG. 2. One lock point 140 is located at each end of the cargo portion 104, with a third lock point 140 visible on the near side of the cargo portion 104 and the fourth being located on the far side of the cargo portion 104, its position being obscured by the ULD 106 in FIG. 2.

The lock points 140 in the depicted embodiment include retaining clips that automatically grip onto a portion of the frame of the ULD 106. However, such lock points may include any other type of retainer, including clips, locks, sockets and detents, or grippers. The lock points 140 keep the ULD 106 in position when moving whilst disengaging to allow the release of the ULD 106 when required.

The locking system 138 is configured such that when a ULD 106 is located in the cargo portion 104, the lock points 140 lock into the ULD 106 prior to any movement of the baggage dolly 100. The locking system 138 is therefore controlled by the processor 116 to allow the locking system 138 to act in advance of any control signals provided to the drive system 108. By providing a locking system 138 that acts automatically to secure cargo to the baggage dolly 100, accidents whereby cargo is displaced from the cargo portion 104 during transmit can be avoided.

Although the locking system 138 of the depicted embodiment provided as a series of four lock points 140 around a ULD 106, the locking system 138 may be provided such that it is designed to lock onto whatever cargo is present on the cargo portion. For example, a greater or lesser number of lock points 140 may be provided, depending on the specific requirements of the cargo to be secured. Moreover, the location of lock points 140 may be adapted for a specific size of shape of cargo. The lock points 140 may also be movable in order that different shapes and/or sizes of cargo can be secured to the baggage dolly 100.

Compared to known systems for locking ULDs on baggage dollies, the present embodiment has another advantage. In the known systems, whilst locks are known, they are required to be manually activated and released by the baggage tractor driver. This requires the driver to leave the relative safety of the baggage tractor and to move around the sides of the baggage dollies, putting them in the road and therefore at risk of harm from other baggage trains. By providing a locking system 138, there is no longer any requirement for a person to manually activate locks, ensuring the safety of human operatives.

Whilst an automatic locking system may overcome many of the problems raised above, it is also known that locking systems may be subject to failures, for example due to a misalignment of a load or due to damage to the load or the locking system. Such failures may occur without the knowledge of the operator of the baggage dolly and it is therefore possible to operate the baggage dolly with an insecure load without realising that this is the case.

To overcome this issue, the locking system also includes an alert for indicating that a ULD on the baggage dolly is not secured by the locking system, for example when the ULD is misaligned with the lock points and therefore cannot be secured. In the present embodiment, the alert is provided through a flashing of the lights of the light system. In addition, the alert causes the processor to adapt the control signals delivered to the drive system such that the drive system does not cause the baggage dolly to move whilst the ULD is unsecured. In this manner, the baggage dolly is prevented from moving with an insecure load and thus no loss of cargo during operation is possible.

Although discussed in relation to an autonomous baggage dolly, it is also possible to provide the locking system, including the alert, in relation to a conventional baggage dolly. Where a conventional baggage dolly is used, it may be advantageous for the locking system to be fully mechanical, in order that electrical power need not be provided to the baggage dolly. In such a case, the alert may take the form of a flag that is raised to indicate that a ULD or other cargo is not properly secured and/or the engagement of a brake on the baggage dolly to prevent movement. If an electronic system is provided, the alert may be delivered to the cab of a baggage tractor, for example, in order to alert the driver prior to movement, or prior to the dislodgement of the cargo from the baggage dolly.

Guiding System

A guiding system 142 is provided towards one end of the baggage dolly 100. The guiding system 142, which comprises a guiding arm 144, is used to allow manual guiding of the baggage dolly 100 whilst utilising its drive system 108. In FIG. 2, the guiding arm 144 is shown in its stowed state, which is configured such that it does not extend the overall length of the baggage dolly 100. In its extended state, the guiding arm 144 will extend from the end of the baggage dolly 100 in order that it can be easily manipulated by a user.

Whilst baggage dollies, cargo dollies and airside dollies in general are the focus of this example, it will be appreciated that the concept is equally applicable to other lightweight forms of transport. For example other airside ground equipment such as, portable stairs, scissor lifts, tugs and other airport transport vehicles may also be equipped with the guiding system of this example. Other applications may also extend outside of the airport environment, for example in road going vehicles, passenger vehicle or other non-airport environments.

Through manipulation of the guiding arm 144, a user can manually guide the baggage dolly 100, when necessary. The guiding system 142 may override the autonomy mode of the baggage dolly 100, in order that the guiding system 142 is in sole control of the baggage dolly 100 during use. The guiding system 142 therefore provides guiding signals directly to the processor or controller, in order to utilise some or all of the motive force provided by the drive system. By doing so, mechanical force required to be transmitted through the guiding arm 144 can be minimised, and therefore the size of the guiding arm 144 can be minimised also.

Guiding signals are generated in the present embodiment by sensors within the guiding arm, or between the guiding arm and platform, that detect movement and force applied to the guiding arm in order to cause the baggage dolly to move in the required direction. This may be augmented or replaced by any other guiding signal generating means, such as an electronic controller.

Use of the guiding system 142 may be desired or required in some circumstances. For example, it may be required for movement of baggage dollies 100 around aircraft 20 to be manual, in order to prevent any accidental damage to an aircraft 20 by an autonomous baggage dolly 100. Therefore, when in the vicinity of an aircraft 20 a user can manipulate the baggage dolly 100 to the desired position on a manual basis, whilst retaining use of the drive system 108 and therefore not requiring the use of a baggage tractor. Another circumstance where manual guidance may be required is in a failure of the processor 116 of the baggage dolly 100. In this circumstance, the guiding system 142 may bypass the processor 116 to provide control signals direct to the controller 114, allowing the baggage dolly 100 to be moved to a location for repair or replacement of the processor 116.

In some embodiments, the guiding arm may be coupled to an adjacent baggage dolly and may serve to input steering and start/stop commands to its dolly via sensors in the arm that monitor the forces in the arm applied by the baggage dolly to which it is coupled. This may be useful in the case where the sensing system of the dolly is in some way defective, for example where the GPS sensor or other position sensor has failed.

Baggage Handling System

Now referring to FIG. 1, there is shown a baggage handling system 10. The baggage handling system 10 includes a baggage hall 16. The baggage hall 16 operates to receive baggage from a source 22, such as a bag drop in an airport, sort the baggage into groups according to the destination of the baggage, and then deliver the baggage to a baggage receiver, which in this case is a number of aircraft 20, three of which are shown.

In order to retrieve and sort baggage within the baggage hall 16, a baggage delivery system 24 is included which receives baggage from the baggage source 22 and moves the baggage to a number of different loading bays 26. A number of conveyors are used to move the baggage from the baggage source 22 to the loading bays 26. In the depicted embodiment, a longitudinal conveyor 28 takes the baggage from the baggage source 22 before transferring it to one or other lateral conveyors 30. The lateral conveyors 30 then direct the baggage to one of the plurality of loading bays 26 adjacent to the lateral conveyor 30.

The baggage delivery system 10 is automatic and controlled from a central controller 12. As is well-known in the art, destination information for each item of baggage instructs the baggage delivery system 24 to deliver it to a corresponding loading bay 26 that is dictated by the central controller 12. Automatic directing means (not shown) then operate with the baggage delivery system 24 to ensure that each item of baggage is passed from the longitudinal conveyor 28 to a lateral conveyor 30 and then on to a loading bay 26.

A roadway 32 is provided within the baggage hall 16, along which baggage dollies 100 can run. The baggage dollies 100 are self-propelled baggage dollies as described above and may therefore operate in one or more autonomous modes. Three baggage dollies 100 are shown in the depicted embodiment, but many more baggage dollies 100 may operate within the baggage hall 16 at any one time. As shown, there are a total of sixty loading bays 26 and therefore sixty baggage dollies 100 may be in the process of loading at any one time, with others being on their way to or from the loading bays 26.

The roadway 32 includes a first roadway portion 34 that extends from an entrance 36 towards the back of the baggage hall 16 and a second roadway portion 38 that extends in parallel with the first roadway portion 34 towards an exit 40 of the baggage hall 16. The roadway 32 also includes a plurality of laterals 42 that extend from the first roadway portion 34 to the second roadway portion 38. In the depicted embodiment, the laterals 42 run perpendicular to the first and second roadway portions 34, 38, and the first and second roadway portions 34, 38 are parallel to one another, but this need not necessarily be the case.

The laterals 42 are provided so as to give the baggage dollies 100 access to the loading bays 26. Therefore, they run parallel to the lateral conveyors 30 of the baggage delivery system 10. At each end of the baggage delivery system 10, the laterals 42 therefore run adjacent to a single row of loading bays 26, whereas in the middle of the baggage delivery system 10 the laterals 42 run adjacent to two rows of loading bays 26. As such, the space is used efficiently to give maximum access to the loading bays 26 without wasting space within the baggage hall 16.

A monitoring system 44 is provided that acts to detect the presence or absence of a baggage dolly 100 in each loading bay 26 and communicate this information to the central controller 12. The central controller 12 can then instruct or allow a baggage dolly 100 to travel to an empty loading bay 26 in order that it can be loaded. The monitoring system 44 also operates to inform the baggage delivery system 24, either directly or via the central controller 12, that a baggage dolly 100 is in place within a loading bay 26 and that it is therefore ready to be loaded. In response, the baggage delivery system 24 can begin to deliver baggage to the loading bay 26 that is now occupied.

The monitoring system 44 can operate not only to communicate with the central controller 12 in order to say that a loading bay 26 is available for use, but can also predict when a loading bay 26 will be available for use. For example, a baggage dolly 100 may be close to being fully loaded, allowing the monitoring system 44 and central controller 12 to determine that, by the time another baggage dolly 100 arrives at the subject loading bay 26, the baggage dolly 100 that is currently occupying the loading bay 26 will have moved on. Therefore, an incoming baggage dolly 100 can be directed to an occupied loading bay 26 in the knowledge that the loading bay 26 will be free at the time of arrival of the baggage dolly 100 or shortly afterwards. In order to accommodate such instructions, the incoming baggage dolly 100 may operate at a slower or faster speed than usual in order to time its arrival to be at approximately the same time or shortly after the departure of the outgoing baggage dolly 100.

The baggage hall 16 also includes a recharging station 14 for the baggage dollies 100. The recharging station 14 allows a baggage dolly 100 that is low on charge or is not currently being used to be recharged. The recharging may be by plugging the baggage dolly 100 into a power supply, wireless charging such as magnetic induction, or by battery-swapping.

Although shown as a separate part of the baggage hall of the described embodiment, recharging stations may alternatively or additionally be provided at or adjacent to one or more loading bays. In this way, the baggage dollies may be recharged whilst being loaded with baggage. The recharging station may be manned or all operations may be handled automatically by suitable means.

As discussed above, the baggage dollies 100 described herein are designed to operate using ULDs 106 to store and transfer baggage as unit loads. Therefore, when in a loading bay 26 the baggage delivery system 24 will operate to provide baggage to a ULD 106 on the cargo portion 104 of each baggage dolly 100. The baggage may be loaded automatically by the baggage delivery system 24, for example by providing a delivery conveyor 46 that is in the correct position, or may be transferred by a human operative who takes the baggage from the baggage delivery system 24 to load it into the ULD 106. As ULDs 106 are loaded and unloaded, there may be times when the number of ULDs 106 is greater than the number of baggage dollies 100 or, for any reason, there is a requirement for a baggage dolly 100 to unload an empty ULD 106. For these circumstances, a ULD store 48 is provided adjacent to the baggage hall 16, which allows empty ULDs 106 to be removed from baggage dollies 100 and stored until they are required.

Once a baggage dolly 100 has been loaded with baggage—in this case into the ULD 106 mounted on the cargo portion 104 of the baggage dolly 100—the baggage dolly 100 can proceed back onto the roadway 32 and out of the baggage hall 16, directed to a specific aircraft 20 waiting in the airfield 18. The unloading of the ULD 106 can then proceed as normal.

As baggage can be delivered to each loading bay 26 independently, and each loading bay 26 can be occupied by any baggage dolly 100, baggage for different baggage receivers—i.e. aircraft 20—can be delivered to adjacent loading bays 26 on the same lateral 42. The benefit of this is that the presence of any one baggage dolly 100 that is being loaded with baggage for one destination or baggage receiver does not impact upon the use of either or both of the adjacent loading bays 26 for other baggage dollies 100 with second and/or third destinations or baggage receivers. Thus, the full operating capacity of each lateral 42 can always be used. This is improved further in dollies equipped with the steering system allowing them to traverse in a crabbing motion, thereby allowing them to translate laterally into and out of loading bays. Using the sensing system the dollies 100 are operable to position themselves in the bays, adjacent to the lateral. The crabbing ability allows the dolly to fine tune this position whilst minimising excess movements. The dollies are configured to position themselves adjacent to the lateral and, preferably, within 100 mm off the lateral. This is in stark contrast to previously known systems where a baggage tractor and baggage dolly train can take up an entire lateral by itself, preventing use for other destinations.

Figure 13:
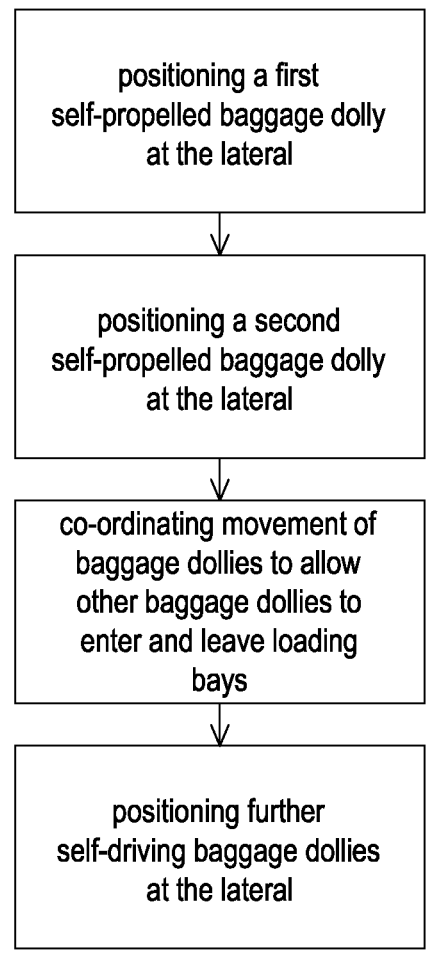
FIG. 13 is a method of arranging self-propelled baggage dollies at a lateral.

By operating baggage dollies 100 independently, laterals 42 can be used most efficiently. An example method is depicted in FIG. 13. For example, two baggage dollies 100 may be positioned at the same lateral with a single loading bay 42 between them. The loading bays may be positioned closely together. In order to enable a third baggage dolly to manoeuvre into the middle loading bay 42, the first and second baggage dollies may coordinate movement to expand the gap between them to be large enough for the third baggage dolly to enter the loading bay. This can be done in reverse for exiting the loading bay. Coordinated movement of this type could be used with any number of baggage dollies 100 at a lateral, enhancing the use of space and ensuring no loading bays 42 are unavailable to other baggage dollies 100. Operating baggage dollies 100 with a steering system can allow for these movements to be coordinated without disturbing the first and second baggage dollies, thereby not interrupting their loading or unloading actions.

As shown in FIG. 2, two different operation zones 50, 52 are defined. The first operation zone 50 includes the baggage hall 16 and the adjacent ULD store 48 (which could equally be within the baggage hall 16), and the second operation zone 52 includes the airfield 18 and aircraft 20 parked thereon. The two operation zones 50, 52 are defined by geo-fencing and thus are changeable, if required. The geo-fencing of the operation zones 50, 52 is managed, along with the rest of the baggage handling system 10, by the central controller 12.

The two operation zones 50, 52 operate to control the baggage dollies 100 using blended autonomy, as mentioned above. As such, the baggage dollies 100 can be configured to operate in SAE Level 5 Autonomy Mode whilst within the first operation zone 50, this including the baggage hall 16, and in SAE Level 3 or Level 4 Autonomy Mode whilst within the second operation zone 52, including the airfield 18. As mentioned above, this can allow maximum autonomy of the baggage dollies 100 whilst in the highly-controlled environment of the baggage hall 16 whilst necessary interventions can be made in response to unexpected events that take place outside of the baggage hall 16, where events can be less predictable.

Figure 5:
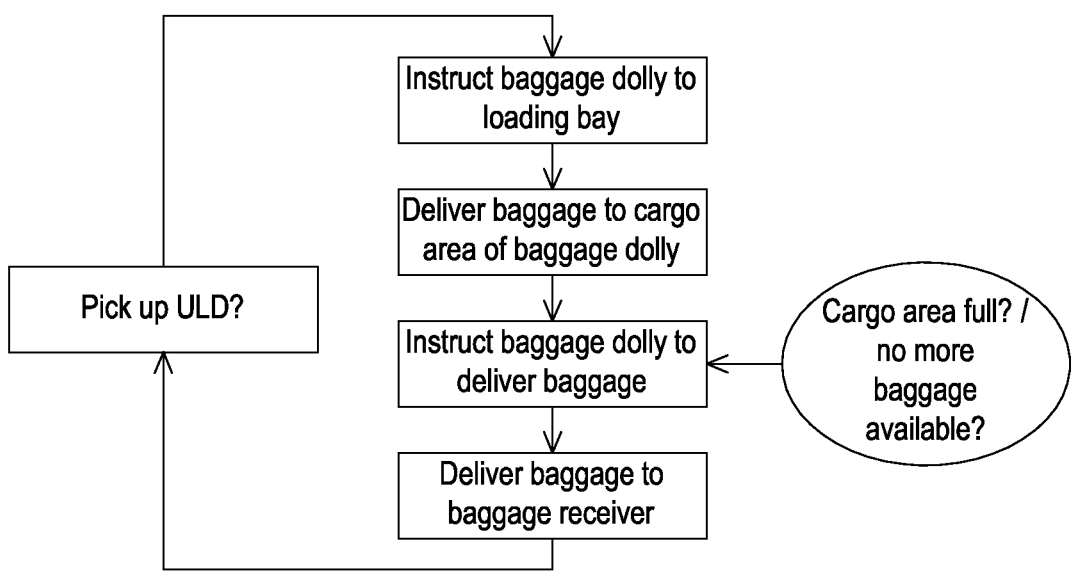
FIG. 5 is a flow diagram of a method of increasing operational capacity of a baggage handling system according to the disclosure.

Use of the depicted baggage handling system 10 is depicted in flow-chart form in FIG. 5 as a method of increasing operational capacity of a baggage handling system 10. In a first step, an empty baggage dolly 100 is instructed to proceed to an empty loading bay 26. This empty loading bay 26 may be indicated by the monitoring system 44 and central controller 12 or alternatively a baggage dolly 100 may be able to independently identify an empty loading bay 26 using its sensing system 120 and therefore may instruct itself to the empty loading bay 26. The sensing system can detect an empty loading bay using the LIDAR sensors 128. The camera sensors 126 may also be used to identify the bays 26. Once an empty bay is identified the dolly 100 then plots a path into the loading bay to bring it adjacent (preferably within 100 mm) of the lateral 42. The dolly 100 then executes the path, manoeuvring to the determined position, and may execute a crabbing manoeuvre for bays in which the adjacent loading bays are occupied, or where manoeuvring space is otherwise restricted.

Figure 16:
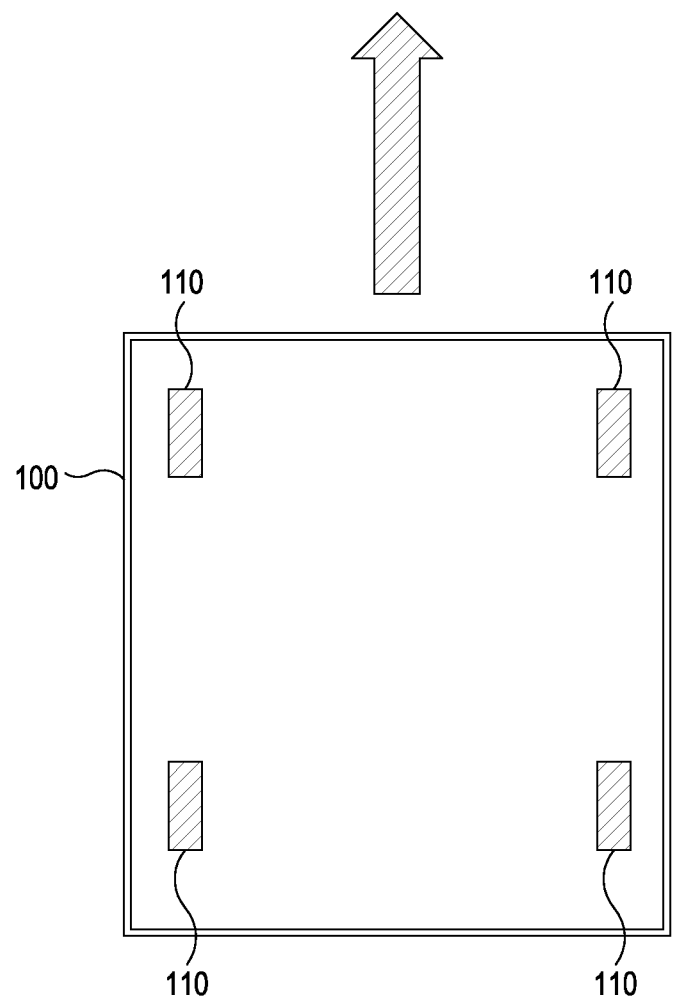
FIG. 16 is a simplified view of a bottom of a dolly operating in a first, normal mode.
Figure 17:
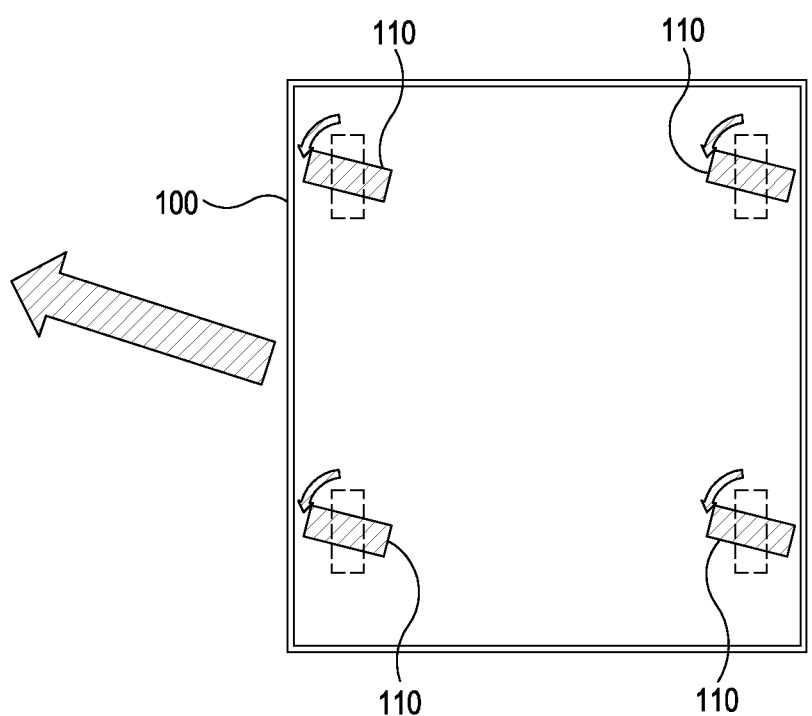
FIG. 17 is a simplified view of a bottom of a dolly operating in a second, docking mode.

Simplified views of the underside of a dolly 100 are shown in FIGS. 16 and 17 which is equipped with a steering system (not shown). The dolly 100 depicted comprises a set of ground engaging wheels 110. At least some of the wheels 110 are steerable, and preferably all of the wheels that are ground engaging are steerable. With the wheels 110 in a straight ahead, longitudinal position, as in FIG. 16, the dolly 100 moves linearly in a longitudinal direction. In a conventional dolly any steering is provided by the tug, with the dollies and tug forming a train. Changes in direction are brought about through the articulation in the train as the tug steers. Providing steerable wheels, as in FIG. 17, greatly improves the manoeuvrability over the arrangements of the prior art. Each of the wheels 110 of the dolly of FIG. 17 have been steered to approximately 80°. The range of movement through which the wheels can be steered is dependent upon the implementation and use case. Any amount of steering with all of the wheels in a single direction allows some lateral movement. The closer the wheels can be turned to 90°, the more lateral movement can be achieved without moving longitudinally. The wheels may be steerable through a range of angles—with the ability to be steerable to 90° enabling full lateral movement without a longitudinal dimension.

Figure 18:
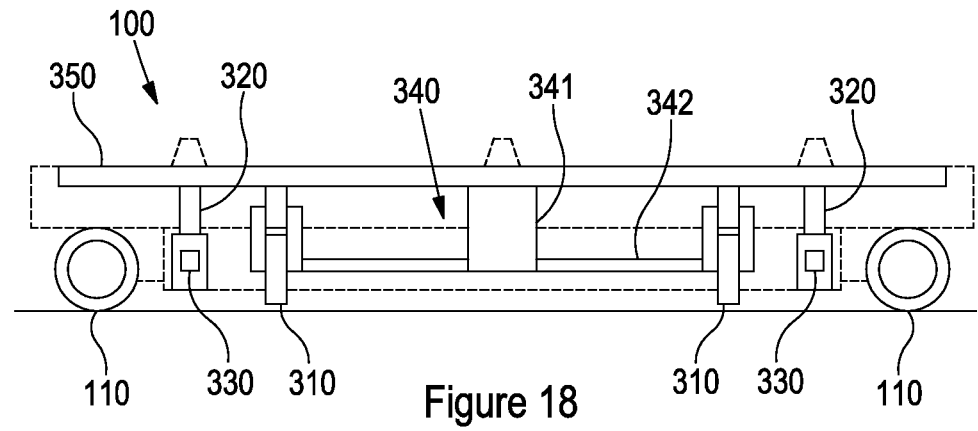
FIG. 18 is a partial, side view of a dolly operating in a first, normal mode.

An alternative or supplementary manoeuvring solution to the steering system described above is shown in simplified form in FIGS. 18 and 19. Those parts of the dolly 100 discussed above have been omitted or shown in dotted line form to improve clarity. The views are also semi-sectional, with the positioning of the wheels within the dolly area being shown in FIG. 20. The dolly 100 of FIGS. 18 and 19 comprises a second set of wheels 310. The second set of wheels 310 is a deployable set of wheels. In FIG. 18 the deployable wheels 310 are stowed and in FIG. 19 the deployable wheels are deployed. The deployable wheels 310 are orientated to be perpendicular to the main set of wheels 110. When deployed the deployable wheels 310 become the ground engaging wheels and the main wheels 110 are raised from the ground. This allows the dolly 100 to translate in a lateral direction without providing any or much steering input. It can be technically difficult to ensure that a set of 4 ground engaging steerable wheels can turn 90 degrees and yet still be safe in the normal forwards direction of travel (at speed), safe from a malfunction that causes the vehicle to become unsteerable safely. It can be more reliable, safer, and less expensive to provide a second set of alternative wheels that don't need any or not very much, steering, and that normally are only used for short distances at low speed.

Figure 19:
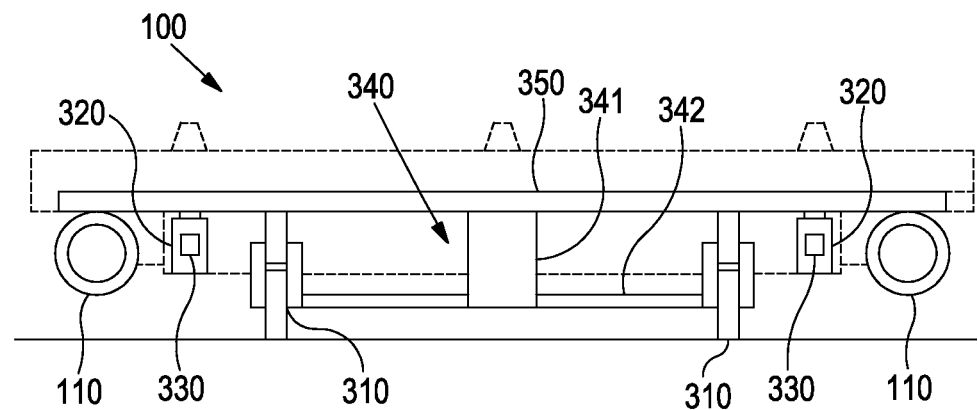
FIG. 19 is a partial, side view of a dolly operating in a second, docking mode.
Figure 20:
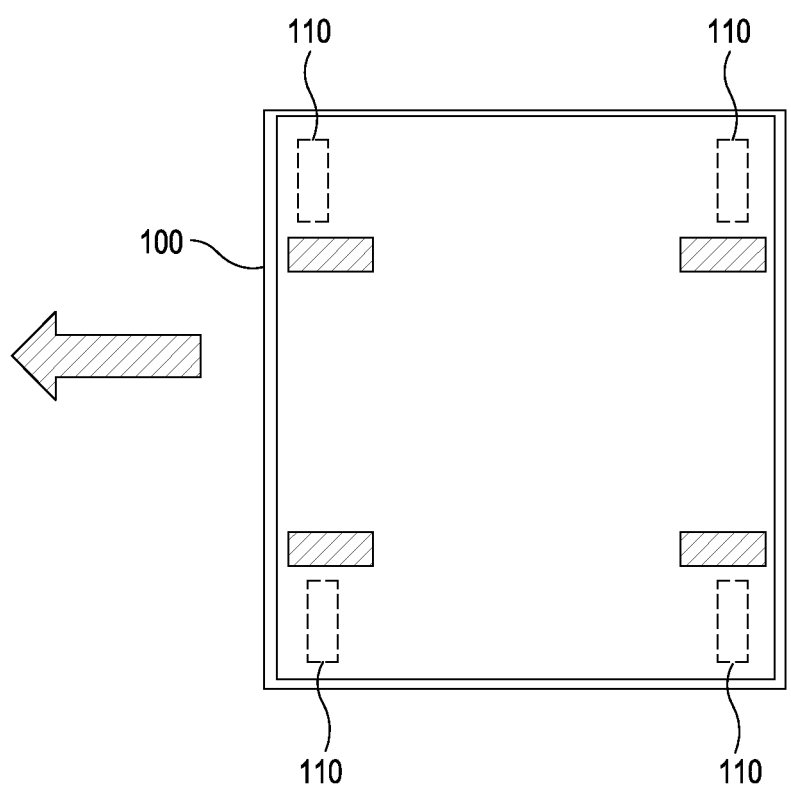
FIG. 20 is a simplified view of a bottom of the dolly of FIGS. 18 and 19 operating in the second, docking mode.

In the examples provided in FIGS. 18 and 19 the deployable wheels 310 are connected to a deck 350 in a sub-assembly of the dolly 100, such that both the deployable wheels 310 and the deck 350 may move during deployment. The deck 350 is a platform that is configured to receive cargo. Further examples and implementations of the deck 350 are discussed below with respect to its being a loading deck or otherwise called a cargo platform. This provides a system whereby the weighing of the cargo can be incorporated into a jacking system 320 that provides the ability to deploy the wheels 310. The jacking system comprises a pair of jacks 320 and is shown in FIGS. 18 and 19 providing the vertical movement of the deck 350 and the deployable wheels 310. A single jack 320 may be used or more than two may be used, dependent upon the capabilities of the specified jacks and the packaging constraints. In these examples four jacks 320 are used, one proximal to each corner. The jacks 320 are configured to operate in parallel, such that the deck 350 is kept level and all the deployable wheels 310 are deployed uniformly. The jacks 320 may be hydraulic pistons. The jacks 320 are mounted to a chassis (or other rigid, structural part) of the dolly 100 at one end of their ends, and to the deck 350 at another, opposite on of their ends. Power may be provided to the jacks from the battery A weight sensor 330 may be incorporated into the jack(s) 320. The weight sensor 330 may be a hydraulic pressure sensor. The hydraulic pressure sensor 330 may be configured to convert pressure measurements into weight measurements. The weight sensor may be used instead of the weight sensors discussed with respect to the weighing system 134 described above. Alternatively, both sets of weight sensors may be used in the weighing system 134 to provide redundancy and accuracy. The weighing system 134 itself is sensor agnostic, and may use either sensor type to provide weight data to the processor.

The deployable wheels may also all be driven wheels, or alternatively only one or two or three of them may be driven. They do not all have to be driven The deployable wheels are driven by a secondary drive system 340. The drive system 340 may comprise an axle 342 connecting at least a pair of the deployable wheels 310 to the drive system 340. A further motor 341 may be provided to provide drive to the deployable wheels 310. Power for the further motor 341 may be provided from the battery 118. Alternatively, a gearbox may be used to divert drive from the electric motor 112 to the deployable wheels 310. Similarly, a gearbox may be used to provide drive from an internal combustion engine of the dolly 100 if that is the implemented drive system.

In some example the deployable wheels are not driven, but instead are free to rotate, allowing for the dolly to be positioned by an external mover. The external mover may be another piece of machinery, such as a lateral mounted retrieval device such as a winch and hook, or a human operator—who can simply pull or push the dolly 100 into position.

Figure 21:
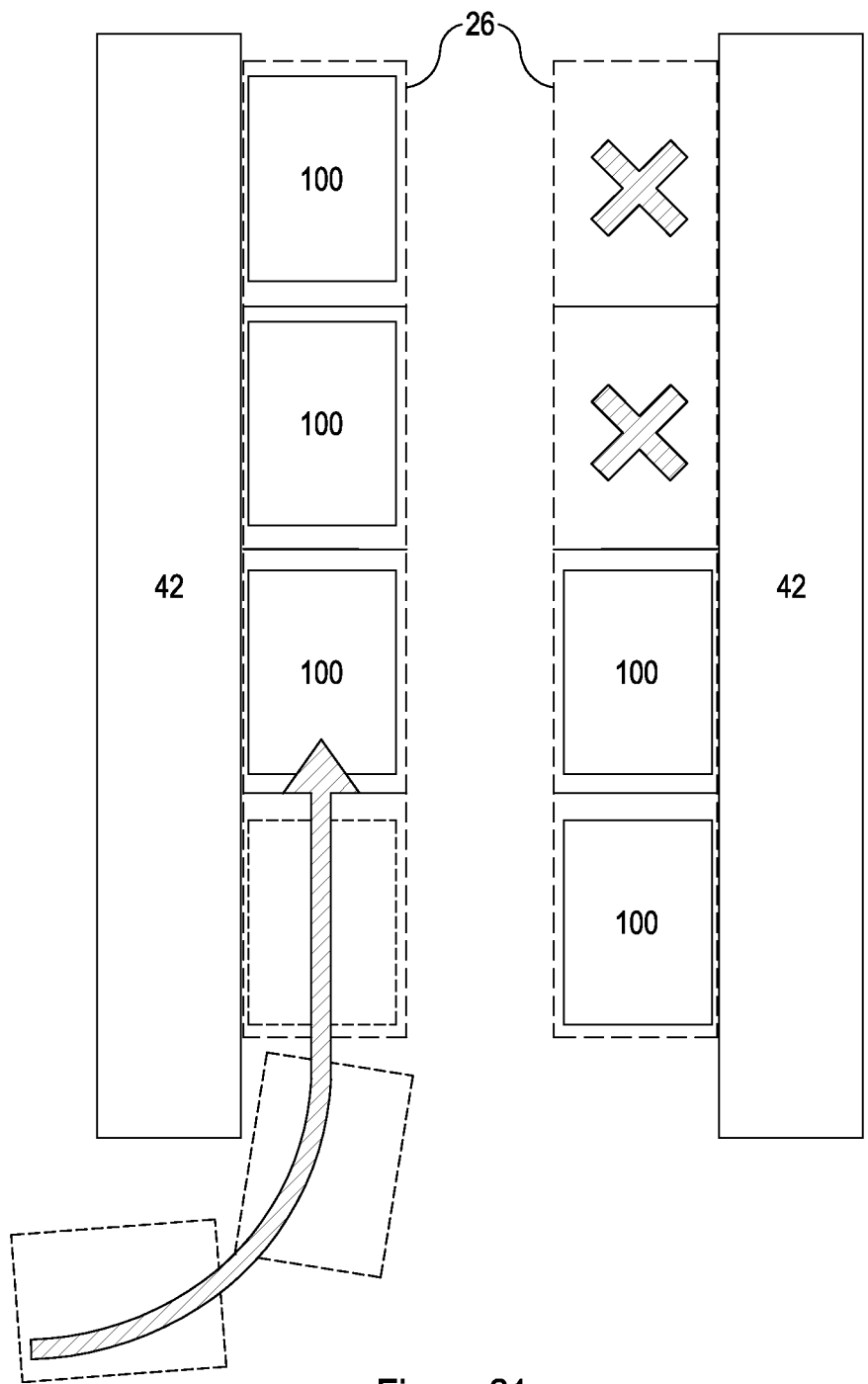
FIG. 21 is a diagrammatic plan view of a part of a baggage handling system according to the disclosure.

FIG. 21 shows the manoeuvring of a dolly 100 into a loading bay 26. This is the path that the dolly would take if fitted with a conventional steering system, but is also similar to the path that would be taken in the prior art, in which the dolly is towed by a tug as part of a train. It can be seen that the dolly 100 has to enter the loading bay 26 tangentially. As such, if the preceding adjacent space is blocked, then the dolly cannot enter the designated loading bay. Similarly, if a following, adjacent loading bay is occupied then the dolly cannot exit its space. The loading bays marked with an X designate those bays inaccessible to the dolly entering the loading bay area in the scenario depicted in FIG. 18.

Figure 22:
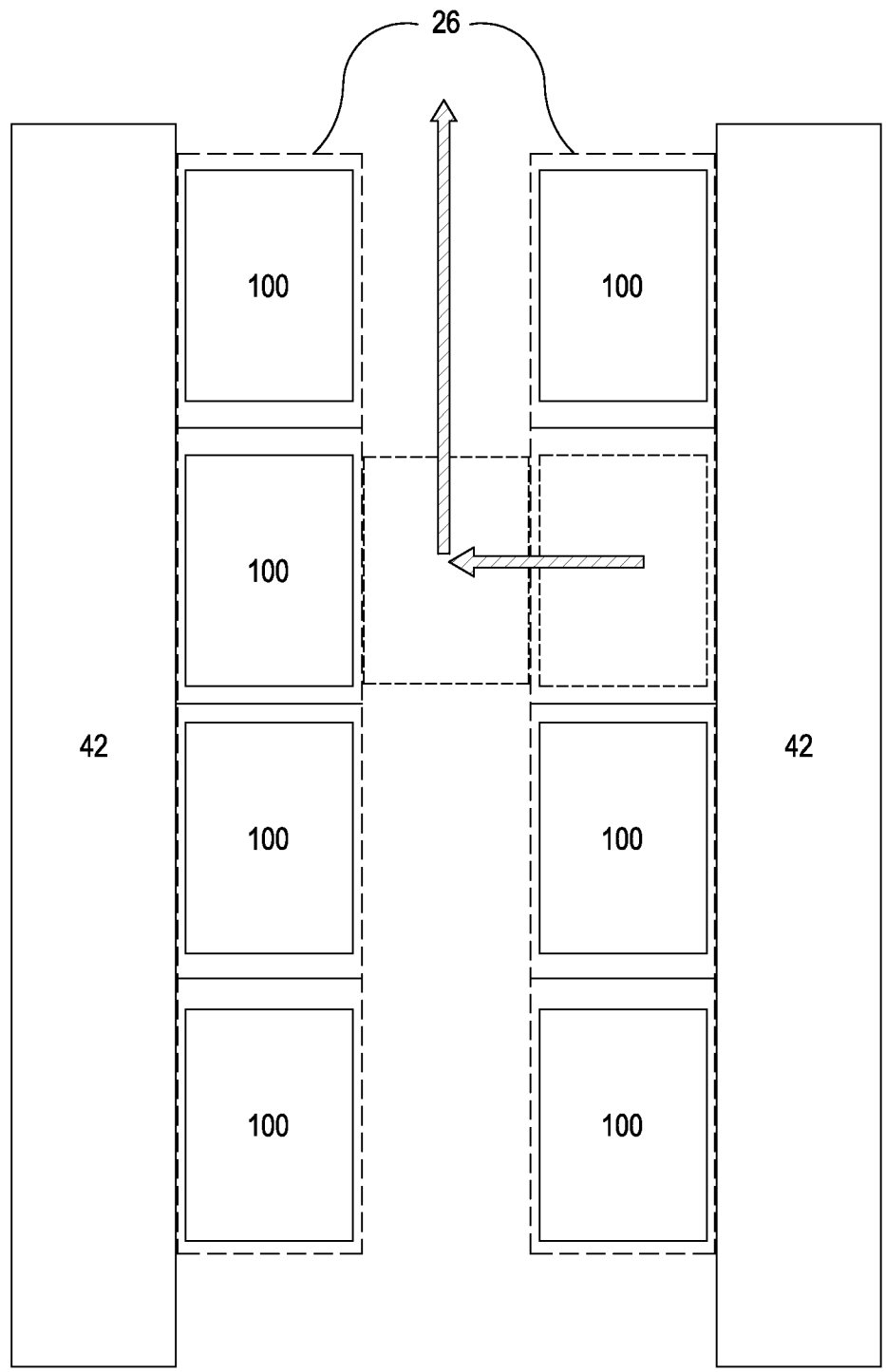
FIG. 22 is a further diagrammatic plan view of a part of a baggage handling system according to the disclosure.

FIG. 22 shows the manoeuvring of a dolly 100 out of a loading bay 26, where the dolly is fitted with a steering system or deployable wheels 310. The dolly 100 is operable to traverse in a lateral movement, allowing it to exit a loading bay without the need of the adjacent bays to be free. This provides for much improved space utilisation and occupancy in the loading bays 26. This arrangement means that the dolly 100 is able to leave a loading bay without having to wait for more free space to become available in which to manoeuvre. Some dollies may have much shorter loading times than others and so being able to leave the bay without waiting for adjacent dollies to complete their loading or unloading improves the efficiency and utilisation of the dollies and the wider baggage handling system.

Figure 23:
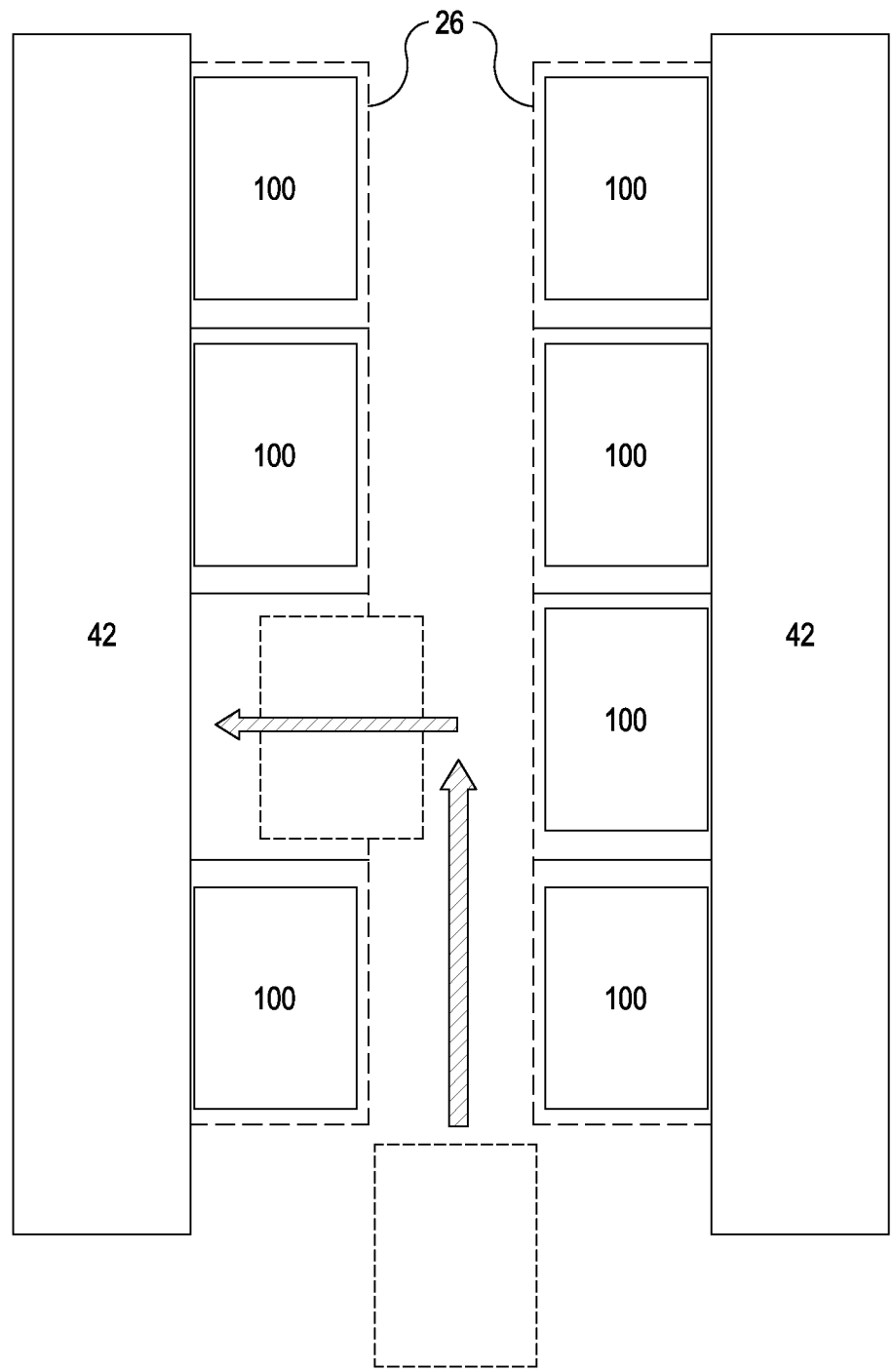
FIG. 23 is a yet further diagrammatic plan view of a part of a baggage handling system according to the disclosure.

FIG. 23 show the reverse manoeuvre to FIG. 22, in that a dolly 100 fitted with a steering system or deployable wheels 310 enters the loading area and traverses laterally into a loading bay 26. Again, this is done without requiring the movement of the adjacent dollies, enabled by the lateral translation of the dolly 100 into the loading bay 26. As the dolly 100 is able to move laterally it is also have improved control of its proximity to the lateral 42 over prior art systems. The dolly 100 is operable to position itself a predetermined distance away from the lateral 42. The distance may be provided in dependence on safety factors and factors for reducing damage, whilst still enabling the transfer of cargo from the lateral 42 to the dolly 100, and vice versa. The distance, therefore, is set at a distance that does not allow personnel to step between the dolly 100 and the lateral 42. The distance is also set such that the dolly, its cargo, or other associated equipment, does not strike the lateral on entering or exiting the loading bay. The distance is also small enough such that cargo, baggage, or any other items being transferred from the lateral 42 to the dolly (or vice versa) can drop down through the gap formed by the space or otherwise become snagged on the gap. The space is also set such that body parts, such as fingers, cannot become trapped between the lateral 42 and the dolly 100. The pre-determined space is therefore set between 10 mm and 200 mm, preferably between 50 mm and 150 mm, further preferably between 90 mm and 110 mm and still preferably, approximately 100 mm.

The baggage dolly 100 can then be loaded with baggage by the baggage delivery system 24. One of a number of prompts can then result in the baggage dolly 100 leaving the loading bay 26 and proceeding to deliver the baggage to the baggage receiver, such as an aircraft 20. These prompts could be caused by the central controller 12, baggage delivery system 24, or the baggage dolly 100 itself. Prompts can include that the cargo portion 104 or ULD 106 is full and no more baggage can be carried by the baggage dolly 100, that there is no more baggage needing to be delivered to the baggage receiver, or may be that a predetermined time has elapsed. These are of course only options and other prompts may be provided in addition or alternatively.

After delivering the baggage, the baggage dolly 100 may proceed back to the baggage hall 16 in order to collect another load of baggage. If another ULD 106 is required, then the baggage dolly 100 may proceed back to the baggage hall 16 via the ULD store 48 in order to pick up another ULD 106 before returning to a loading bay 26.

Each step of the process may be centrally controlled by the central controller 12, providing instructions to each baggage dolly 100 in the baggage handling system 10. Having a central controller 12 ensures that each baggage dolly 100 is provided with the required information to collect and deliver baggage, even when the baggage dollies 100 are otherwise operating fully autonomously. In other embodiments, the control of the system 10 may be decentralised, such that each component of the system 10 such as the baggage dollies 100, baggage delivery system 24, baggage source 22, and baggage receiver 20 communicate directly between each other to provide the required information to ensure that baggage starts and finishes in the correct place.

Unloading of the baggage dollies may be carried out in the reverse manner to loading of the baggage dollies. For example, the baggage dollies may proceed to a loading bay where the locking system unlocks the ULDs to allow their removal, or optionally the ULDs stay in position and the baggage is removed manually by operatives or by automated systems. The unloaded baggage can then be placed on a conveyor and distributed to one or more baggage reclaim areas.

The unloading of baggage dollies is commonly carried out in a separate baggage hall to that of the loading. However, such a baggage hall may, in the presently described invention be substantially identical to the baggage hall used for loading. Alternatively, the unloading and loading may be carried out in the same baggage hall as shown, where the baggage delivery system also includes conveyors configured to take baggage from the loading bays to a baggage reclaim area.

Figure 8:
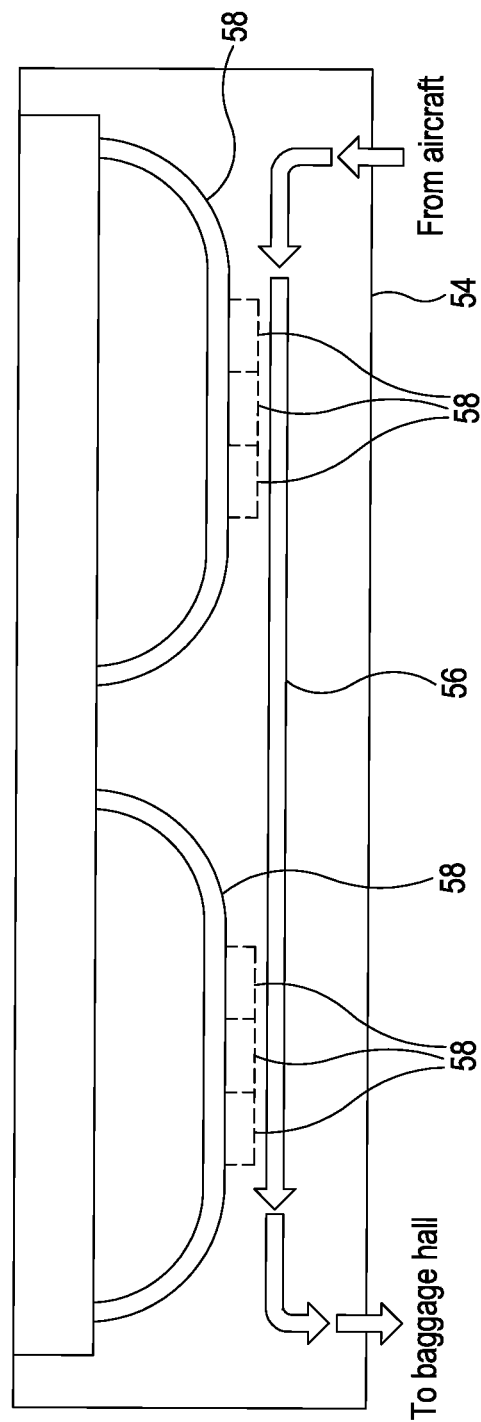
FIG. 8 is a diagrammatic plan view of a second part of a baggage handling system according to the disclosure.

A separate baggage hall 54 for the unloading of baggage is shown in FIG. 8. This baggage hall 54 includes a roadway 56 along which baggage dollies may travel. Two baggage carousels 58 are shown, the parts shown being in the baggage hall 54 and a further part of the baggage carousels 58 being within a baggage reclaim hall (not shown) which is accessible by passengers. Baggage dollies can therefore enter the baggage hall 54 along the roadway 56, pull into unloading bays 60, unload their cargo, either automatically or manually, as disclosed above, and then proceed back to the first baggage hall 16 in order to collect further cargo or baggage. The baggage on the baggage carousel 58 will then proceed to travel to the baggage reclaim hall where passengers may pick up their bags.

The baggage hall 54 for unloading may be adjacent to the baggage hall 16 for loading or may be in another part of an airport. However, it is preferable for baggage dollies to be able to travel between the two in order that they can complete both loading and unloading operations.

A further advantage of the use of autonomous baggage dollies in a baggage handling system is that a direct aircraft-to-aircraft baggage handling operation can be achieved for connecting flights.

In a highly integrated version of such a plane-to-plane baggage handling operation, the initial loading operation of baggage into ULDs may be coordinated such that all baggage destined for a connecting flight is put into a ULD only with other baggage destined for the same connecting flight. This ULD can then be loaded onto an aircraft. At the first destination, this same ULD will be recognised by the baggage handling system at the first destination as being required to be transferred to a second flight to a second destination. As such a baggage dolly can be instructed to take this ULD containing the baggage directly to the second flight, without any need to go back to a baggage hall for re-sorting of the baggage. This direct plane-to-plane operation clearly saves time over a comparable system where all baggage is subject to secondary sorting to separate connecting baggage to baggage already at its final destination.

A particular benefit of an automated baggage hall, in particular one where no human intervention is needed on-site, is that the autonomous baggage dollies and other systems do not require the same level of comfort as human operators, such as those who drive convention baggage tractors. As such, costs of maintaining ambient temperatures with heating and/or cooling systems, or even lighting the baggage hall or other parts of the baggage handling system, can be reduced. Whilst it may still be necessary to maintain the environment for optimum operation of the baggage dollies, the range of temperature, lighting levels, and other environmental characteristics may be allowed to fluctuate to a far greater extent than were human operators required on-site.

Swarm System

In order to improve the operation of the baggage dollies 100, they may be enabled to work as a swarm. The addition of swarm features allows the baggage dollies 100 to operate to complete a given task as a group and can assist in cases where one or more baggage dollies 100 have errors or systems failures, such as in their respective sensing systems 120. Redundancy of systems can therefore be provided by operating as a swarm.

Figure 7:
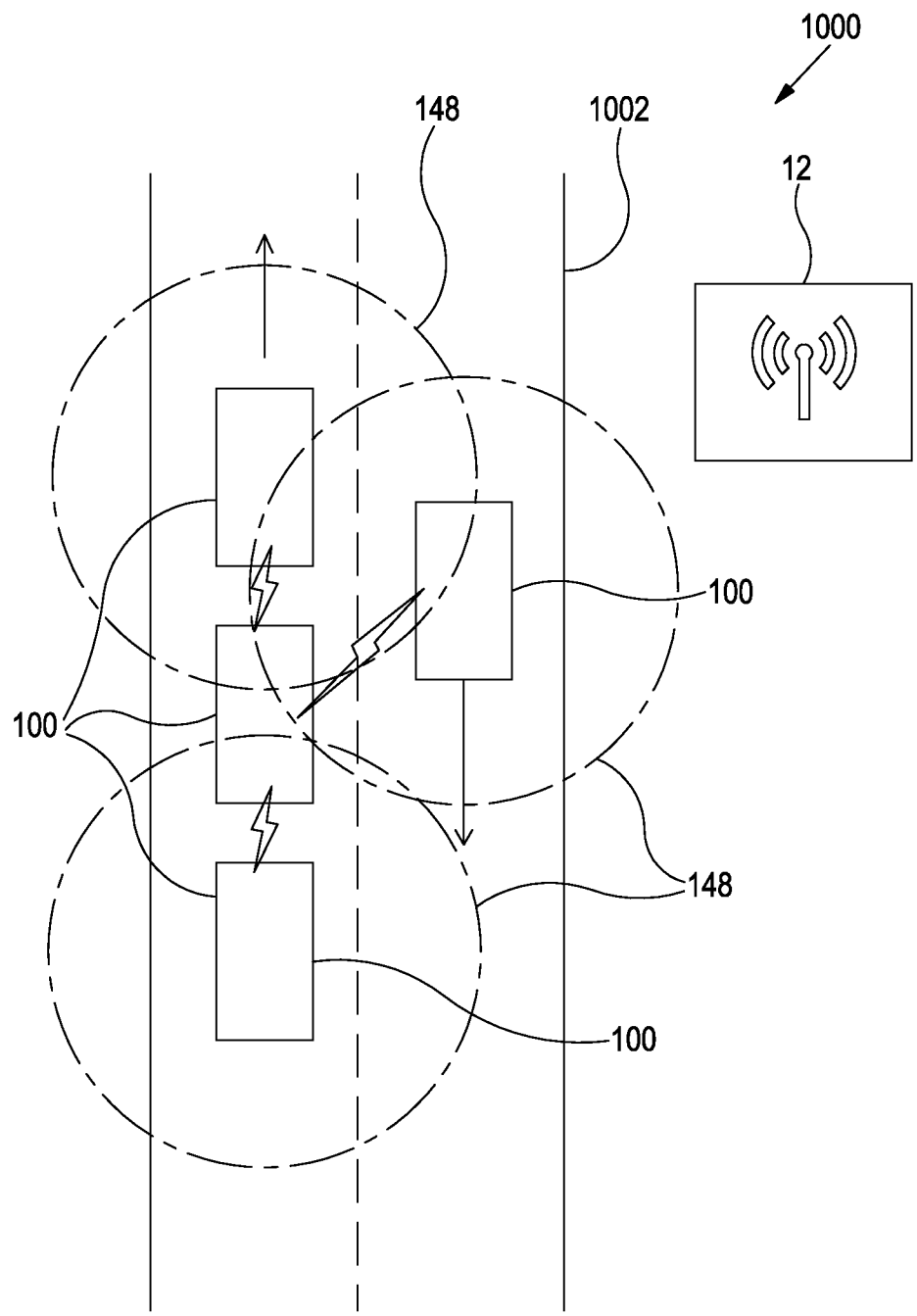
FIG. 7 is a simplified depiction of a swarm system of baggage dollies according to the disclosure.

A simplified version of a swarm system 1000 is shown in FIG. 7.

The swarm system 1000 includes a plurality of baggage dollies 100, in this case four, which are each provided with mission data from a central controller 12. The mission data includes information about a specific task, such as the delivery of baggage to a specific aircraft 20. The mission data may include a simple task whereby multiple baggage dollies 100 are required to each deliver baggage to the same aircraft 20, or may be more complicated whereby each baggage dolly 100 in the swarm 1000 is required to deliver baggage to a separate aircraft 20. However, in each case, the operating principles of the swarm system 1000 remain the same.

The swarm system 1000 of FIG. 7 includes four baggage dollies 100 travelling on a path 1002. Each baggage dolly 100 has a sensing system 120 as described above, the sensing system 120 providing a sensing zone 148 around each baggage dolly 100. The baggage dollies 100 are each configured to operate autonomously to carry out their respective tasks. The sensing system 120 of each baggage dolly 100 enables it to not only detect its own surroundings, but also to recognise other baggage dollies 100, and a communication system 150 allows the baggage dollies 100 to communicate with each other and a central controller 12. The central controller 12 may be hosted at a control room or other location remote to the dollies 100. In some example there may be multiple master controllers 12 or a distributed master controller 12. In cases where the master controller is duplicated or distributed a subset of the dollies 100 may be designated as master dollies, with each master dolly hosting a master controller or a part of the master controller. In this way each master dolly can be responsible for administering the actions of the other dollies around it. Each master dolly may be configured to communicate with each other master dolly in order to share resources and data.

The central controller 12 has given the three dollies 100 on the left defined mission data to deliver baggage to an aircraft 20. However, it can be seen that the sensing system 120 of the middle baggage dolly 100 has failed, resulting in the lack of a sensing zone 148 around the baggage dolly 100. In the swarm system 1000, the other baggage dollies 100 in the vicinity of the failed baggage dolly 100 can automatically compensate for the loss of the sensing system 120 of the failed baggage dolly 100.

The two baggage dollies 100 that are undertaking the same mission as the failed baggage dolly 100 can therefore use their own sensing systems 120 to communicate sensing data to the failed baggage dolly 100 so that it can continue on with the task despite lacking the ability to generate any sensing data of its own. This sensing data can then be used by the processor 116 of the failed baggage dolly 100 to provide the necessary control signals to the drive system 108. The sensing data or any other data communicated to the baggage dolly 100 may be termed "assistance data", when used to assist the failed baggage dolly 100.

When communicating data to another baggage dolly 100, a baggage dolly 100 may be considered to be operating in a transmitting mode. When receiving data from another baggage dolly 100, a baggage dolly 100 may be considered to be operating in a receiving mode. Any baggage dolly 100 may operate in both the transmitting mode and the receiving mode at the same time.

The fourth baggage dolly 100 is returning from its own, independent task, but can recognise, for example through communication from the central controller 12, that the failed baggage dolly 100 does not have a working sensing system 120. The fourth baggage dolly 100 can therefore also assist with providing sensing data, if necessary. Any additional sensing data the failed baggage dolly 100 receives can assist in its determination of location and subsequent completion of the task it has been assigned.

Although in the depicted embodiment the three correctly-operating baggage dollies 100 send sensing data to the failed baggage dolly 100 so that its processor 116 can use this data to continue to operate normally, it is also possible for the swarm 1000 to operate in a master and slave mode. In such a scenario, sensing data about the failed baggage dolly 100 can be processed with the mission data in one or more of the other baggage dollies 100 of the swarm 1000 in order to directly provide control signals to the failed baggage dolly 100. The failed baggage dolly 100 can therefore continue to operate in the event that more of its processing systems are failing to work correctly, as the control signals may be passed directly to the controller 114 without any additional processing from the processor 116 of the failed baggage dolly 100.

When operating as a swarm 1000, one or more of the baggage dollies 100 may operate autonomously in view of the mission data in order to ensure that all tasks of the swarm 1000 are completed, even in the event of a failure of one of the baggage dollies 100 within the swarm 1000. For example, one baggage dolly 100 of the swarm 1000 may fail on its way to deliver baggage to one aircraft 20, whilst the other baggage dollies 100 of the swarm 1000 are on their way to other aircraft 20 at that time. In view of the failure, another baggage dolly 100, acting as a chaperone baggage dolly 100, may operate independently or in response to an instruction of the central controller 12 to chaperone the failed baggage dolly 100 to its destination either prior to or after delivering the baggage of the chaperone baggage dolly 100 to its destination. The same or another baggage dolly 100 operating in as a chaperone baggage dolly 100 may then take the failed baggage dolly 100 to a repair station where it can be assessed or fixed.

Of course, a failed baggage dolly 100 may continue to operate using data provided from the swarm 1000 up until a point at which it can be repaired, for example at the end of the day. Up until such a time, the remaining fully-functioning baggage dollies 100 of the swarm 1000 can continue to compensate for the failure of any failed baggage dollies 100 in order to ensure that every load of baggage or other cargo can be collected and delivered to its required destination.

Although the failed baggage dolly 100 may no longer be able to sense or output its own sensing data, other data may be provided to other baggage dollies 100 in the swarm 1000 or to the central controller 12. For example, diagnostic data or error data that may be helpful to the swarm 1000, or may be helpful in diagnosing the fault or correcting the fault, may be communicated by the communication system 150 of the failed baggage dolly 100.

The swarm system 1000 can also used to calculate which dollies should be allocated a task in dependence on various factors. The factors may include: remaining range, geographical position and the need to do a given task. Calculations are made in an algorithm of the swarm system 1000 to optimise the dolly selection in order to do the job and to allow them to come together from varied locations in order to complete the task. The algorithm comprises a cost function, wherein the main cost is overall time taken. Other costs may be energy expenditure or distance travelled. Further factors may include whether further tasks are required in the vicinity of the first task and what the capabilities of the dolly are. For example, the swarm system 1000 may comprise both cargo and baggage dollies. A task is issued that requires the transport from a first location to a second location. Usually a baggage dolly would be a best option. However, a second task is issued that requires the transport of two ULDs from the second location. As the cargo dolly is operable to carry either one or two ULDs then a cargo dolly is selected that has enough range to complete both tasks.

Platooning

In addition to or alternatively to operating in a swarm, baggage dollies may also work together to operate in a predetermined formation known as a platoon. Operating in a formation may allow a plurality of autonomous baggage dollies to travel closer together and more intelligently than the same plurality of baggage dollies operating independently.

Figure 15:
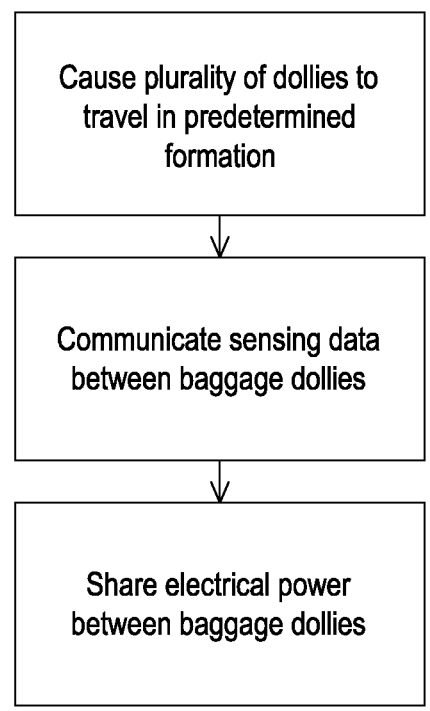
FIG. 15 is a method of operating a plurality of baggage dollies in formation.

A method of operating in a platoon mode is shown in FIG. 15.

Autonomous baggage dollies operating in a platoon mode may be configured to run in a predetermined formation, such as a single-file train formation. The predetermined formation may allow the baggage dollies to travel more closely together by providing communication between the dollies that allows them to dynamically respond, effectively as a single entity, to any obstructions, obstacles, or stimuli that may occur in the path or close to the baggage dollies.

Operating as a platoon in a train formation is advantageous over operating as a conventional, physically-attached, train in that each baggage dolly can follow the path of the baggage dolly in front, without suffering from any cutting of corners, as would be usual in a physically-attached train. This allows the platoon of baggage dollies to navigate tighter turn radii but also allows the operation of longer trains where desirable. The trains can also operate at a single separation distance, one of a plurality of separation distances, or at a variable separation distance, without any physical alterations being required to the baggage dollies.

Dynamic response of the platoon to stimuli may be accomplished by one or more lead baggage dollies providing instructions based on the sensing system of the lead baggage dollies to one or more following baggage dollies. Thus, all the baggage dollies can respond appropriately, such as to speed up, slow down, or to change course in order to avoid an obstacle. Operating as a platoon therefore not only allows many baggage dollies to travel together but may also lower the overall processing power required by the platoon as only one of the baggage dollies needs to determine how to navigate an obstacle or appropriately respond to a stimulus. When operating as part of the swarm system 1000, the dollies may also be selected to form a platoon, possibly based on the same or similar criteria used in task allocation.

In addition to responding to stimuli as a single entity, a platoon may respond in other ways. For example, if the leading baggage dolly is prevented from moving by an obstacle, the following baggage dollies may be diverted past the leading baggage dolly, causing the first following baggage dolly to take over as the leading baggage dolly. The remaining baggage dollies may continue as before, following the baggage dolly immediately in front. Once the platoon has passed the obstructed baggage dolly, it may be able to manoeuvre itself around the obstacle without impeding the movement of the remaining baggage dollies. It can then continue to operate independently or may re-join the platoon.

Independent operation, swarm, and platoon modes may be used interchangeably, sequentially, or concurrently by a single baggage dolly, depending on the particular task assigned to the baggage dolly. For example, independent operation may be preferable for loading of baggage dollies, with these same baggage dollies forming a platoon to exit the baggage hall and reacting to provide swarm assistance to a baggage dolly that failed whilst in the platoon or operating independently. Thus, although each mode will be individually usable, it will also be possible to operate in multiple modes simultaneously or consecutively.

Retro-Fitting Baggage Dolly

Figure 4:
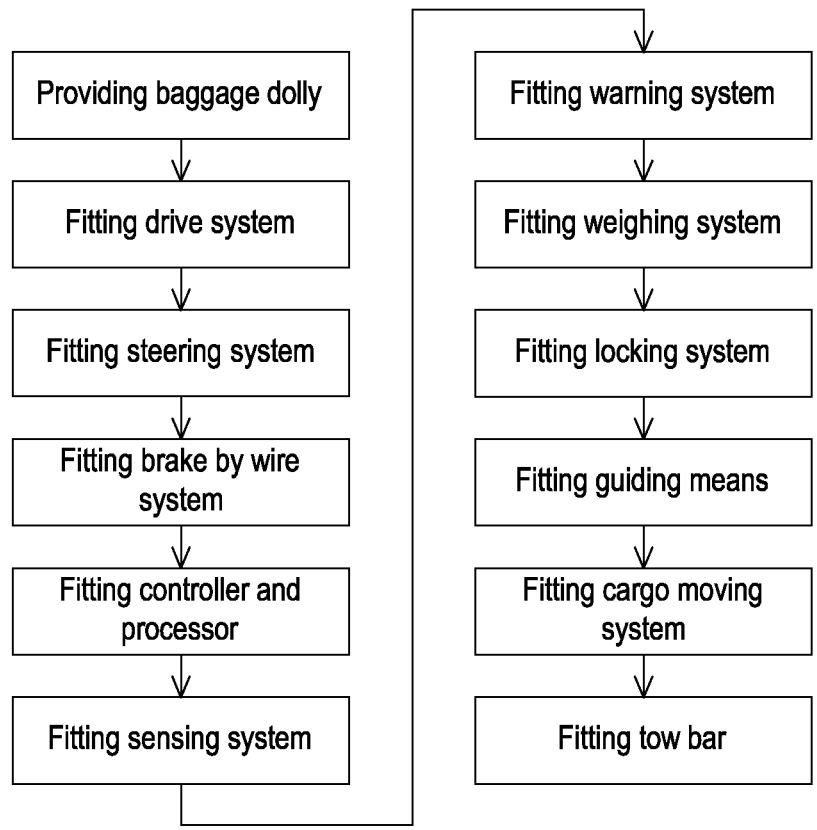
FIG. 4 is a flow diagram of a method of retro-fitting a baggage dolly to provide a self-propelled or autonomous baggage dolly.

Any of the systems that form a part of the baggage dolly 100 depicted in FIG. 2 can be provided as retro-fit systems that can be fitted to a pre-existing baggage dolly, such as one that is neither self-propelled nor autonomous. By retro-fitting these systems, such as the drive system 108, controller 114, processor 116, sensing system 120, locking system 138, weighing system, warning system 134, and/or guiding system 142, the advantages of each system can be provided to a pre-existing baggage dolly. Moreover, it will be known that many airport baggage handling systems have many tens, hundreds, or even a thousand or more of pre-existing baggage dollies and that therefore it is desirable to utilise these pre-existing baggage dollies when looking to provide a self-propelled or autonomous baggage dolly as described in the present disclosure. A method of retro-fitting a baggage dolly is therefore shown in FIG. 4.

The method of retro-fitting the baggage dolly may include fitting any one or multiple systems as described previously in the present disclosure. Where necessary, it will be apparent that it is necessary to modify parts of the pre-existing baggage dolly in order to enable the baggage dolly to be retro-fitted with any given system. For example, in order to provide a drive system 108, the pre-existing axles, wheels, suspension, or other underpinning of the pre-existing baggage dolly may require removal.

In another example, the retro-fitting of the sensing system 120 may require the drilling of holes to house the sensors or the addition of parts to support the sensors, such as addition of pylons 146 on which camera sensors 126—and the lights 132 of the light system 130—can be mounted. Therefore, retro-fitting of any of the systems may require adaptation of the pre-existing baggage dolly, dependent on the specific features of the pre-existing baggage dolly.

However, many features of the pre-existing baggage dolly may be utilised in the retro-fitted systems. For example, the wheels may be used in the drive system 108, the platform may be retained and a pre-existing locking system may be adapted to provide an automated locking system 138 in accordance with the present disclosure.

Figure 9:
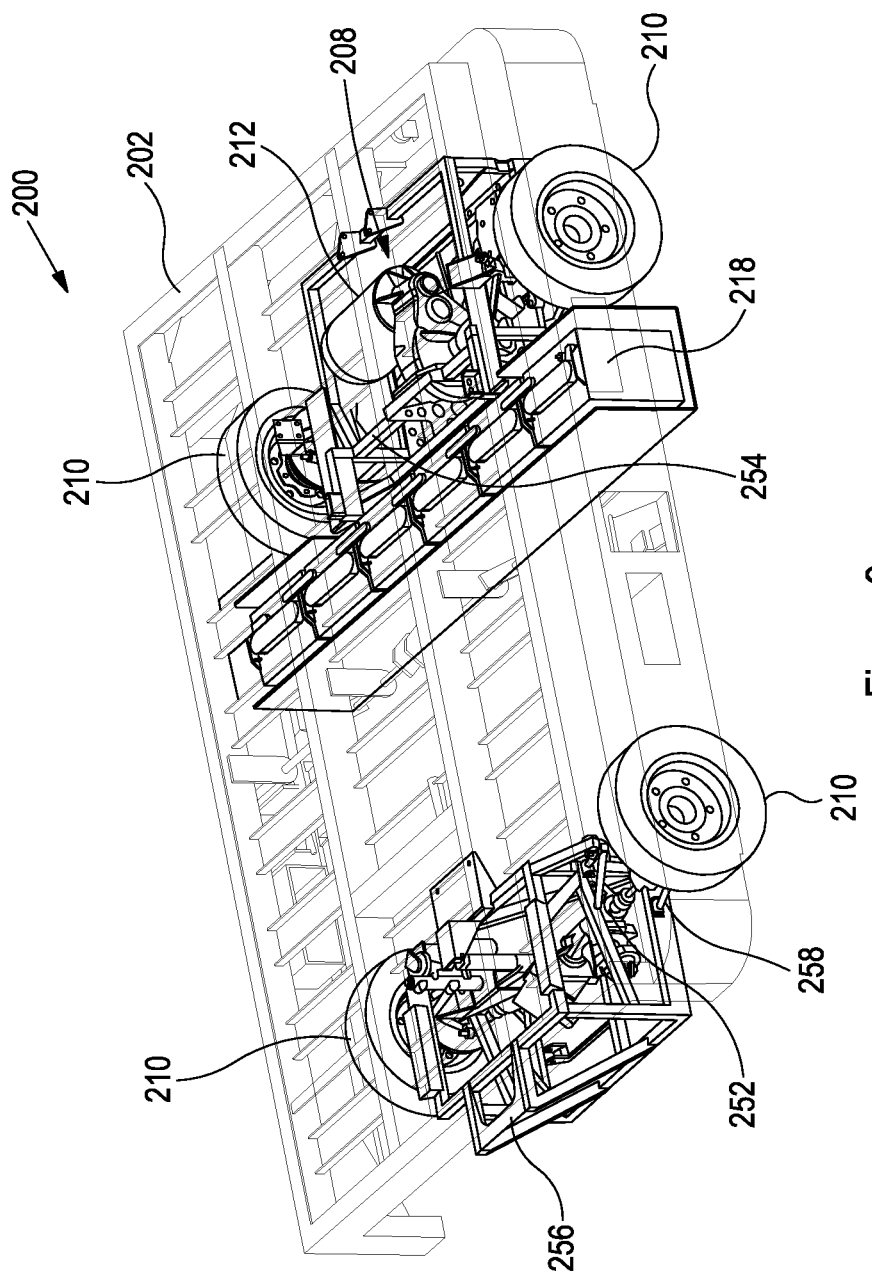
FIG. 9 is a perspective view of a second embodiment of a baggage dolly according to the disclosure, showing the drive system.
Figure 10:
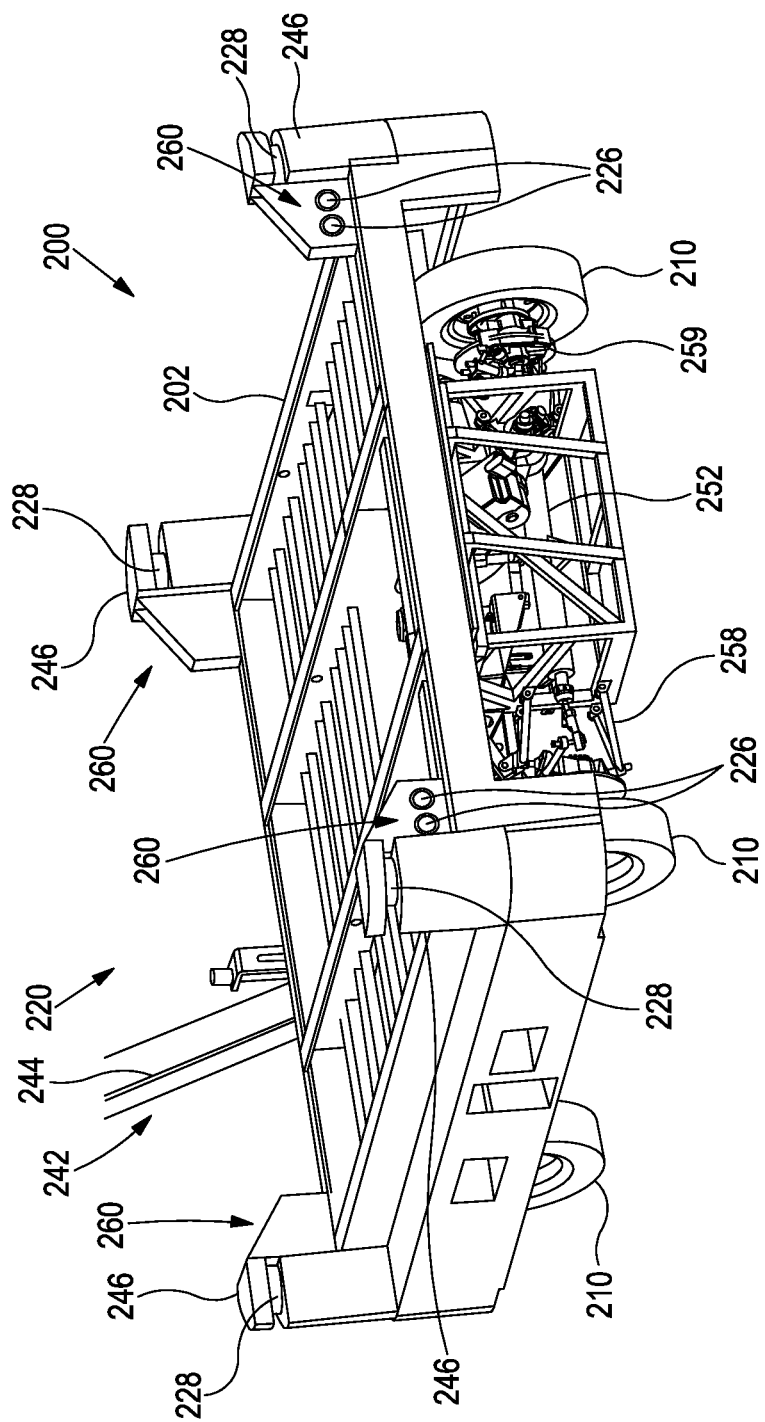
FIG. 10 is a second perspective view of the baggage dolly of FIG. 9, additionally including a guiding system and sensing system.

A second embodiment of a baggage dolly 200 is shown in FIGS. 9 and 10. More specifically, the second embodiment shows how a drive system 208 and sensing system 220 can be added to the platform 202 from a conventional baggage dolly in order to provide an autonomous baggage dolly 200.

As shown in FIG. 9, the baggage dolly 200 includes a platform 202 from a conventional baggage dolly. The platform 202 is shown as transparent, and therefore the drive system 208 can also be seen. The drive system 208 comprises four wheels 210, two of which are driven by a motor 212 mounted between them, the other two wheels 210 being steered using a steering mechanism 252. A battery 218 comprising five cells provides the power for the drive system 208 and all other systems in the baggage dolly 200.

The driven wheels 210 and motor 212 are mounted on a first space frame 254 towards the rear of the baggage dolly 200, and the steering wheels 210 and steering mechanism 252 are mounted on a second space frame 256 towards the front of the baggage dolly 200. The space frames 254, 256 allow the drive system 208 to be connected as two parts to the platform 202 of the conventional dolly, which acts as a chassis. Each wheel 210 is connected to its respective space frame 254, 256 by suspension 258 in order to provide a better ride for the baggage dolly 200. Braking of the dolly 200 may be provided through regenerative braking via the motor 212, or through application of a friction braking system 259 provided by, for example, a brake disc being clamped by brake calipers. The friction braking system 259 is connected to at least one of the wheels 210, and may be fitted between the suspension 258 and the wheel 210. The braking may be implemented via a brake by wire system.

For using regenerative braking a brake signal is provided to the motor 212 to provide negative torque to the wheels 210. Alternatively, or as well a braking signal may be provided to a brakes controller which provides a signal to actuate the friction braking system 259. The brakes controller may be comprised within the controller 114. Regenerative braking may be prioritised over friction braking in general use in dollies equipped with both systems. In emergency stop scenarios (i.e. when rapid deceleration is required) friction braking may be prioritised over regenerative braking.

FIG. 10 shows the baggage dolly 200 of FIG. 9 but with the platform 202 shown as opaque and the sensing system 220 added. The sensing system 220 of this embodiment includes four pylons or turrets 246 positioned at the corners of the platform 202. Each turret 246 houses a LIDAR sensor 228. The LIDAR sensors 228 have overlapping fields-of-view with adjacent LIDAR sensors 228, in order to give full sensing coverage around the perimeter of the baggage dolly 200.

In addition to the LIDAR sensors 228, each turret 246 also includes two camera sensors 226, which operate together in order to provide a stereoscopic camera 260 at each corner of the baggage dolly 200. Two of the stereoscopic cameras 260 point in a forward direction of the baggage dolly 200 and the other two of the stereoscopic cameras 260 point in a backward direction of the baggage dolly 200. The camera sensors 226 therefore give an enhanced view of the scene at the front and rear of the baggage dolly 200.

The baggage dolly 200 also includes a guiding system 242 comprising a guiding arm 244. This guiding arm 244 acts in the manner described above and therefore further description is omitted.

As part of the retrofitting a steering system may also be equipped to the baggage dolly. The steering system may comprise a steerable axle or a plurality of wheel steering actuators, configured to steer each wheel independently. A steering controller is also provided, the steering controller in communication with the controller 114 to carry out steering requests. The steering controller may be part of the controller 114.

As part of the retrofitting a brake by wire system may also be equipped to the baggage dolly. The brake by wire system may comprise a friction braking system and/or a regenerative braking system, configured to brake one or more of the wheels or axles. A braking controller is also provided, the braking controller in communication with the controller 114 to carry out braking requests. The braking controller may be part of the controller 114.

As well as or instead of the provision of steerable wheels the dolly may also be equipped with a second set of wheels. The second set of wheels are deployable wheels that are configured to be deployed in a vertical direction to become ground engaging wheels, removing the dolly's main set of wheels from the ground.

Loading and Unloading

The loading and unloading of baggage dollies may be eased by the use of a platform 302 or loading deck that includes one or more rollable element 362. These elements 362 can reduce the resistance to loading and unloading that would otherwise be necessary to overcome when loading ULDs or other cargo.

Figure 11:
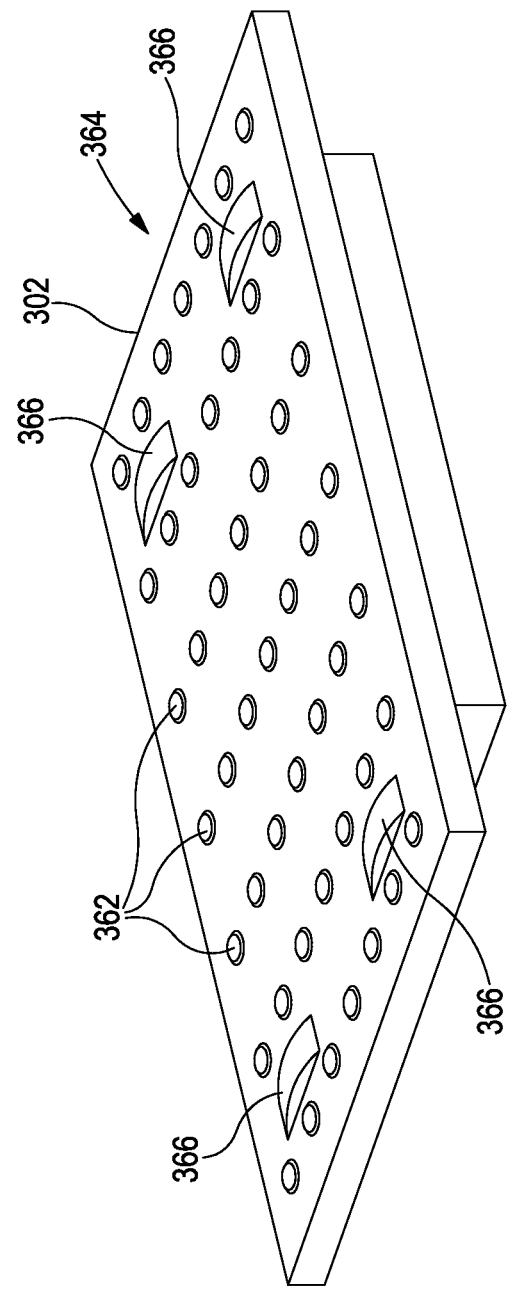
FIG. 11 is a perspective view of a platform of a third embodiment of a baggage dolly according to the disclosure.

In the depicted platform 302 of FIG. 11, a total of forty-nine rollable elements 362 are provided in a seven-by-seven grid. However, any number or arrangement of rollable elements 362 may be provided. A platform 302 such as the one depicted in FIG. 11 may be applied to any baggage dolly, including any of those described in the present application.

Each rollable element 362 comprises a ball within a corresponding socket, the ball being freely rotatable within the socket. The rollable elements 362 therefore act together to support cargo on the platform 302 and to allow the cargo to move relatively freely on and off the platform 302. Of course, the ULD or cargo can then be secured using a locking system as described previously.

In addition to the rollable elements 362, the platform of FIG. 11 also includes a cargo moving system 364 in the form of four cargo wheels 366. The cargo wheels 366 are configured to provide a motive force to cargo, in this embodiment ULDs, positioned on the platform 302 in order to allow them to be pushed off the platform 302 without the need for intervention from a human or other machine. The cargo wheels 366 are therefore aligned perpendicular to the direction of forward motion of the platform 302, in order that a ULD will be loaded and unloaded off the side of a baggage dolly including such a platform 302. The cargo wheels 366 can therefore operate to push ULDs off the platform 302 onto loading bays in a baggage handling system, or onto aircraft, or into a ULD store, for example.

Although the cargo moving system 364 is provided in the form of four cargo wheels 366, a greater or lesser number of cargo wheels 366 may be provided. These may be oriented in any direction that is useful for the movement of cargo and/or may be movable in their alignment in order that the direction of movement is controllable, either automatically or manually, such as for adjustment of the orientation of the ULD or other cargo once in position on the platform 302. The cargo moving system 364 may include any mechanism that can provide motive force to cargo on the platform 302, including but not limited to wheels, pulleys, belts, or other such mechanisms.

The cargo moving system 364 may also operate to pull cargo onto the platform 302. In the depicted embodiment, this will only be possible once the cargo is at least partially on the platform 302, due to the arrangement of the cargo wheels 366. However, the cargo moving system 364 may include means for pulling cargo that is not on the platform 302 onto the platform 302.

In order to enable cargo or ULDs to be passed from loading bays onto platforms 302 of the baggage dollies, the loading bays themselves may also include cargo moving systems 364. The platform of FIG. 11 may therefore be built into a loading bay in order that it, together with a platform 302 on a baggage dolly, may be able to transfer cargo from the loading bay to the baggage dolly without any further intervention from a worker or another external system. Similarly, cargo moving systems 364 may be provided on aircraft or on aircraft loading machinery, in order that the entire end to end baggage handling system may be mechanised or automated.

Figure 12:
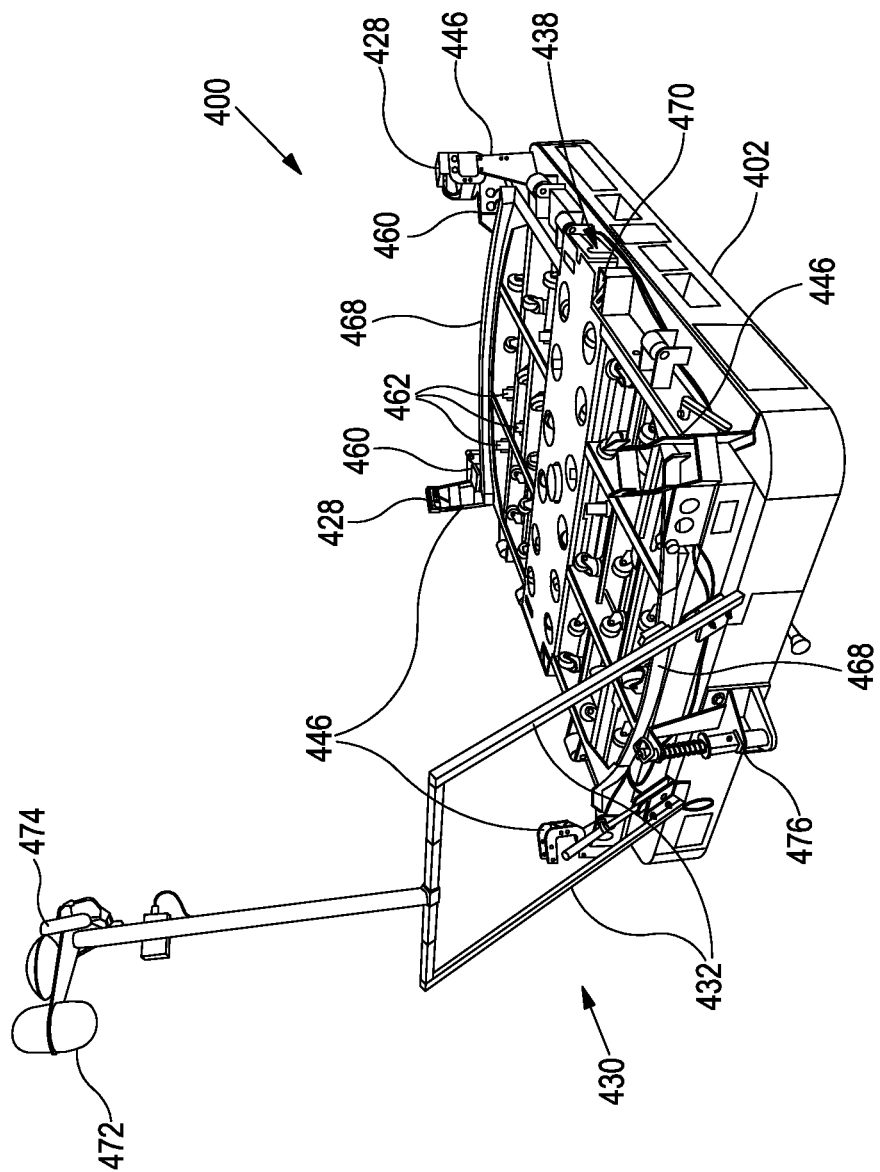
FIG. 12 is a perspective view of a platform of a fourth embodiment of a baggage dolly according to the disclosure.

A further embodiment of a baggage dolly 400 is shown in FIG. 12, which incorporates a platform 402 with rollable elements 462 for the movement of cargo. The rollable elements 462 may be unpowered as shown, such that they passively allow movement of the cargo and some or all may be powered and/or steerable to enable the cargo to be moved on, off, or around on the platform 402 under the power of the baggage dolly 400.

The platform 402 also includes raised edges 468 to guide the cargo. The raised edges 468 are shaped to allow the turning, i.e. spinning, of a ULD when in position on the platform 402, in order that it can be re-orientated depending on requirements. A locking system 438 is provided that secures ULDs by providing protrusions 470 that slide upwards to about a ULD when it is in position, preventing movement.

The baggage dolly 400 includes four turrets 446, two of which are shown with LIDAR sensors 428 and stereoscopic cameras 460 in place. In normal use, the remaining two turrets 446 would also be fitted with LIDAR sensors 428 and stereoscopic cameras 460 in their respective positions.

A light system 430 is provided on the platform that includes two sets of lights 432 that change colour in response to the autonomy mode of the baggage dolly 400. A rotating beacon 472 is also affixed to the top of the light system 430, which can provide further warnings to pedestrians that the baggage dolly 400 is currently in operation. Adjacent to the rotating beacon 472, an antenna 474 is placed to communicate with other baggage dollies, a central controller, or to receive signals, such as from a GPS satellite or base station.

The baggage dolly 400 also includes a towing point 476, which is figured to receive a tow bar or guiding arm of another baggage dolly, when required. The depicted baggage dolly 400 can therefore lead or pull the other baggage dolly if, for example, the other baggage dolly cannot sense or drive for itself.

Operating a Dolly as a Bridge

Figure 24:
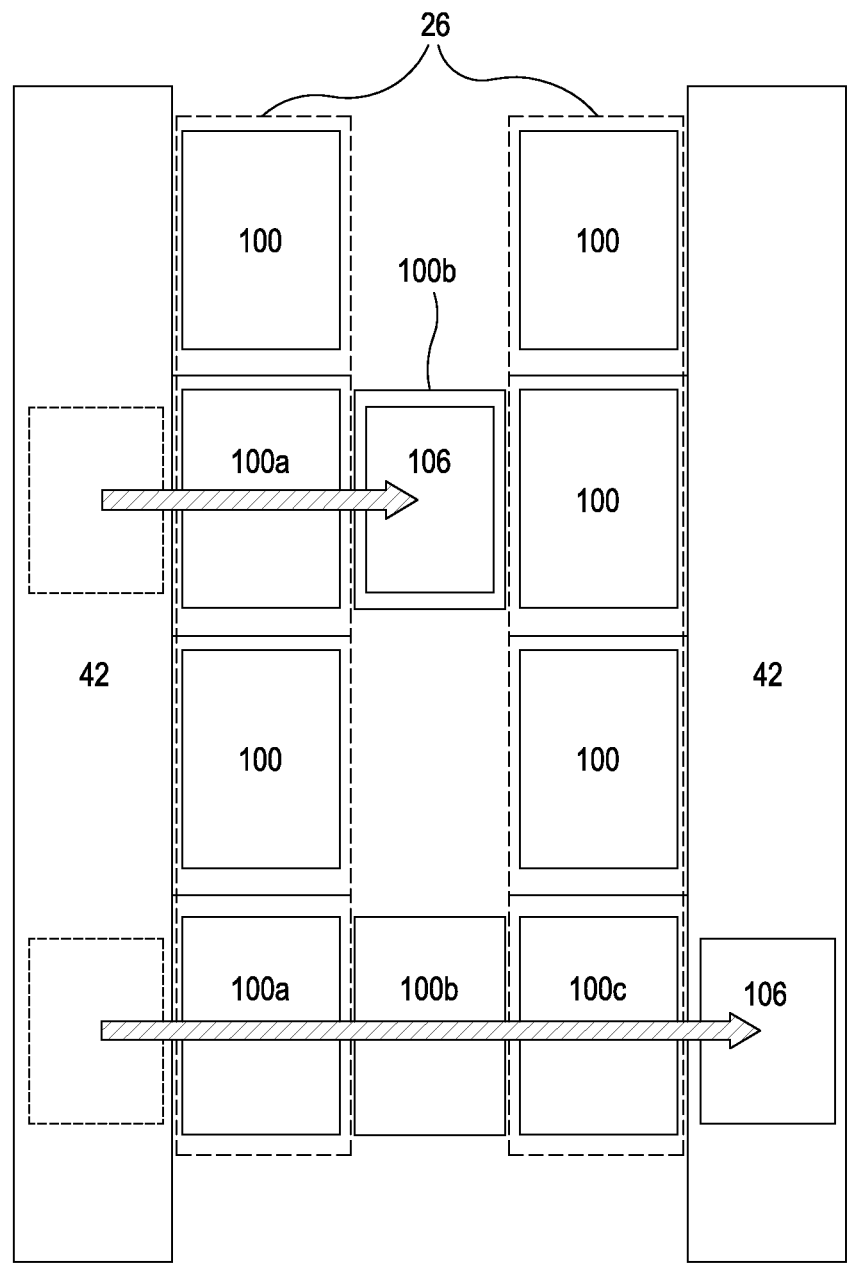
FIG. 24 is a yet further diagrammatic plan view of a part of a baggage handling system according to the disclosure.

Using the rollable elements 462 it is possible to utilise the dolly 100 as a bridge such that a dolly that is not adjacent to the lateral 42 may still be loaded. FIG. 24 provides two examples of such a configuration in operation. In a first example the ULD 106 (or other storage means or cargo) is provided at the lateral 42 and transferred to a first dolly 100*a*. The ULD 106 is then transferred to a second dolly 100*b*, the second dolly 100*b* be positioned laterally adjacent to the first dolly 100*a*. This allows for loading of more dollies in single loading area, making use of the central space between the loading bays 26

In a second example the ULD 106 is provided at the lateral 42 and transferred to a first dolly 100*a*. The ULD 106 is then transferred to a second dolly 100*b*, the second dolly positioned in the space between parallel sets of loading bays 26. The ULD is then transferred again, from the second dolly 100*b* to a third dolly 100*c*, the third dolly being laterally adjacent to the second dolly as well as laterally adjacent to a further lateral 42, running parallel to the lateral 42 from which the ULD originated. The ULD is then transferred again, from the third dolly 100*c* and on to the further lateral 42. This may be useful for ULDs, cargo or baggage that is being transferred or may require removal. For example, a damaged ULD on the first lateral will disrupt the flow of the system if the only removal option is through transferring it back on to the first lateral or removing the dolly. Moving it to the second lateral allows for the continuation of the flow of cargo from the lateral 42 to the dollies (or vice versa) whilst recovering the damaged ULD. If repairable then the ULD can then be transported in the opposite direction, i.e. back towards the first lateral, without needing to be re-routed.

Operation in Sub-Optimal Conditions

In some situations, such as in airports operating in extreme weather such as extremely high or low temperatures, it may still be necessary under some circumstances for a self-propelled or autonomous baggage dolly to operate in a non-driven mode.

As a non-limiting example, in extremely low temperatures it is known that batteries may lose capacity or be prevented from providing the required power to powered systems. In such circumstances, baggage dollies may operate autonomously whilst in areas protected from the temperatures, such as in a baggage hall, but may then physically attach themselves to an internal combustion-powered baggage tractor—or park in order to be manually tethered by an operator—when it is necessary to be outside, such as when delivering the baggage to an aircraft. The baggage tractor may then pull the autonomous baggage dollies as a conventional baggage train to one or more aircraft before returning them to an environment where they may return to autonomous operation. The internal combustion-powered baggage tractor may be autonomous or human-driven.

In order to enable the towing of the baggage dollies, in this case the baggage dollies may each include a conventional tow bar or a retractable tow bar that can be stowed when not in use. For example, the tow bar may be retracted into the platform of the baggage dolly or may be pivoted out of the way, such as upwards. Such a tow bar may be combined with the guiding system as described above, in order to minimise the need for additional parts.

As well as providing motive force to the baggage dollies whilst in a train, the internal combustion-powered baggage tractor may include means for recharging the batteries of the baggage dollies in the train, such as through the tow bar or via a separate electrical connector. This may allow the baggage dollies to operate for longer than would otherwise be possible without stopping for a dedicated recharge.

Although described in relation to cold temperatures, a solution such as that described above may be suitable for any situation in which self-propelled or autonomous baggage dollies are incapable of operating independently to the extent required to complete their required tasks.

Start-Up Process

Each dolly 100 may be required to power down for periods. This is particularly true overnight, when many airports cease operating for a specified amount of time. When starting up the dolly may be required to confirm its sensor calibrations are correction and/or recalibrate accordingly. The dolly 100 will therefore conduct a self-check upon start-up.

Figure 25:
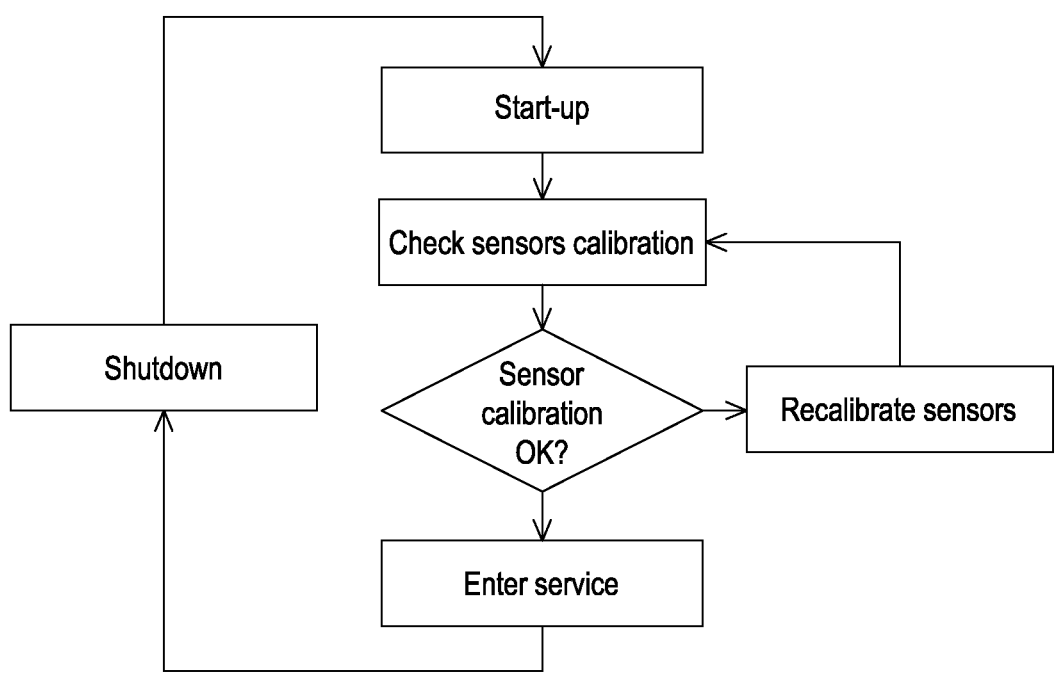
FIG. 25 is a method of implementing a start-up procedure for a dolly.

A method of running a start-up procedure for an autonomous dolly is shown in FIG. 25.

After a period of being shut-down the dolly will automatically start-up at a given time. The time of start-up may be set by a timer, an internal clock, or through receipt of a 'wake-up' signal received from a central controller. Once activated, the dolly will commence a check to confirm that its sensors calibration is correct. The checks are dependent upon the sensor types. For image sensors or similar a known images, such as a grid, pattern or other identifiable image may be used. The image may be displayed on a target board which may be mounted at a particular position, and/or be portable, to allow in-field calibration. If the image sensors identify features of the image correctly then the calibration is correct. If the features are identified incorrectly then recalibration is required. For position sensors the dolly 100 may be placed or have shut itself down in a known location. A position measurement can then be taken using the position sensors and compared with the known location. If the position sensors identify the position of the dolly 100 correctly then the calibration is correct. If the position is identified incorrectly then recalibration is required. Distance and orientation sensors can be checked similarly to the position sensors. The dolly 100 may be placed or have shut itself down in a known location and orientation. The distance sensors can take measurements to known features or positions relative to the dolly's position and orientation. If the distances sensors identify the position and orientation of the dolly 100 relative to the features correctly then the calibration is correct. If the positions and/or orientation is identified incorrectly then recalibration is required.

If an error in calibration is detected then the dolly undergoes recalibration. This may be done automatically, and may be implemented using the same features identified above for checking calibration. An operator may instead do the recalibration and/or check that the calibration is correct once recalibrated. Once recalibrated the sensors are rechecked. Once the sensors are confirmed as having a correct calibration the dolly is permitted to enter service.

Similar checks may be performed with the dolly's communication systems. A communication may be sent from the dolly to a master controller, another dolly or another suitable location, if the dolly then receives a confirmatory communication then this is confirmation that the communication system is working correctly and the dolly is permitted to operate. If not then the dolly issues an error message and either stays where it is or returns for servicing.

User Interface

In systems that use both operators and autonomous dollies it may be beneficial to provide a user interface system by which an operator may interact with the dolly. Even in non-mixed systems (i.e. systems comprising only autonomous dollies in an operation area) providing a user interface system allows for inspection, maintenance, diagnostics and other interactions with the dolly without the need for specialist programming knowledge.

Figure 26:
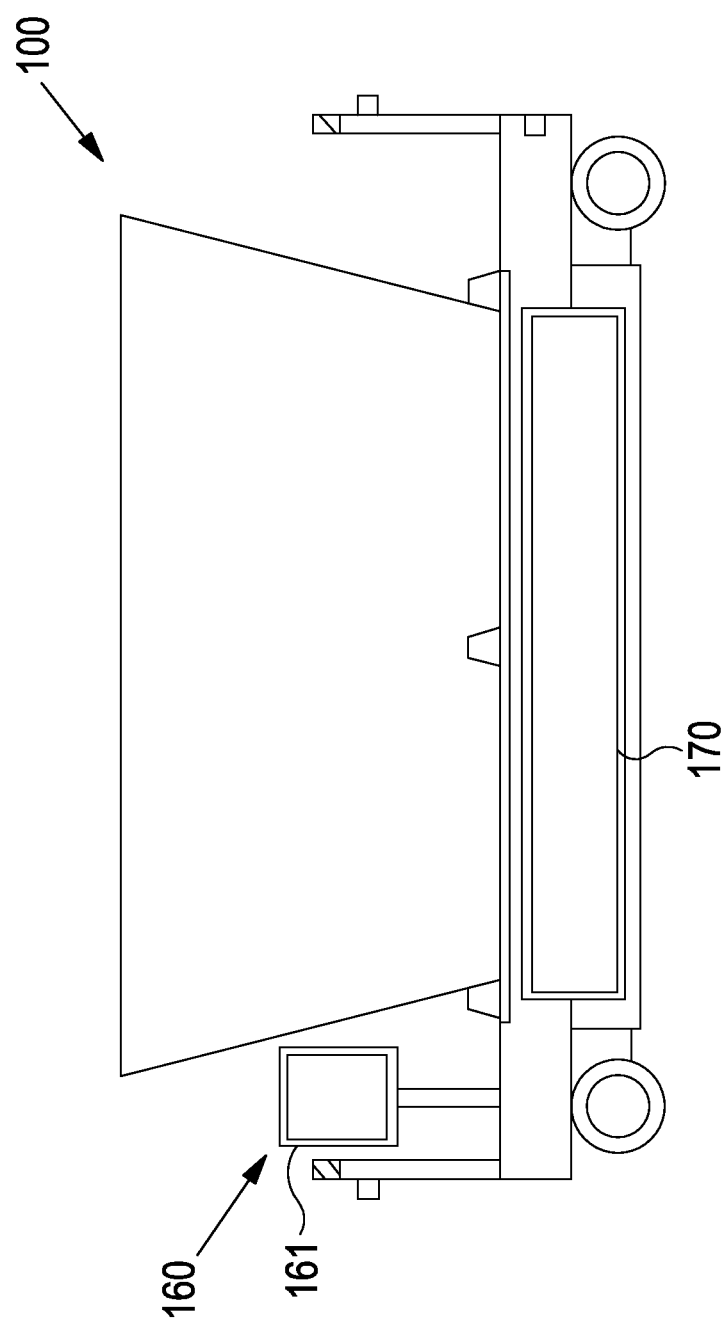
FIG. 26 is a side view of a baggage dolly according to the disclosure.

The dolly 100 shown in FIG. 26 is predominantly identical to the dolly of FIG. 2; some features have been omitted for ease of clarity. The dolly further comprises a user interface system 160. The user interface system 160 comprises a user interface 161 in the form of a touch screen. Other interface options may be provided as well or instead, such as a display screen and keyboard for example. They interface means may be provided as a scannable element or similar that allows an operator to connect a personal computing device (such as a handheld mobile electronic device, laptop or tablet) to the dolly in order for the personal computing device to be operable as the interface means.

The user interface 161 may display an intended set of actions that the dolly 100 is planning to carry out. The display may also provide a confirmation selection, by which an operators can confirm or reject the proposed actions. The user interface may further provide other adjustable options, such as task allocation, route adjustment or manual override. This may be particularly useful if an unexpected environmental error occurs, such as a blockage in an intended route. An operator may then be able to provide an alternative route to the dolly 100.

Display System

FIG. 26 also shows a further system that may be used as well as or instead of the user interface system 160. A display means 170 is provided that is operable to display information to operators or other personnel proximal to the dolly 100. The display means may comprise a seven segment display, a dot matrix display, LCD, or LED display, or any other suitable display type. The display is sized and positioned such that any information it displays is visible to operators and other personnel in the vicinity of the dolly 100. Whilst the display means 170 is shown as being mounted to the side of the dolly, other locations and orientations may be suitable, dependent on the configuration and use case of the dolly. Multiple display means 170 may also be used, one on each side of the dolly for example. Further display means 170 may also be positioned at the front and/or the back of the dolly 100. The information to be displayed on the display relates to the current task and/or the current cargo of the dolly.

As discussed above the various different types of airside dollies may be configured ro or capable of transporting various types of goods and cargo. The cargo that is being carried by the dolly may simply be baggage, or it may also be hazardous goods, or perishable items (such as medical supplies—e.g. blood for transfusions). Displaying that the dolly 100 is carrying hazardous goods provides improved awareness of possible risk to nearby operators and other personnel, thereby increasing safety and improving decision making for nearby operators. Displaying that the dolly 100 is carrying perishable items may allow for swifter interventions, thereby preventing the loss of goods, should the dolly become stuck for whatever reason (perhaps due to an obstruction on intended path or due to a sensor error).

The tasks of the dolly will generally include a target destination. The target destination may be a particular lateral or bay, a charging station, an aircraft at a particular position on the airport, or any other airport location. Displaying the target location allows identification of errors; for example, if a dolly is displaying that its destination is a particular lateral in a particular location, but is travelling in an unexpected direction, an operator can identify this and raise the issue with the central controller or by querying the dolly via its user interface 161 if it has one fitted. The next manoeuvre to be conducted by the dolly may also or instead be displayed. Displaying the next manoeuvre (such as next turn that the dolly will take) may increase safety and reduce delays as it provides an improved indication of the dolly's travel path. This provides a warning to nearby operators who may have otherwise crossed the intended path. Preventing these crossings reduces the chances of collision and also improves efficiency as it reduces the delays through the dolly becoming obstructed by pedestrians.

The display may also provide information on error states. The error states may be related to the autonomous operation, for example a sensor failure or an inability to find a correct path, or may be related to other errors, such as an incorrectly latched or unlatched cargo.

Conventional Baggage Dollies

Although described in relation to self-propelled and autonomous baggage dollies, many of the systems described herein may be applied to more conventional baggage dollies, either as by design or as retro-fitted systems.

For example, the a locking system as disclosed above may be installed or designed into a conventional baggage dolly in order to prevent the loss of cargo from the baggage dolly without requiring manual locking. Similarly, a weighing system could be installed or designed into a conventional baggage dolly in order to obtain weight data of cargo prior to loading. The ability to provide systems on conventional baggage dollies is not limited to the locking system and weighing system.

Of course, where additional systems are added to a conventional baggage dolly, it may be necessary to provide power to the baggage dolly. Therefore, a battery, electrical inlet, or other power source may be provided.

Each concept discussed in the present disclosure, except where otherwise provided, may be utilised independently or in combination with any other concept discussed. The skilled person will understand that the specific examples discussed are simply embodiments of the discussed concepts for illustrative purposes and that combinations disclosed in relation to one specific example are not intended to limit the different combinations that could be provided without departing from the scope of the disclosure.

The examples given below with relations to baggage dollies are equally applicable to cargo dollies, or any other airside dolly. Where an aspect of the disclosure is discussed in relation to a baggage dolly, unless otherwise necessary any feature of the described baggage dolly may be provided as part of a vehicle, such as a land vehicle, water vehicle, air vehicle, or road vehicle.

The invention claimed is:

1. A self-propelled airside dolly, comprising:
   a cargo portion configured to hold baggage or cargo;
   a drive system for driving the self-propelled airside dolly;
   a controller configured to control the drive system in response to control signals;
   a processor configured to provide control signals to the controller; and
   a deployable set of wheels orientated perpendicular to a length of the self-propelled airside dolly, wherein the deployable set of wheels are deployable from a stowed position to a deployed position, and wherein the deployable set of wheels comprises one or more driven wheels;
   wherein the self-propelled airside dolly is suitable for carrying one fully-laden ULD and/or wherein the self-propelled airside dolly is suitable for carrying a load of at least 1,000 kg;
   wherein the self-propelled dolly is operable in a normal operation mode in which it is capable of travelling in a longitudinal direction, generally parallel to the direction of a length of the dolly, and wherein the self-propelled dolly is further operable in a lateral movement docking mode in which it is capable of travelling in a sideways direction, generally transverse to its longitudinal.

2. A self-propelled airside dolly according to claim 1 further comprising a deployable ground engaging means, wherein the deployable ground engaging means are orientated transverse to, preferably perpendicular or generally perpendicular to, a length of the dolly.

3. A self-propelled airside dolly according to claim 2, further comprising a jacking system, wherein the jacking system is configured to deploy the deployable ground engaging means.

4. A self-propelled airside dolly according to claim 1, comprising two or more wheels and a motor provided for each wheel that provides motive power to the respective wheel, wherein steering is provided by differential control of the motor of each wheel, and/or wherein the drive system is configured to control the self-propelled airside dolly to move forwards, backwards, and steer, providing full control of the motion of the self-propelled airside dolly.

5. A self-propelled airside dolly according to claim 1, comprising at least one steerable wheel.

6. A self-propelled airside dolly according to claim 5, wherein all of the ground engaging wheels of the self-propelled airside dolly are steerable, wherein each of the ground engaging wheels is steerable to an angle of substantially +/−90° as measured from a position in which the ground engaging wheel is running parallel to the length of the self-propelled airside dolly.

7. A self-propelled airside dolly according to claim 5, wherein the steerable wheel, at least one of the steerable wheels, or all of the steerable wheels is/are steerable to a non-zero angle measured from a position in which the ground engaging wheel is running parallel to the length of the self-propelled airside dolly, wherein the non-zero angle is less than or equal to +/−360°.

8. A self-propelled airside dolly according to claim 5, wherein the steerable wheel, at least one of the steerable wheels, or all of the steerable wheels is/are independently steerable by a respective steering means.

9. A self-propelled airside dolly according to claim 5, wherein the steerable wheel, at least one of the steerable wheels, or all of the steerable wheels is/are powered.

10. A self-propelled airside dolly according to claim 9, wherein the self-propelled airside dolly comprises a motor provided for the steerable wheel, at least one of the steerable wheels, or each of the steerable wheels that provides motive power to the respective wheel.

11. A self-propelled airside dolly according to claim 5, comprising other ground engaging means used with the one or more steerable wheel, wherein the other ground engaging means comprises one or more rollers.

12. A baggage handling system comprising:
    a baggage hall comprising:
       a roadway having a first roadway portion and a second roadway portion;
       at least one lateral interposed between the first roadway portion and the second roadway portion;
       at least one loading bay on or adjacent to each of the at least one lateral; and
       a baggage delivery system configured to transfer baggage from a baggage source to the at least one loading bay; and
    at least one self-propelled airside dolly comprising:
       a cargo portion configured to hold baggage or cargo;
       a drive system for driving the self-propelled airside dolly;
       a controller configured to control the drive system in response to control signals; and
       a processor configured to provide control signals to the controller;
    wherein each self-propelled airside dolly is configured to be received at each loading bay and to receive baggage in its cargo portion from the baggage delivery system and to deliver baggage to a baggage receiver, wherein each self-propelled airside dolly is operable in a lateral movement docking mode to approach each loading bay from a direction generally perpendicular to the loading bay.

13. A baggage handling system according to claim 12, wherein the baggage handling system is configured to provide baggage destined for different baggage receivers at different loading bays on the same lateral, such as different adjacent loading bays, and/or wherein the baggage handling system is configured to provide baggage destined for different baggage receivers at adjacent loading bays on the same lateral.

14. A method of operating a baggage handling system or providing increased operational capacity of a baggage handling system, the baggage handling system comprising:
    a baggage hall comprising:
       a roadway having a first roadway portion and a second roadway portion;
       at least one lateral interposed between the first roadway portion and the second roadway portion;
       at least one loading bay on or adjacent to each of the at least one lateral; and
       a baggage delivery system configured to transfer baggage from a baggage source to the at least one loading bay; and at least one self-propelled airside dolly comprising:
  a cargo portion configured to hold baggage or cargo;
  a drive system for driving the self-propelled airside dolly;
  a controller configured to control the drive system in response to control signals; and
  a processor configured to provide control signals to the controller;
the method comprising:
  delivering baggage to the cargo portion of the at least one self-propelled airside dolly using the baggage delivery system when the self-propelled airside dolly is received within one of the at least one loading bay, wherein each self-propelled airside dolly is operable in a lateral movement docking mode to approach the one of the at least one loading bay from a direction generally perpendicular to the loading bay; and
  causing the self-propelled airside dolly to deliver baggage to a baggage receiver.

15. A method according to claim 14, further comprising directing the at least one self-propelled airside dolly to an available loading bay with no other empty loading bays adjacent to the available loading bay and causing the at least one self-propelled airside dolly to be received within the available loading bay, and/or wherein the baggage handling system comprises more than one loading bay and more than one self-propelled airside dolly, the method comprising causing one of the self-propelled airside dollies to leave a respective loading bay without waiting for an adjacent one of the self-propelled airside dollies to complete their loading or unloading in a respective loading bay.

16. A method of positioning a self-propelled airside dolly at a lateral, the self-propelled airside dolly comprising:
  a cargo portion configured to hold baggage or cargo;
  a drive system for driving the self-propelled airside dolly;
  a controller configured to control the drive system in response to control signals; and
  a processor configured to provide control signals to the controller; and
  a deployable set of wheels orientated perpendicular to a length of the self-propelled airside dolly, wherein the deployable set of wheels are deployable from a stowed position to a deployed position, and wherein the deployable set of wheels comprises one or more driven wheels;
  wherein the self-propelled airside dolly is suitable for carrying one fully-laden ULD and/or wherein the self-propelled airside dolly is suitable for carrying a load of at least 1,000 kg;
  wherein the self-propelled dolly is operable in a normal operation mode in which it is capable of travelling in a longitudinal direction, generally parallel to the direction of a length of the dolly, and wherein the self-propelled dolly is further operable in a lateral movement docking mode in which it is capable of travelling in a sideways direction, generally transverse to its longitudinal;
  the method comprising:
    finding a space large enough for only a single self-propelled airside dolly; and
    positioning the self-propelled airside dolly within the space.

17. A method of directing a single self-propelled airside dolly, the self-propelled airside dolly comprising:
  a cargo portion configured to hold baggage or cargo;
  a drive system for driving the self-propelled airside dolly;
  a controller configured to control the drive system in response to control signals; and
  a processor configured to provide control signals to the controller; and
  a deployable set of wheels orientated perpendicular to a length of the self-propelled airside dolly, wherein the deployable set of wheels are deployable from a stowed position to a deployed position, and wherein the deployable set of wheels comprises one or more driven wheels;
  wherein the self-propelled airside dolly is suitable for carrying one fully-laden ULD and/or wherein the self-propelled airside dolly is suitable for carrying a load of at least 1,000 kg;
  wherein the self-propelled dolly is operable in a normal operation mode in which it is capable of travelling in a longitudinal direction, generally parallel to the direction of a length of the dolly, and wherein the self-propelled dolly is further operable in a lateral movement docking mode in which it is capable of travelling in a sideways direction, generally transverse to its longitudinal;
  the method comprising directing the single self-propelled airside dolly to a free space along a lateral that is too small for a conventional baggage tractor pulling a single conventional baggage dolly.

18. A method of arranging self-propelled airside dollies at a lateral of a baggage hall, the method comprising:
  positioning a first self-propelled airside dolly and a second self-propelled airside dolly at the lateral, each of the first and second self-propelled airside dollies comprising:
    a cargo portion configured to hold baggage or cargo;
    a drive system for driving the self-propelled airside dolly;
    a controller configured to control the drive system in response to control signals; and
    a processor configured to provide control signals to the controller;
  wherein when positioned, a distance between the platform of the first self-propelled airside dolly and the second self-propelled airside dolly is less than a predetermined distance, wherein the predetermined distance is less than the typical length of a tow bar of a conventional baggage dolly.

19. A method of arranging self-propelled airside dollies at a lateral of a baggage hall, each self-propelled airside dolly comprising:
  a cargo portion configured to hold baggage or cargo;
  a drive system for driving the self-propelled airside dolly;
  a controller configured to control the drive system in response to control signals;
  a processor configured to provide control signals to the controller; and
  a deployable set of wheels orientated perpendicular to a length of the self-propelled airside dolly, wherein the deployable set of wheels are deployable from a stowed position to a deployed position, and wherein the deployable set of wheels comprises one or more driven wheels;
  the method comprising:
    positioning a first one of the self-propelled airside dollies at the lateral, the first self-propelled airside dolly being configured to deliver baggage to a first destination; and positioning a second one of the self-propelled airside dollies at the lateral, the second self-propelled airside dolly being configured to deliver baggage to a second destination;

wherein the first destination and the second destination are different.

20. A method according to claim 19, wherein the first and second self-propelled airside dollies are positioned immediately adjacent each other on the same side of the same lateral, and/or wherein at least one of the self-propelled airside dollies is operable to position itself a predetermined distance away from the lateral, wherein the predetermined distance is set between 10 mm and 200 mm, or between 50 mm and 150 mm, or between 90 mm and 110 mm, or approximately 100 mm.

* * * * *